US012076292B2

(12) United States Patent
Giacometti et al.

(10) Patent No.: US 12,076,292 B2
(45) Date of Patent: Sep. 3, 2024

(54) FORCE SENSING IMPLEMENTATIONS IN CARDIOPULMONARY RESUSCITATION

(71) Applicant: ZOLL Medical Corporation, Chelmsford, MA (US)

(72) Inventors: Paolo Giacometti, Nashua, NH (US); Gideon Butler, Portsmouth, NH (US); Frederick J. Geheb, Lenexa, KS (US); Gary A Freeman, Waltham, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 479 days.

(21) Appl. No.: 16/488,969

(22) PCT Filed: Feb. 28, 2018

(86) PCT No.: PCT/US2018/020246
§ 371 (c)(1),
(2) Date: Aug. 27, 2019

(87) PCT Pub. No.: WO2018/160709
PCT Pub. Date: Sep. 7, 2018

(65) Prior Publication Data

US 2019/0374429 A1 Dec. 12, 2019

Related U.S. Application Data

(60) Provisional application No. 62/464,527, filed on Feb. 28, 2017.

(51) Int. Cl.
*A61H 31/00* (2006.01)

(52) U.S. Cl.
CPC ......... *A61H 31/005* (2013.01); *A61H 31/007* (2013.01); *A61H 2031/001* (2013.01);
(Continued)

(58) Field of Classification Search
CPC ................ A61H 31/005; A61H 31/007; A61H 2031/001; A61H 2201/5007;
(Continued)

(56) References Cited

U.S. PATENT DOCUMENTS 3,295,086 A * 12/1966 Laimins ................ G01L 1/2218 73/862.52
4,375,243 A * 3/1983 Doll ....................... G01G 3/142 177/25.17
(Continued)

FOREIGN PATENT DOCUMENTS

CN 104507439 A 4/2015
CN 105636570 A 6/2016
(Continued)

OTHER PUBLICATIONS

Chen, W., Jiang, J., Chen, W. et al. A novel flexure-based uniaxial force sensor with large range and high resolution. Sci. China Technol. Sci. 56, 1940-1948 (2013). https://doi.org/10.1007/s11431-013-5240-3 (Year: 2013).*

*Primary Examiner* — Justine R Yu
*Assistant Examiner* — Benjamin M. Kusiak
(74) *Attorney, Agent, or Firm* — The Webb Law Firm

(57) ABSTRACT

Systems and methods related to the field of cardiac resuscitation, and in particular to devices for assisting rescuers in performing cardio-pulmonary resuscitation (CPR) are described herein. The system includes a chest compression device having force sensing capabilities, for providing feedback in enhancing the quality of acute care. The force sensor(s) may exhibit varying resolutions over different dynamic force ranges, for example, to provide information helpful to the resuscitative treatment. Chest compression devices that are able to sense force may be able to assist a system in providing accurate chest compression depth and rate information, as well as assess the amount of work
(Continued)

exerted by one or more rescuers during the course of resuscitation. Force sensors described herein may employ relatively inexpensive components, such as pressure sensors, emitters, optical detectors, simple circuit boards, springs, compliant/resilient materials, electrically resistive layers, force-sensitive materials, amongst other suitable parts.

21 Claims, 24 Drawing Sheets

(52) U.S. Cl.
CPC ................ *A61H 2201/5007* (2013.01); *A61H 2201/5061* (2013.01); *A61H 2201/5071* (2013.01); *A61H 2201/5084* (2013.01); *A61H 2201/5092* (2013.01)

(58) Field of Classification Search
CPC .... A61H 2201/5061; A61H 2201/5071; A61H 2201/5084; A61H 2201/5092; A61H 2201/1253; A61H 2201/5043; A61H 2203/0456
USPC .......................... 601/41; 434/265; 73/862.52
See application file for complete search history.

(56) References Cited

U.S. PATENT DOCUMENTS 5,287,748 A * 2/1994 Talmadge .............. G01D 3/024 73/862.52
6,174,295 B1 * 1/2001 Cantrell ................. A61H 31/00 601/41
6,390,996 B1 5/2002 Halperin et al.
7,220,235 B2 5/2007 Geheb et al.
7,429,250 B2 9/2008 Halperin et al.
9,125,793 B2 9/2015 Palazzolo et al.
9,713,568 B2 * 7/2017 Nilsson ................ A61H 31/006
9,925,114 B2 3/2018 Herken et al.
9,968,514 B2 5/2018 Herken et al.
10,258,259 B1 * 4/2019 Zets ..................... A61B 5/7455
10,292,899 B2 5/2019 Nilsson et al.
10,406,345 B2 9/2019 Silver et al.
2004/0267325 A1 * 12/2004 Geheb .................. A61B 5/6833 607/5
2007/0276300 A1 * 11/2007 Olson .................. A61H 31/007 601/41
2008/0171311 A1 * 7/2008 Centen ................... G16H 20/30 434/265
2008/0300517 A1 12/2008 Nysaether
2009/0149901 A1 * 6/2009 Jayne ................... A61H 31/006 607/3
2010/0022904 A1 * 1/2010 Centen ................. G09B 23/288 600/534
2010/0228166 A1 * 9/2010 Centen ................... A61H 31/00 601/41
2011/0201979 A1 * 8/2011 Voss ..................... A61H 31/005 601/41
2012/0226204 A1 * 9/2012 Coleman ............ A61N 1/37247 601/41
2013/0072830 A1 * 3/2013 Illindala ............... A61H 31/006 601/41
2013/0282069 A1 * 10/2013 Thiagarajan ......... A61H 31/005 607/3
2014/0276269 A1 * 9/2014 Illindala ............... A61H 31/008 601/41
2016/0012752 A1 * 1/2016 Maleska-Kubick ......................... G09B 23/288 434/265
2016/0296419 A1 * 10/2016 Paulussen ............ A61H 31/006
2016/0361227 A1 * 12/2016 Freeman .............. A61N 1/3993
2017/0079876 A1 3/2017 Freeman
2017/0294144 A1 10/2017 Kwon et al.
2018/0092803 A1 4/2018 Freeman et al.
2018/0133104 A1 * 5/2018 Vosch ...................... H04Q 9/00
2021/0283008 A1 * 9/2021 Shockley, Jr. ........... A61H 1/00

FOREIGN PATENT DOCUMENTS

EP 1997469 A1 12/2008
WO 2011100694 A1 8/2011
WO 2016081381 A1 5/2016
WO 2017175922 A1 10/2017

* cited by examiner

FORCE SENSING IMPLEMENTATIONS IN CARDIOPULMONARY RESUSCITATION

CROSS-REFERENCE TO RELATED APPLICATIONS

This application is the United States national phase of International Application No. PCT/US2018/020246 filed Feb. 28, 2018, and claims priority to U.S. Provisional Patent Application No. 62/464,527 filed Feb. 28, 2017, the disclosures of each of which are hereby incorporated by reference in their entireties.

TECHNICAL FIELD

The present disclosure relates to cardiac resuscitation systems and techniques for assisting caregivers in performing cardio-pulmonary resuscitation (CPR) chest compressions.

BACKGROUND

Acute care is delivered in emergency situations in pre-hospital and hospital settings to patients experiencing a variety of acute medical conditions. These conditions involve the timely diagnosis and treatment of disease states that, left alone, will likely degenerate into a life-threatening condition and, potentially, death within a period of 72 hours or less. Stroke, dyspnea (difficulty breathing), traumatic arrest, myocardial infarction and cardiac arrest are a few examples of disease states for which acute care is delivered to patients in an emergency setting. Acute care may include a variety of treatments and/or diagnoses, depending upon the disease state.

One example of acute care is cardio-pulmonary resuscitation (CPR), which is a process by which one or more acute care providers may attempt to resuscitate a patient who may have suffered a cardiac arrest or other acute adverse cardiac event by taking one or more actions, for example, providing chest compressions and ventilation to the patient. The first five to eight minutes of CPR, including chest compressions, are critically important, largely because chest compressions help maintain blood circulation through the body and in the heart itself. Ventilation is also key part of CPR because ventilations help to provide much needed gas exchange (e.g., oxygen supply and carbon dioxide deposit) for the circulating blood.

CPR may be performed by a team of one or more acute care providers, for example, an emergency medical services (EMS) team made up of emergency medical technicians (EMTs), a hospital team including medical caregivers (e.g., doctors, nurses, etc.), and/or bystanders responding to an emergency event. In some instances, one acute care provider can provide chest compressions to the patient while another can provide ventilations to the patient, where the chest compressions and ventilations may be timed and/or coordinated according to an appropriate CPR protocol. When professionals such as EMTs provide care, ventilation may be provided via a ventilation bag that an acute care provider squeezes, for example, rather than by mouth-to-mouth. CPR can be performed in conjunction with electrical shocks to the patient provided by an external defibrillator, such as an automatic external defibrillator (AED). Such AEDs often provide instructions (e.g., in the form of audible feedback) to acute care providers, such as "Push Harder" (when the acute care provider is not performing chest compressions according to the desired depth), "Stop CPR," "Stand Back" (because a shock is about to be delivered), and so on. In order to determine the quality of chest compressions being performed, certain defibrillators may obtain information from one or more accelerometers (such as those which are provided with CPR D PADZ®, CPR STAT PADZ®, and ONE STEP™ pads made by ZOLL MEDICAL of Chelmsford, Mass.) that can be used to provide data to determine information such as depth of chest compressions (e.g., to determine that the compressions are too shallow or too deep and to thus cause an appropriate cue to be provided by the defibrillator).

SUMMARY

The present disclosure describes systems and techniques that can be used to help manage the work of caregivers who are treating a person in need of emergency assistance.

In an embodiment, a system for assisting a rescuer in providing CPR chest compressions to a patient in need of acute care is provided. The system comprises a chest compression device. The chest compression device comprises at least one force sensor configured to generate force signals indicative of chest compressions administered to the patient by the rescuer during CPR, the at least one force sensor having a first resolution over a first force range, and having a second resolution over a second force range. The chest compression device comprises a housing supporting the at least one force sensor. The system further comprises a computing device having processing circuitry operatively connected to the at least one force sensor, where the computing device is configured to: receive and process signals from the at least one force sensor to determine at least one resuscitation parameter during the administration of chest compressions to the patient, and generate an output signal based on the at least one resuscitation parameter. The system comprises an output device configured to provide feedback to the rescuer based on the at least one resuscitation parameter.

In another embodiment, a system for assisting a rescuer in providing chest compressions to a patient in need of acute care is provided. The system comprises a chest compression device. The chest compression device comprises at least one motion sensor configured to generate motion signals indicative of chest compressions administered to the patient during CPR, at least one force sensor configured to generate force signals indicative of chest compressions administered to the patient, and a housing supporting the at least one motion sensor and the at least one force sensor. The system further comprises a computing device having processing circuitry operatively connected to the at least one motion sensor and the at least one force sensor and configured to: receive and process signals from the at least one motion sensor and the at least one force sensor, determine a chest compliance relationship based on the signals from the at least one motion sensor and the at least one force sensor, detect the presence of a compressible transition layer at an anterior location of the patient based on the determined chest compliance relationship, and generate an output signal based on the detected compressible transition layer. The system comprises an output device configured to provide feedback to a user based on the detected compressible transition layer.

In yet another embodiment, a system for assisting a rescuer in providing chest compressions to a patient in need of acute care is provided. The system comprises a chest compression device. The chest compression device comprises at least one motion sensor configured to generate motion signals indicative of chest compressions administered to the patient during CPR, at least one force sensor configured to generate force signals indicative of chest compressions administered to the patient, and a housing supporting the motion sensor and the force sensor. The system further comprises a computing device having processing circuitry operatively connected to the at least one motion sensor and the at least one force sensor and configured to: receive and process signals from the at least one motion sensor and the at least one force sensor to determine an amount of work applied by a user during the administration of chest compressions to the patient, and generate a signal based on the amount of work applied by the user. The system comprises an output device configured to provide feedback based on the determined amount of work applied by the user during the administration of chest compressions to the patient.

In an embodiment, a system for assisting a rescuer in providing chest compressions to a patient in need of acute care is provided. The system comprises a chest compression device. The chest compression device comprises a pressure sensor configured to generate signals indicative of force applied during CPR chest compressions, and a housing where at least a portion of the housing provides a compliant, sealed fluid-filled enclosure containing the pressure sensor, the enclosure configured to be located beneath hands of the rescuer during delivery of chest compressions and transfer force from the delivered chest compressions through the fluid within the enclosure to the pressure sensor. The system further comprises a computing device having processing circuitry operatively connected to the pressure sensor and configured to: receive and process signals from the pressure sensor to determine an estimate of force applied to the patient during the delivery of chest compressions based on the force transferred through the fluid to the pressure sensor, and generate an output based on the estimate of force applied to the patient during the delivery of chest compressions. The system comprises an output device configured to provide feedback to a user based on the estimate of force applied to the patient.

In yet another embodiment, a system for assisting a rescuer in providing chest compressions to a patient in need of acute care is provided. The system comprises a chest compression device. The chest compression device comprises a housing configured to be disposed between hands of the rescuer and the patient's sternum during delivery of CPR chest compressions, wherein inner faces of the housing comprise a first inner face and a second inner face located opposite the first inner face, the second inner face having a reflective surface, an emitter provided on the first inner face and configured to transmit light in a direction substantially perpendicular and away from the first inner face such that the reflective surface of the second inner face reflects the transmitted light from the emitter, an optical detector provided on the first inner face and configured to receive and measure an intensity of the reflected light, and a resilient material located between the first and second inner faces that deflects in a manner proportional to the force delivered during chest compressions. The system further comprises a computing device having processing circuitry operatively connected to the optical detector and configured to: receive and process signals from the optical detector to determine an estimate of force applied to the patient during the delivery of CPR chest compressions based on the intensity of the reflected light measured from the optical detector, and generate an output based on estimate of force applied to the patient during the delivery of chest compressions. The system comprises an output device configured to provide feedback to a user based on the estimate of force applied to the patient.

In an embodiment, a system for assisting a rescuer in providing chest compressions to a patient in need of acute care is provided. The system comprises a chest compression device. The chest compression device comprises a housing configured to be disposed between hands of the rescuer and the patient's sternum during delivery of CPR chest compressions, at least one compliant, electrically resistive layer contained within the housing, a circuit layer having at least two electrical terminals in contact with the electrically resistive layer, wherein electrical resistance between the at least two electrical contacts is proportional with force applied to the electrically resistive layer, and a resistance sensor configured to measure the electrical resistance between the at least two electrical contacts. The system further comprises a computing device having processing circuitry operatively connected to the resistance sensor and configured to: receive and process signals from the resistance sensor to determine an estimate of force applied to the patient during the delivery of chest compressions based on the measured resistance from the resistance sensor, and generate an output based on the estimate of force applied to the patient during the delivery of chest compressions. The system comprises an output device configured to provide feedback to a user based on the estimate of force applied to the patient.

Non-limiting examples, aspects or embodiments of the present invention will now be described in the following clauses:

In some embodiments, a system for assisting a rescuer in providing chest compressions to a patient in need of acute care, the system comprises:

- a chest compression device comprising:
  - at least one force sensor configured to generate force signals indicative of chest compressions administered to the patient by the rescuer, the at least one force sensor having a first resolution over a first force range, and having a second resolution over a second force range, and
  - a housing supporting the at least one force sensor;
- a computing device having processing circuitry operatively connected to the at least one force sensor and configured to:
  - receive and process signals from the at least one force sensor to determine at least one resuscitation parameter during the administration of chest compressions to the patient, and
  - generate an output signal based on the at least one resuscitation parameter; and an output device configured to provide feedback to the rescuer based on the at least one resuscitation parameter.

In some embodiments, the first resolution of the force sensor comprises a first least significant measurement of less than 1.0 lb over the first force range and the second resolution comprises a second least significant measurement over the second force range which is at least 2 times greater than the first least significant measurement.

In some embodiments, the chest compression device comprises at least one motion sensor configured to generate motion signals indicative of chest compressions administered to the patient.

In some embodiments, the at least one motion sensor comprises an accelerometer.

In some embodiments, the at least one resuscitation parameter comprises at least one of a chest compression depth, a chest compression rate and/or a chest compliance relationship.

In some embodiments, the output device is configured to provide feedback to the user based on at least one of the chest compression depth, the chest compression rate and/or the chest compliance relationship.

In some embodiments, the processing circuitry is configured to determine whether a chest compression has started or stopped based on signals from the at least one force sensor.

In some embodiments, the first force range is between 0.1 lb and 10.0 lb.

In some embodiments, the first least significant measurement is between 0.001 lb and 1.0 lb.

In some embodiments, the first least significant measurement is between 0.1 lb and 1.0 lb and the first force range is between 0.1 lb and 5.0 lb.

In some embodiments, the second force range is between 1.0 lb and 200 lb.

In some embodiments, the second least significant measurement is between 0.5 lb and 10.0 lb.

In some embodiments, the second least significant measurement is between 1.0 lb and 10.0 lb and the second force range is between 5.0 lb and 100 lb.

In some embodiments, the second least significant measurement is between 2 times and 100 times greater than the first least significant measurement.

In some embodiments, the at least one force sensor comprises a first force sensor having the first resolution over the first force range, and a second force sensor having the second resolution over the second force range.

In some embodiments, the at least one force sensor comprises a third force sensor having a third resolution with a third least significant measurement (LSM) over a third force range.

In some embodiments, the third LSM is at least 2 times greater than the second LSM.

In some embodiments, the third LSM is between 0.1 lb and 1.0 lb and the third force range is between 0.5 lb and 5.0 lb.

In some embodiments, the processing circuitry is configured to identify the occurrence of active decompression applied to the patient based on signals from the at least one force sensor.

In some embodiments, the output device is configured to provide feedback to the user based on the identified active decompression applied to the patient.

In some embodiments, the processing circuitry is configured to determine a neutral position of chest compression based at least in part on a feature of the chest compliance relationship.

In some embodiments, the processing circuitry is configured to detect a presence of a compressible transition layer at an anterior location of the patient based on the determined chest compliance relationship.

In some embodiments, the processing circuitry is configured to estimate a chest compression depth based at least on the detected compressible transition layer.

In some embodiments, the processing circuitry is configured to determine a state of the patient based on signals from the at least one force sensor.

In some embodiments, the determined state of the patient is one of a likelihood of injury during the course of resuscitation.

In some embodiments, the output device is configured to alert a user regarding the determined state of the patient.

In some embodiments, the alert involves notification to the user that the patient is at risk of suffering from injury during the course of resuscitation.

In some embodiments, the determined state of the patient is one of having a compressible surface underneath the patient.

In some embodiments, the processing circuitry is configured to estimate a chest compression depth based on detection of the compressible surface underneath the patient.

In some embodiments, the system further comprises an additional chest compression device configured to be placed at a posterior location of the patient.

In some embodiments, a system for assisting a rescuer in providing chest compressions to a patient in need of acute care, the system comprises:

- a chest compression device comprising:
  - at least one motion sensor configured to generate motion signals indicative of chest compressions administered to the patient,
  - at least one force sensor configured to generate force signals indicative of chest compressions administered to the patient, and
  - a housing supporting the at least one motion sensor and the at least one force sensor;
- a computing device having processing circuitry operatively connected to the at least one motion sensor and the at least one force sensor and configured to:
  - receive and process signals from the at least one motion sensor and the at least one force sensor,
  - determine a chest compliance relationship based on the signals from the at least one motion sensor and the at least one force sensor,
  - detect the presence of a compressible transition layer at an anterior location of the patient based on the determined chest compliance relationship, and
  - generate an output signal based on the detected compressible transition layer; and
- an output device configured to provide feedback to a user based on the detected compressible transition layer.

In some embodiments, the processing circuitry is configured to estimate chest compression depth based on signals from one or more of the at least one motion sensor and the at least one force sensor.

In some embodiments, the processing circuitry is configured to estimate the chest compression depth based on a change in the estimated chest compliance relationship.

In some embodiments, the processing circuitry is configured to detect the presence of a compressible transition layer based on whether the chest compliance relationship meets a threshold criterion.

In some embodiments, the threshold criterion involves a determination of whether an absolute value of a rate of change of chest compliance is less than a threshold rate of change of compliance.

In some embodiments, processing circuitry is configured to estimate the chest compression depth by calculating displacement from signals from the at least one motion sensor when the threshold criterion is met.

In some embodiments, the detection of the compressible transition layer comprises detection of at least one of an adipose layer, clothing and/or gauze at the anterior location of the patient.

In some embodiments, the output device is configured to provide an indication to a user regarding the detected presence of the compressible transition layer.

In some embodiments, the at least one motion sensor comprises an accelerometer.

In some embodiments, the processing circuitry is configured to identify an occurrence of active decompression applied to the patient based on signals from one or more of the at least one motion sensor and the at least one force sensor.

In some embodiments, the output device is configured to provide feedback to the user based on the identified active decompression applied to the patient.

In some embodiments, the processing circuitry is configured to determine whether a chest compression has started or stopped based on signals from one or more of the at least one motion sensor and the at least one force sensor.

In some embodiments, the processing circuitry is configured to determine a neutral position of chest compression based at least in part on a feature of the chest compliance relationship.

In some embodiments, the at least one force sensor has a first resolution with a first LSM of less than 1.0 lb over a first force range, and has a second resolution with a second LSM over a second force range, wherein the second LSM is at least 2 times greater than the first LSM.

In some embodiments, the processing circuitry is configured to determine a state of the patient based on signals from the at least one motion sensor and the at least one force sensor.

In some embodiments, the output device is configured to alert a user regarding the determined state of the patient.

In some embodiments, the determined state of the patient is one of a likelihood of injury during the course of resuscitation.

In some embodiments, the alert involves notification to the user that the patient is at risk of suffering from injury during the course of resuscitation.

In some embodiments, the output device is configured to provide instructions for the user in administering chest compressions.

In some embodiments, the determined state of the patient is one of having a compressible surface underneath the patient.

In some embodiments, the processing circuitry is configured to estimate a chest compression depth based on detection of the compressible surface underneath the patient.

In some embodiments, the system further comprises an additional chest compression device configured to be placed at a posterior location of the patient.

In some embodiments, a system for assisting a rescuer in providing chest compressions to a patient in need of acute care, the system comprises:

- a chest compression device comprising:
  - at least one motion sensor configured to generate motion signals indicative of chest compressions administered to the patient,
  - at least one force sensor configured to generate force signals indicative of chest compressions administered to the patient, and
  - a housing supporting the motion sensor and the force sensor;
- a computing device having processing circuitry operatively connected to the at least one motion sensor and the at least one force sensor and configured to:
  - receive and process signals from the at least one motion sensor and the at least one force sensor to determine an amount of work applied by a user during the administration of chest compressions to the patient, and
  - generate a signal based on the amount of work applied by the user; and
- an output device configured to provide feedback based on the determined amount of work applied by the user during the administration of chest compressions to the patient.

In some embodiments, the output device is configured to provide an indication of the determined amount of work applied by the user during the administration of chest compressions.

In some embodiments, the processing circuitry is configured to estimate at least one resuscitation parameter based on signals from one or more of the at least one motion sensor and the at least one force sensor.

In some embodiments, the at least one resuscitation parameter comprises at least one of a chest compression depth, a chest compression rate and/or a chest compliance relationship.

In some embodiments, the processing circuitry is configured to provide an indication of rescuer fatigue based on the at least one resuscitation parameter and the determined amount of worked applied by the user.

In some embodiments, the indication of rescuer fatigue is based on whether an average chest compression depth falls within a desired range.

In some embodiments, the output device is configured to provide an indication for rescuers to switch roles in the administration of chest compressions.

In some embodiments, the at least one motion sensor comprises an accelerometer.

In some embodiments, the processing circuitry is configured to identify the occurrence of active decompression applied to the patient based on signals from one or more of the at least one motion sensor and the at least one force sensor.

In some embodiments, the output device is configured to provide feedback to the user based on the identified active decompression applied to the patient.

In some embodiments, the processing circuitry is configured to determine whether a chest compression has started or stopped based on signals from one or more of the at least one motion sensor and the at least one force sensor.

In some embodiments, the processing circuitry is configured to determine a neutral position of chest compression based at least in part on a feature of the chest compliance relationship.

In some embodiments, the at least one force sensor has a first resolution with a first LSM of less than 1.0 lb over a first force range, and has a second resolution with a second LSM over a second force range, wherein the second LSM is at least 2 times greater than the first LSM.

In some embodiments, the processing circuitry is configured to determine a state of the patient based on signals from the at least one motion sensor and the at least one force sensor.

In some embodiments, the output device is configured to alert a user regarding the determined state of the patient.

In some embodiments, the determined state of the patient is one of a likelihood of injury during the course of resuscitation.

In some embodiments, the alert involves notification to the user that the patient is at risk of suffering from injury during the course of resuscitation.

In some embodiments, the output device is configured to provide instructions for the user in administering chest compressions.

In some embodiments, the determined state of the patient is one of having a compressible surface underneath the patient.

In some embodiments, the processing circuitry is configured to estimate a chest compression depth based on detection of the compressible surface underneath the patient.

In some embodiments, the system further comprises an additional chest compression device configured to be placed at a posterior location of the patient.

In some embodiments, a system for assisting a rescuer in providing chest compressions to a patient in need of acute care, the system comprises:

a chest compression device comprising:

a pressure sensor configured to generate signals indicative of force applied during chest compressions, and a housing where at least a portion of the housing provides a compliant, sealed fluid-filled enclosure containing the pressure sensor, the enclosure configured to be located beneath hands of the rescuer during delivery of chest compressions and transfer force from the delivered chest compressions through the fluid within the enclosure to the pressure sensor;

a computing device having processing circuitry operatively connected to the pressure sensor and configured to:

receive and process signals from the pressure sensor to determine an estimate of force applied to the patient during the delivery of chest compressions based on the force transferred through the fluid to the pressure sensor, and generate an output based on the estimate of force applied to the patient during the delivery of chest compressions; and an output device configured to provide feedback to a user based on the estimate of force applied to the patient.

In some embodiments, the fluid within the sealed enclosure comprises at least one of air, inert gas, liquid, saline, silicone, oil, and/or a gel-like material.

In some embodiments, the processing circuitry is configured to estimate force applied to the patient during the delivery of chest compressions based on detected changes in pressure within the sealed enclosure from the pressure sensor.

In some embodiments, the chest compression device comprises at least one motion sensor configured to generate signals indicative of chest wall motion.

In some embodiments, the at least one motion sensor comprises an accelerometer.

In some embodiments, the processing circuitry is configured to determine whether a chest compression has started or stopped based on signals from the pressure sensor.

In some embodiments, the chest compression device comprises at least one of an emitter, an optical detector, an electrically resistive layer and/or a spring.

In some embodiments, a system for assisting a rescuer in providing chest compressions to a patient in need of acute care, the system comprises:

a chest compression device comprising:

a housing configured to be disposed between hands of the rescuer and the patient's sternum during delivery of chest compressions, wherein inner faces of the housing comprise a first inner face and a second inner face located opposite the first inner face, the second inner face having a reflective surface, an emitter provided on the first inner face and configured to transmit light in a direction substantially perpendicular and away from the first inner face such that the reflective surface of the second inner face reflects the transmitted light from the emitter, an optical detector provided on the first inner face and configured to receive and measure an intensity of the reflected light, and a resilient material located between the first and second inner faces that deflects in a manner proportional to the force delivered during chest compressions;

a computing device having processing circuitry operatively connected to the optical detector and configured to:

receive and process signals from the optical detector to determine an estimate of force applied to the patient during the delivery of chest compressions based on the intensity of the reflected light measured from the optical detector, and generate an output based on estimate of force applied to the patient during the delivery of chest compressions; and an output device configured to provide feedback to a user based on the estimate of force applied to the patient.

In some embodiments, the chest compression device comprises at least one motion sensor configured to generate signals indicative of chest wall motion.

In some embodiments, the at least one motion sensor comprises an accelerometer.

In some embodiments, the processing circuitry is configured to determine whether a chest compression has started or stopped based on signals from the optical detector.

In some embodiments, the chest compression device comprises at least one of a pressure sensor, an electrically resistive layer and/or a spring.

In some embodiments, the resilient member comprises a spring.

In some embodiments, the inner faces of the housing have an orientation within 10 degrees of perpendicular to a direction of force of the chest compressions.

In some embodiments, a system for assisting a rescuer in providing chest compressions to a patient in need of acute care, the system comprises:

a chest compression device comprising:

a housing configured to be disposed between hands of the rescuer and the patient's sternum during delivery of chest compressions, at least one compliant, electrically resistive layer contained within the housing, a circuit layer having at least two electrical terminals in contact with the electrically resistive layer, wherein electrical resistance between the at least two electrical contacts is proportional with force applied to the electrically resistive layer, and a resistance sensor configured to measure the electrical resistance between the at least two electrical contacts;

a computing device having processing circuitry operatively connected to the resistance sensor and configured to:

receive and process signals from the resistance sensor to determine an estimate of force applied to the patient during the delivery of chest compressions based on the measured resistance from the resistance sensor, and generate an output based on the estimate of force applied to the patient during the delivery of chest compressions; and an output device configured to provide feedback to a user based on the estimate of force applied to the patient.

In some embodiments, the resistance sensor is configured to measure at least one of a current and/or a voltage between the at least two electrical contacts.

In some embodiments, the electrically resistive layer comprises a plurality of conductive particles embedded within an insulative matrix.

In some embodiments, the chest compression device comprises at least one motion sensor configured to generate signals indicative of chest wall motion.

In some embodiments, the at least one motion sensor comprises an accelerometer.

In some embodiments, wherein the processing circuitry is configured to determine whether a chest compression has started or stopped based on signals from the resistance sensor.

In some embodiments, the system further comprises at least one force sensor comprising at least one of a pressure sensor, an emitter, an optical detector and/or a spring.

Other features and advantages will be apparent from the description, from the claims, and from the drawings, wherein like parts are designated with like reference numerals throughout.

DETAILED DESCRIPTION

Figure 1A:
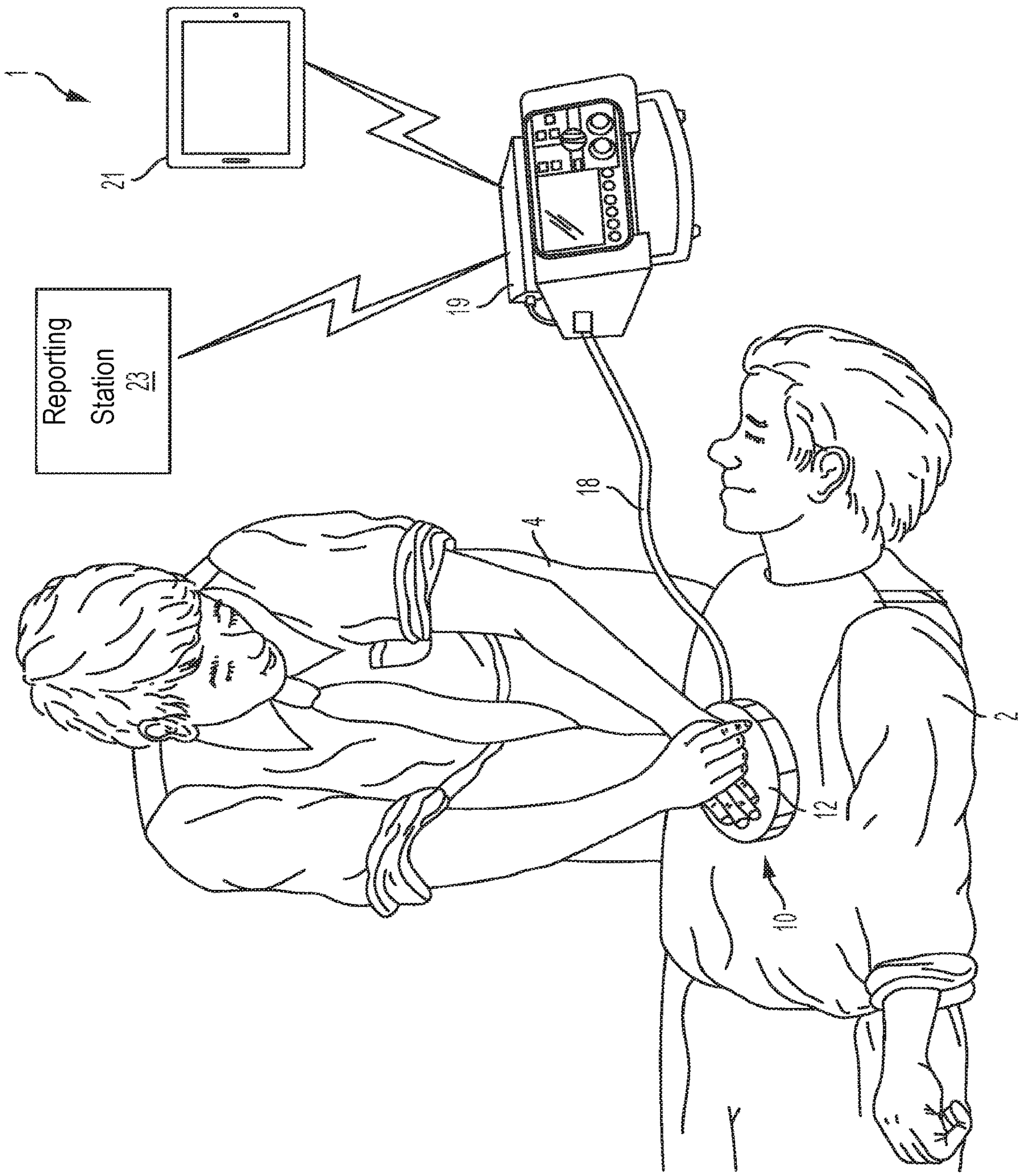
FIG. 1A shows an example of a caregiver administering chest compressions to a patient in need of acute care.

As used herein, the singular form of "a", "an", and "the" include plural referents unless the context clearly dictates otherwise.

As used herein, spatial or directional terms, such as "inner", "left", "right", "up", "down", "horizontal", "vertical" and the like, relate to the invention as it is described herein. However, it is to be understood that the invention can assume various alternative orientations and, accordingly, such terms are not to be considered as limiting. For the purposes of this specification, unless otherwise indicated, all numbers expressing dimensions, physical characteristics, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

Implementations of the present disclosure are generally directed to systems and techniques for assisting a caregiver in providing CPR chest compressions (e.g., chest compressions) to a patient in need of acute care. As provided herein, the term patient is considered to encompass any person who may be in need of acute care, for example, due to cardiac arrest, respiratory distress, traumatic injury, shock, amongst other conditions where resuscitative treatment may be required. Embodiments described herein involve the use of a chest compression device that has the ability to measure changes in force in combination with other measurement technologies, such as accelerometers and/or other sources of input, to readily provide more useful information to acute caregivers than had previously been available.

Chest compression devices have conventionally incorporated an accelerometer to measure motion of the device as it is held against the sternum of the patient during the delivery of chest compressions during CPR. The calculated displacement of the chest wall is used to provide the caregiver with feedback as to whether chest compressions are being delivered according to the appropriate guidelines (e.g., guidelines provided by the American Heart Association regarding recommended compression depth and rate, etc.). In accordance with embodiments of the present disclosure, chest compression devices may further comprise force sensing capabilities, for example, coupled with motion sensing, so as to provide enhanced feedback to the user, resulting in overall improvements in resuscitative treatment.

The force sensing capabilities of the present disclosure provide improved systems and processes, especially when used in combination with motion sensors, including, for example, improved accuracy in measuring chest compression parameters in a relatively inexpensive disposable and/or portable device, improved chest compression feedback accounting for patient specific differences and sources of error in measurements of chest compression parameters, improved feedback for a rescuer in providing chest compressions and active decompressions, improved detection of rescuer fatigue during the performance of chest compressions, amongst other implementations, etc.

Chest compression devices described herein for assisting one or more caregivers in providing chest compressions to a patient in need of acute care may comprise a chest compression device comprising one or more force sensors and optionally one or more motion sensors, each sensor configured to generate signals indicative of forces applied to the patient during chest compressions delivered by a caregiver during CPR. The force sensing capabilities disclosed herein may provide a wide dynamic range in a relatively inexpensive, disposable and/or portable housing, providing improved measurement and feedback capabilities for delivering chest compression on scene during an acute care event. It may be advantageous to provide chest compression devices with both motion and force sensing capability in an apparatus that is disposable, such that it can optionally be provided for single patient use during an acute event. Accordingly, certain implementations described herein may be produced in a relatively inexpensive manner from materials that are more cost effective than traditional load cells which may be comparatively more expensive than various implementations of the present disclosure. For example, embodiments of force sensors described herein may use relatively inexpensive components, such as pressure sensors, emitters, optical detectors, simple circuit boards, springs, compliant/resilient materials, electrically resistive layers, force-sensitive materials, etc.

The force sensing capabilities of the present disclosure, especially in combination with motion sensors, provide improved patient specific chest compression feedback for a rescuer during CPR, for example, by taking into account the chest compliance of the patient, assessing whether the patient is at risk of injury, determining whether a compressible transition layer (e.g., chest softening, bulky amount of clothing and/or bandages, excessive adipose tissue, etc.) is on the anterior of the patient otherwise leading to inaccurate chest compression depth measurements, etc. In certain embodiments, the system may use signals from the motion sensor(s) and force sensor(s) to determine a chest compliance relationship of the patient in need of acute care. Chest compliance is a measure of the ability of the chest to absorb an applied force and change shape in response to the force. In the context of CPR, information about chest compliance can be used to determine how force can be applied to the chest of a patient in a way that will be effective at resuscitating the patient, and to enhance CPR feedback (e.g., improving accuracy in chest compression depth estimations). In some implementations, the chest compliance relationship may be useful to detect whether the patient in need of acute care has, may have, or is likely to suffer an injury (e.g., broken ribs, collapsed lung, amongst others) due to the force of chest compressions, and provide an appropriate alert a user as to the risk, possibility and/or presence of injury.

In additional examples, the present disclosure provides for improvements accounting for the presence of one or more compressible transition layer(s) that may give rise to erroneous calculations in chest compression depth. In some embodiments, the force sensor(s) may exhibit varying resolutions over different dynamic force ranges. For instance, it may be beneficial for the force sensor(s) to exhibit a certain degree of resolution over a particular force range (e.g., to determine whether contact has been made during chest compressions), and another degree of resolution during a different force range (e.g., to calculate chest compression depth). Or, the force sensor(s) may be capable of detecting a compressible transition layer located on the anterior of the patient that would otherwise lead to inaccurate chest compression depth measurements. As an example, the force sensor(s) may have a first resolution (e.g., having a least significant measurement (LSM) of between 0.001 lb and 1.0 lb) within a first dynamic force range of between 0.1 lb and 10.0 lbs, and may have a second resolution (e.g., having a least significant measurement of between 0.5 lbs and 10.0 lbs) within a second dynamic force range of between 10.0 lbs and 200 lbs.

In addition to accounting for error due to compressible transition layers, the force sensing capabilities in the present disclosure provide for improved accuracy in measuring chest compression parameters to account for external error, such as by taking into account the type of surface on which the patient is lying, or by accounting for signal artifacts due to external motion (e.g., vehicle motion, gurney movement, etc.). For instance, the system may assess whether the patient is lying on a surface that is overly soft, which may lead to inaccuracies in chest compression depth calculations, and make appropriate corrections. Or, force sensing may be used to determine when actual force is being applied to the chest, for example, in discriminating between incidental motion (e.g., associated with movement of the patient, the gurney on which the patient rests, a vehicle that houses the patient) and motion associated with the application of actual chest compressions.

In addition, the force sensing capabilities of the present disclosure provide improved rescuer feedback for delivering chest compression and active decompression, for example, by determining the neutral position of the chest during active compression decompression therapy (using methods described herein) and providing appropriate feedback. For instance, when the neutral position is determined, the non-elevated (below neutral position) compression depth and elevated (above neutral position) decompression depth may be accurately calculated and provided to the caregiver(s) as CPR feedback and/or another suitable form. Force sensing may also be used during active decompression to assess whether the caregiver is applying excessive pushing or pulling force to the patient, and provide associated warning(s) so as to mitigate against injury.

Additionally, the force sensing capabilities disclosed herein allow for the detection of rescuer fatigue during the performance of chest compressions, for example, by estimating the amount of work applied by a caregiver during the administration of resuscitative therapy. In an embodiment, the system calculates the work and/or power expenditure of the caregiver during chest compressions and, based on such a calculation, estimates the degree to which the caregiver may be fatigued and/or provides appropriate feedback. For example, if an excessive amount of work has been expended (e.g., exceeding a predetermined threshold), then the system may advise the caregiver to switch roles with another person who is more fresh/rested.

The chest compression device and/or system associated therewith may have processing circuitry (e.g., one or more processors, memory, etc.) operatively connected to the force sensor(s) for receiving and processing signals from the force sensor to perform a number of tasks, discussed herein. Such processing circuitry may further be operatively connected with one or more motion sensors for receiving and processing signals for use in combination with signals used for estimating force applied to the patient. For example, the system may use information provided from the motion sensor(s) and force sensor(s) to determine one or more resuscitation parameters (e.g., chest compression depth, chest compression rate, chest compliance relationship, state of the patient, work provided by the caregiver to the patient, amongst others) during the administration of chest compressions to the patient in need of acute care. The system may further provide feedback to a user based on the determined resuscitation parameter(s) in efforts to maintain or enhance a desired quality level of CPR administered to the patient.

Ideally, the force applied to the patient will be sufficient to create a pressure distribution (e.g., positive or negative pressure) within the heart that causes blood to flow/circulate throughout the body. However, if the force is not sufficient to create this pressure distribution, CPR will not be effective and the patient will die or otherwise deteriorate. Further, if the force is not applied correctly or is too great, then the patient may be injured. Feedback provided to a user can be enhanced by using information about the administration of the CPR treatment to give the user guidance that will improve the chances of success of the CPR treatment.

The present disclosure further provides a number of implementations in which a force sensor may be incorporated into a chest compression device, discussed below in more detail. In general, a chest compression device may comprise a lower surface that moves in accordance with a chest wall of the patient and an upper surface that receives force applied during chest compressions. Accordingly, the chest compression device is placed between a caregiver's hands and the sternum of the chest for appropriate delivery of chest compressions.

In an embodiment, described in further detail below, the chest compression device may employ a pressure sensor provided within a sealed, fluid-filled enclosure where measurements taken by the pressure sensor are proportional with forces applied to the enclosure. Such an enclosure may incorporate a mechanically compliant, yet supportive material for enabling pressure measurements to be proportionally correlated with force applied to the patient during delivery of chest compressions when appropriately calibrated.

Alternatively, the chest compression device may incorporate an emitter and an optical detector that are suitably positioned on a first inner face of the device, and located opposite a second inner face having a reflective surface. The force sensor may further comprise a resilient material positioned between and coupling the oppositely positioned inner faces. In such an embodiment, the emitter transmits light toward the reflective surface, which then redirects the light back toward the optical detector. The reflective surface is constructed so as to move in accordance with overall deformation of the resilient material of the chest compression device during the delivery of chest compressions. Accordingly, in this example, the detected light by the optical detector is used to provide an estimation of force applied by the caregiver during CPR treatment.

In another embodiment, the force sensor may comprise a circuit layer having open electrical contacts (e.g., with interdigitated trace elements), placed in contact with an electrically resistive layer, where compression of the electrically resistive layer against the otherwise open electrical contacts of the circuit layer results in a measurable change in resistance of the electrically resistive layer, proportional to the force applied by the caregiver to the patient during chest compressions. For example, as the electrically resistive layer is pressed against the open electrical contacts of the circuit layer with increasing force, the electrical resistance through the resistive layer decreases (e.g., to a conductive state). Conversely, when little to no force is applied between the electrically resistive layer and the open electrical contacts, the resistance through the electrically resistive layer remains relatively high (e.g., insulative in nature).

Combinations of various force sensing implementations may be employed, some of which are described further below.

FIG. 1A illustrates an example of an emergency situation, which includes a caregiver or rescuer (which may also be referred to as a user, acute care provider) 4 administering manual chest compressions to a patient 2 in need of acute care. A resuscitation system (or system) 1 comprises a chest compression device 10 positioned between the caregiver's hands and the patient 2 during chest compressions and is connected via a cable 18 to a computing device 19, to assist the caregiver 4 in delivering high quality chest compressions. In the illustrated example, the computing device 19 is illustrated as a defibrillator. However, in alternative embodiments, the computing device 19 comprises one or more of an automated external defibrillator (AED), a patient monitor, or a handheld or mobile computing device such as a tablet computer or "smartphone" (i.e., a device that is typically handheld and comprises an integrated broadband Wi-Fi and or cellular network connection. The chest compression device 10 may comprise a housing 12 that protects or otherwise supports a motion sensor and/or a force sensor encased within the housing 12. Various embodiments illustrating how the motion sensor and force sensor may be provided within the housing 12 are described further below.

The computing device 19, chest compression device 10 and/or other computing apparatus (e.g., tablet computer) 21, are part of the resuscitation system 1. The computing device and/or other computing apparatus may comprise processing circuitry that is configured to receive and process signals from the sensor(s) disposed with housing 12, and to estimate one or more resuscitation parameters based on signals from the motion sensor and/or the force sensor. Such resuscitation parameters may comprise, for example, chest compression depth, chest compression rate and/or chest compliance. In certain embodiments, where the motion sensor is an accelerometer, the acceleration signals may be processed (e.g., double integrated) to yield chest displacement using techniques known to those of skill in the art, such as those described for chest compression devices in U.S. Pat. No. 6,390,996, entitled "CPR Chest Compression Monitor," which is hereby incorporated by reference in its entirety.

Though, to more accurately determine chest compression depth, the system may also process signals from the force sensor to detect the starting and stopping point(s) of chest compressions. That is, when the system detects that contact has been made between the caregiver and the patient, via signals from the force sensor, the system may then use that detection of contact as a starting point from which chest compression depth is measured.

Upon estimation of the resuscitation parameter(s), the computing device 19 may provide an output to a caregiver (e.g., person administering chest compressions, administrator, etc.) to provide feedback output to the caregiver on how to improve and/or maintain within one or more predetermined target ranges. Generally speaking, for chest compressions, target parameters can comprise compression rate, depth, and compression cycle duration. In some examples, a preferred chest compression depth is about 2.0 inches, and an appropriate range for chest compression depth is between about 2.0 inches and 2.4 inches, according to the 2015 Guidelines by the American Heart Association (AHA) for Cardiopulmonary Resuscitation (CPR) and Emergency Cardiovascular Care (ECC). Target chest compression rate according to the AHA Guidelines is between about 100 compressions per minute (cpm) and 120 cpm, and preferably about 105 cpm.

Such targets and ranges can be varied depending upon a selected protocol. For instance, the computing device 19 can be configured to direct acute care providers to provide a number of compressions (e.g., about 30 compressions, or another suitable number) and then to pause compressions while delivering a specified number of ventilations (e.g., 2 ventilations). Target parameters can be predetermined and stored in memory located on the computing device 19, entered manually by the user prior to beginning the resuscitation activity, or automatically calculated by the device based, for example, on characteristics of the patient and/or caregiver. For example, target compression depth can be based on a size or weight of the patient. In other examples, target compression rate and depth can be selected based on skill of the acute care provider. In other examples, target parameters can be received from an external source, such as an external computer or another medical device. For example, the target parameters can be based on a treatment protocol received from another medical device, such as a defibrillator, wearable defibrillator (e.g., LifeVest Wearable Defibrillator provided by ZOLL Medical), automated external defibrillator, or ventilator, or from a reporting station 23 (e.g., a remote computer, a computer network, a central server, a hospital, etc.). Additionally, information may be transmitted to a remote facility for storage in a database, immediate analysis, and/or for later review of actions performed during the rescue.

Typically, the computing device 19 provides feedback output in the form of a visual display (e.g., graphical instructions, color changes, text, numbers, etc.), audible sounds (e.g., voice prompts, tones, alarms, etc.), haptic feedback (e.g., vibrations, tactile feedback), and/or any other suitable manner of providing recommended actions to the caregiver.

Figure 1B:
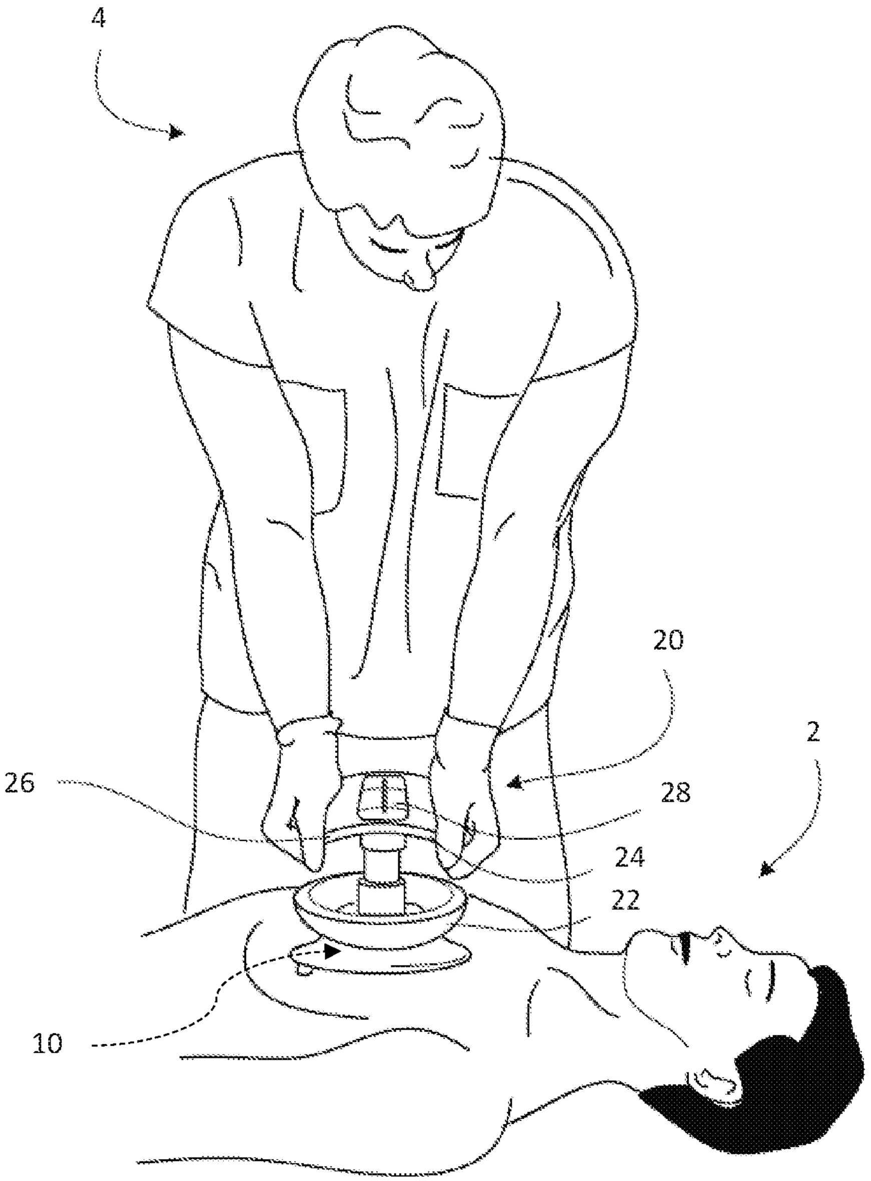
FIG. 1B depicts an example of a caregiver administering active compression decompressions to a patient in need of acute care.

FIG. 1B depicts an illustrative embodiment of a caregiver 4 using a device 20 to perform active compression decompression (ACD) CPR on a patient 2 who is being rescued from a cardiac event. The device 20 comprises a user interface 28 that provides feedback to the caregiver 4 (also referred to as a rescuer, user, acute care provider, amongst others) about the effectiveness of the CPR that the caregiver 4 is administering. The feedback may be determined based in part on CPR information (e.g., chest compression depth, chest compression rate, chest compliance, force applied to the patient, etc.) regarding the patient 2 as measured by the device 20 (sometimes referred to as an ACD device). The user interface 28 may be equipped with a suitable output device to provide the feedback to the caregiver 4. Other devices (e.g., tablet 21 in FIG. 1A) may be used to provide feedback, such as a separate display, user interface, mobile computing device (e.g., tablet, phone, handheld), defibrillator, medical monitor, etc.

As shown in FIG. 1B, the device 20 has handles 24, 26 that the caregiver 4 grips to apply force to the chest of the patient 2. The device 20 also has a suction cup 22 to keep the device 20 in contact with the chest of the patient 2. When the caregiver applies upward force using the device 20, the chest of the patient will be pulled upward in response due to the suction of the suction cup 22. This upward force creates a negative pressure within the thorax of the patient during the release phase of a CPR treatment. The user interface 28 may display a graph that shows whether the upward or downward forces are too strong, or not strong enough, and then the caregiver 4 can adjust the applied forces accordingly. If the device 20 and/or system 1 associated therewith determines that the depth of the compression phase is not sufficient for an effective CPR treatment, the caregiver can be provided with feedback (e.g., via a display) indicating that the depth of the downward motion is not meeting a threshold of effectiveness. In some implementations, the device/system can determine whether the upward or downward forces are too strong or not strong enough based on an estimate of the neutral position of chest compression of the patient. As discussed further herein, the neutral position of chest compression of the patient serves as an inflection point that can be used to differentiate the movement of the chest on upward strokes from movement of the chest on downward strokes and generate specific measurements for various phases of the compression cycle.

The ACD device 20 shown here is only an example of a manual ACD device. Other types of mechanical ACD devices can be used with the techniques described herein. Although the ACD device 20 shown here comprises a handle and a suction cup, other types of ACD devices used with the techniques described below need not include these elements. For example, other types of ACD devices may comprise a first element (e.g., one or more suction cups, adhesive) configured to be affixed to a surface of a patient's body and a second element (e.g., latch, handle, strap, bracket, or other mechanical structure) configured to be coupled to a hand of a rescuer. In these examples, the first element allows for pulling upward on the patient's body surface while maintaining contact with the patient's body surface. Further, in these examples, the second element enables the rescuer to push on the chest and pull up the chest.

Figure 1C:
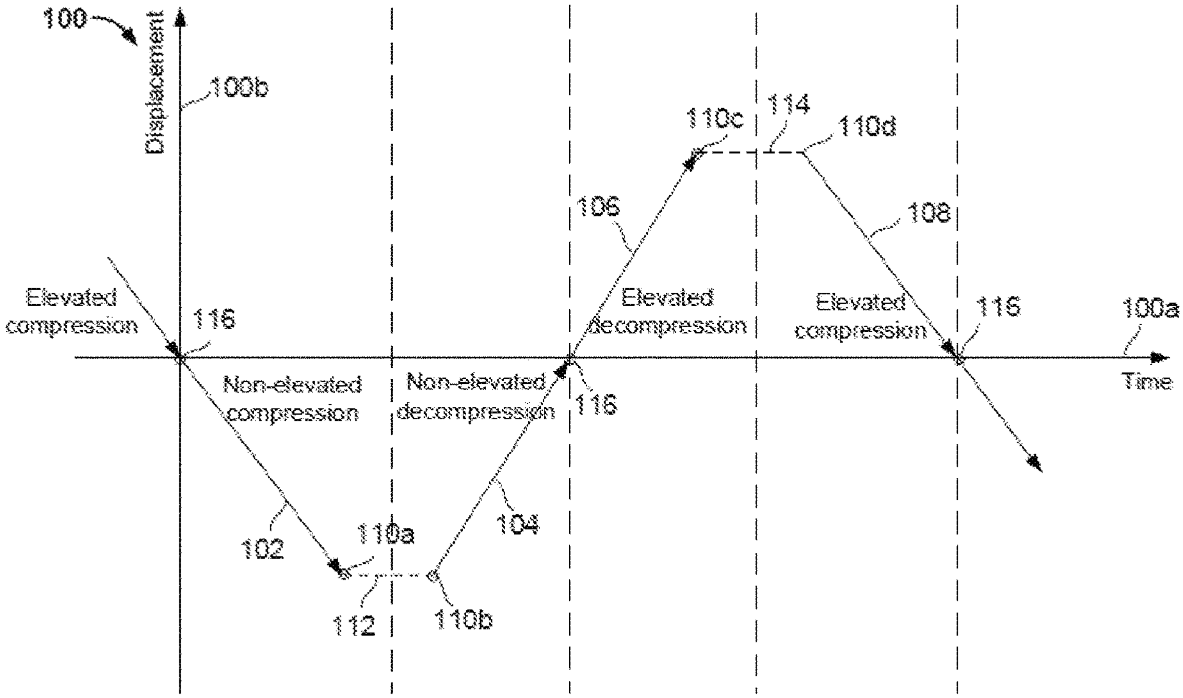
FIG. 1C shows an example graph including temporal variation of an example of a signal indicative of ACD CPR chest compression treatment.

FIG. 1C illustrates an example graph 100 including temporal variation of an example of a sternal displacement signal indicative of ACD CPR chest compression treatment as determined from a motion sensor such as an accelerometer. In some implementations, data corresponding to the graph 100 would be calculated by processing circuitry (e.g., processor(s), memory, etc.) of a computer system (e.g., defibrillator, monitor, etc.) or an ACD device (e.g., the ACD device 20 shown in FIG. 1B) or another kind of computer system (e.g., the computer system 1100 shown in FIG. 21).

The example graph 100 illustrates the phases of the ACD CPR chest compression treatment. The example graph shown in FIG. 1C includes a temporal (X) axis 100*a* and a displacement (Y) axis 100*b*. For illustrative purposes, the intersection between the temporal axis 100*a* and the displacement axis 100*b* marks an exemplary neutral position 116, which is considered the position at which zero force or pressure is exerted by the rescuer on to the patient during ACD compressions. The example graph 100 includes a plurality of neutral points 116 and other phase transition points 110*a*, 110*b*, 110*c*, and 110*d*. However, although the exemplary schematic of FIG. 1C shows the neutral points to be located at approximately the same displacement location, it can be appreciated that the location of the neutral point of the chest may vary between compressions and decompressions depending on how chest compliance of the patient varies, e.g., due to the possibility of chest remodeling that may occur during chest compressions. Alternatively, the neutral position location may be simply the initial position of the sternum prior to initiation of chest compressions.

The neutral position location 116 or other phase transition points may be determined using techniques for instance as described in "Chest Compliance Directed Chest Compressions", filed as U.S. patent application Ser. No. 15/267,255 on Sep. 16, 2016, and is incorporated by reference herein in its entirety. In some cases, the neutral position can be determined based on data such as an estimated depth of chest compression and an estimate of chest compliance. For example, when a victim's chest is at a neutral position of chest compression (generally corresponding to the natural resting position of the chest), chest compliance tends to be at its highest point. This can be determined, e.g., using a point of intersection of a hysteresis compliance curve, because the point of intersection tends to correspond to a neutral position of chest compression.

The example graph 100 illustrates the phases of the ACD CPR chest compression treatment: a non-elevated compression (CN) phase 102, a non-elevated decompression (DN) phase 104, an elevated decompression (DE) phase 106, and an elevated compression (CE) phase 108.

The non-elevated compression phase 102 corresponds to the time interval during which a rescuer is actively compressing the patient's chest as a downstroke from a neutral level to a particular compression depth.

The non-elevated decompression phase 104 corresponds to the time interval during which a rescuer is decompressing the patient's chest as an upstroke from a particular compression depth to a neutral level. The non-elevated decompression phase 104 may or may not be active in nature. That is, the acute care provider may actively pull up on the patient's chest at an upward velocity faster than the natural velocity of chest wall recoil, enhancing the overall effects of chest wall recoil (e.g., increasing negative intrathoracic pressure). Or, the acute care provider may pull up or reduce the applied force in a manner that allows the patient's chest to undergo natural recoil. Here, the release velocity may be the same as or slower than the natural recoil velocity of the chest.

The elevated decompression phase 106 corresponds to the time interval during which a rescuer is actively decompressing the patient's chest from a neutral level to a particular decompression amplitude. At this point, natural chest wall recoil has already occurred, and so active decompression involves pulling upward of the chest wall past the neutral point to further enhance negative intrathoracic pressure.

The elevated compression phase 108 corresponds to the time interval during which a rescuer is compressing the patient's chest from a particular decompression amplitude to the neutral level. The elevated compression phase 108 may or may not be active in nature. For instance, the acute care provider may let go or otherwise release the patient's chest to allow the chest to naturally rebound. Or, the acute care provider may actively push down on the patient's chest at a downward force that causes the chest to return back to its natural state faster than would otherwise be the case if the chest was simply let go.

Based on a recommended treatment protocol and/or feedback from the system, the rescuer may employ a hold period 112 between the non-elevated compression phase 102 and non-elevated decompression phase 104, or the rescuer may employ a hold period 114 between the elevated decompression phase 106 and elevated compression phase 108. Transition points 110*a*, 110*b*, 110*c*, and 110*d* define the point corresponding to the end of a phase and the beginning of another phase of the ACD chest compression treatment. In some implementations, the transition between elevated and non-elevated phases can correspond to the neutral points 116 of the patient's chest wall (e.g., the level at which the chest wall would be if ACD CPR chest compression treatment would not be applied, which can be measured before the initiation of the ACD CPR chest compression treatment). Transition points 110*a*, 110*b*, 110*c*, and 110*d* can be between compression and decompression phases, or between either compression or decompression and plateau phases.

During elevated compression and non-elevated compression, a rescuer can press downwardly on a handle of the system with sufficient force to compress the patient's chest from a level above a neutral point of the chest wall to a level below the neutral point. This action may increase intrathoracic pressure to induce arterial blood circulation by ejecting blood from cardiac chambers toward peripheral tissues. As discussed herein, the type of feedback provided during non-elevated compression may comprise chest compression depth and chest compression rate.

Figure 1D:
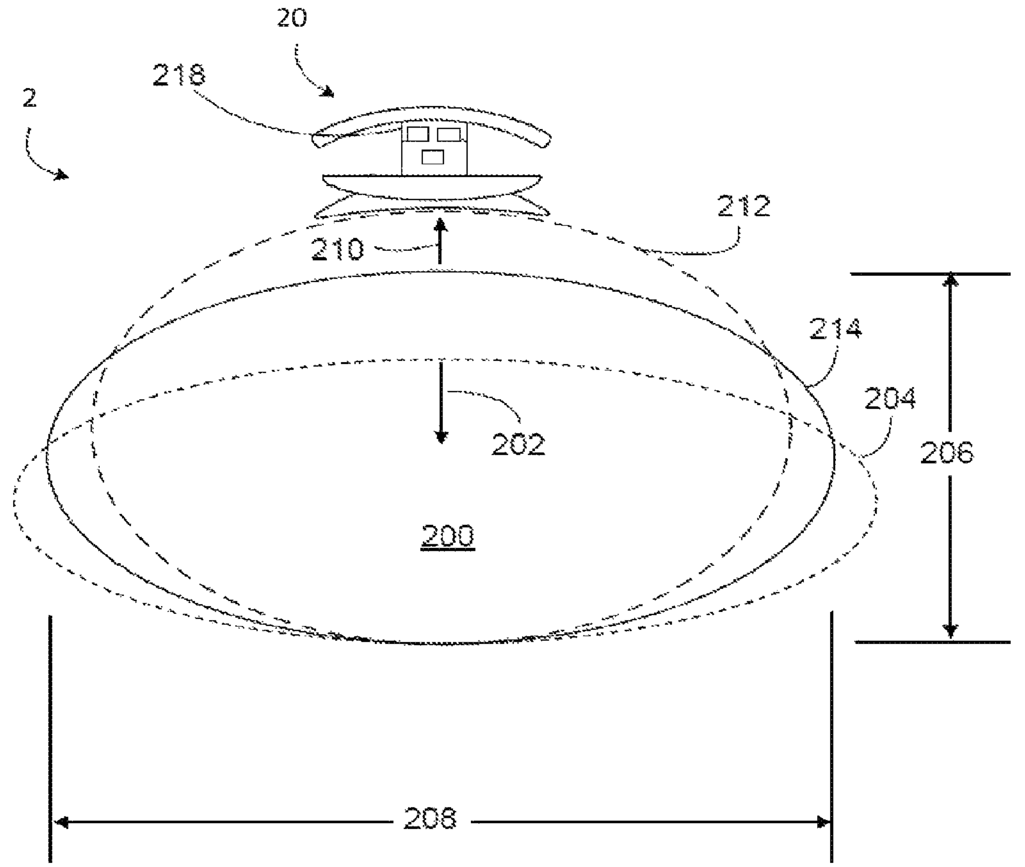
FIG. 1D shows another example of a caregiver administering active compression decompressions to a patient in need of acute care.

FIG. 1D represents the change in shape of the chest 200 of a patient 2 as an ACD device 20 is used to perform ACD CPR. Because the chest 200 of a human being is not rigid, the chest will change shape in response to forces applied. When the sternum is compressed downward 202 in the CN phase, the chest 200 tends to exhibit a shape 204 that is compressed in the anterior-posterior (AP) dimension 206 and extended in the lateral dimension 208. This shape 204 is sometimes referred to as a compression shape. During the DE phase 210, the chest 200 tends to exhibit a shape 212 that is extended in the AP dimension 206 and narrower in the lateral dimension 208. This shape 212 is sometimes referred to as a decompression shape. The chest 200 exhibits a shape 214 corresponding to a neutral position of chest compression, when no force is applied either upwards or downwards. In other words, the shape 214 corresponds to the natural position of the chest when its shape is not substantially affected by a force applied, e.g., during CPR chest compressions.

If a patient's chest exhibits relatively little change in shape in response to a particular change of force, the patient's chest is stiff having relatively low chest compliance. In contrast, if the patient's chest exhibits relatively high change in shape in response to a particular change of force, the patient has relatively high chest compliance. In addition, chest compliance varies as the chest is compressed as a result of the structural changes of the thoracic cavity due to positional and/or conformational changes as the chest is compressed downwards and pulled upwards. For example, as the chest is compressed downward, the compliance of the chest decreases as the chest approaches the limits of its flexibility.

As noted above, during active non-elevated decompression and elevated decompression, the rescuer can pull upwardly on the handle of the system to actively expand the patient's chest. Actively shifting the position of the chest wall from a level below the neutral point to a level above the neutral point may serve to decrease the intrathoracic pressure, and so may enhance refill of blood back into the cardiac chambers and, in some cases, may further assist in bringing air into the patient's lungs in a more efficient manner. As discussed herein, the type of feedback provided during non-elevated decompression and elevated decompression may comprise release velocity. Though, the feedback provided during elevated decompression may further comprise force along with release velocity. This is because overly excessive decompression force on the chest of the patient may lead to injury. Accordingly, the ACD device may comprise force sensing capabilities, described further herein, that provides an indication to the system of how much force is applied by the rescuer, upon compression as well as decompression. Once a threshold level of force is reached (e.g., 150-200 pounds of force for certain instances), the system may inform the rescuer that the compression or decompression force is too high. However, different patients will often have different thresholds (e.g., an older patient compared to a younger patient, healthy versus those having fragile bones). Such a threshold may be a preset value stored in memory, pre-configured by a user or, because patient compliance may vary widely from person to person, may be an adjusted threshold, for example, based on a comparison to calibrated baseline or time-averaged levels of the patient. Alternatively, the threshold may be a value determined from the patient's classification and medical condition, for example, according to a predefined state or employer protocol. Or, the feedback for informing a rescuer that the force applied to the patient may be excessive may be based on a rate of change in the force applied in conjunction with the amount of applied force.

During the time-course of a resuscitation, the patient's chest wall will "remodel" as a result of the repetitive forces applied to the chest wall—sometimes exceeding 100 lbs of force needed to sufficiently displace the sternum for adequate blood flow—and the resultant repetitive motion. Chest compliance will typically increase significantly as the sternum/cartilage/rib biomechanical system is substantially flexed and stressed. Thus, the amount of force needed to displace the sternum to the proper compression and decompression depths will also change significantly. During the course of chest wall remodeling, the anterior-posterior diameter—the distance between the sternum and the spine—will also frequently alter substantially, meaning the neutral position is subject to change over the course of the resuscitation, as noted above. An accurate measure of the neutral position is needed at all times during the course of the resuscitation; thus, taking an initial position measurement at the beginning of the resuscitation and assuming a constant neutral position over the course of the resuscitation will not be sufficient to generate accurate estimations of the motion parameters of the CE, CN, DE and DN phases of the compression cycle. For instance, it is of particular value to be able to measure the motion parameters and forces delivered during the DE phase and CN phases independently from each other and to the exclusion of the CE and DN phases.

ACD systems may use a chest compression device, which comprises a force sensor, such as one or more of the chest compression device implementations described herein, interposed between the rescuer's hands and the patient's sternum, where compressions are being delivered, for example, to monitor the relaxation phase of the chest compression. However, the sternal force for a chest compression does not correlate to blood flow, nor does it correlate with sternal motion or chest wall dynamics. Each patient requires a unique amount of force to achieve the same compression of the sternum and the cardiopulmonary system due to the widely varying compliances of individual patients' chests. Further, it is preferable for force sensing to be combined with motion sensing, at least, to sense motion of the sternum, which is a key parameter for understanding the quality of chest compressions delivered and the amount of venous return.

The above discussion highlights the delicate nature of providing ACD therapy, calling for a feedback system with processing circuitry that is configured to identify the occurrence of active compression and decompressions applied to the patient in need of acute care and provide appropriate feedback based on signals from the motion sensor and/or the force sensor of the chest compression device. As discussed, during the decompression phase (non-elevated and elevated), while it may be desirable to reach a sufficient release velocity to beneficially generate a reduced level of intrathoracic pressure, it may be preferable that the upward force applied to the chest in efforts to achieve such release velocities not be so vigorous such that excessive levels are achieved that would result in harm to the patient. Accordingly, the system may provide appropriate feedback for a caregiver based on calculated estimations of force applied to the patient to adjust (e.g., decrease applied force, increase applied force, maintain applied force) the delivery of ACD therapy. Further discussion of the various types of ACD feedback that may be provided to a caregiver is described in "Active Compression Decompression Cardiopulmonary Resuscitation Chest Compression Feedback", filed as U.S. Patent Application No. 62/402,688 on Sep. 30, 2016, and is incorporated by reference herein in its entirety.

Any suitable motion sensor(s) may be incorporated in embodiments of the present disclosure, such as accelerometers, velocity sensors, ultrasonic sensors, infrared sensors, other sensors for detecting displacement. Signals from the motion sensor(s) may be used to estimate chest compressions depth, velocity and rate during CPR. For example, a chest compression device may incorporate an accelerometer contained in a housing placed on the chest of the patient at an anterior position, typically above the sternum. In such instances, the measured acceleration relative to the chest is twice integrated to determine chest displacement which is used to assess chest wall displacement (e.g., depth and rate of compressions), or integrated once to determine velocity (e.g., release velocity). Examples of methods used to integrate acceleration signals to estimate chest compression parameters are described in U.S. Pat. No. 9,125,793, entitled "System for determining depth of chest compressions during CPR" and U.S. Pat. No. 7,429,250, entitled "CPR Chest Compression Monitor and Method of Use," each of which is hereby incorporated by reference in its entirety.

In certain examples, the motion sensors may be single axis or multiple axis accelerometers. Single axis accelerometers may be used to determine chest compression parameters (e.g. depth, rate, velocity, timing, etc.) by measuring and/or providing signals that assist in determining acceleration, velocity and/or displacement. Multi-axis accelerometers, e.g. a three-axis accelerometers, may be able to provide signals that further determine relative orientation of their respective electrode assemblies by measuring parameters indicative of motion along each axis, in addition to determining chest compression parameters. The motion sensor may also comprise a gyroscope for determining orientation of the sensor (and, in some cases, the electrode assembly) by way of tilt or rotation. In additional examples, two or more accelerometers may be arranged orthogonally with respect to each other, to determine electrode and/or chest acceleration in multiple orthogonal axes. Generally speaking, while an accelerometer senses acceleration or gravity, motion or displacement of the accelerometer can be determined through a series of calculations (e.g., double integration, etc.) known to those of skill in the art.

However, such measurements may contain errors that cannot be accounted for using motion sensing alone, for example, error due to movement of a surface under the patient, patient motion and/or movement during transport, etc. As one example, if the patient is lying on a soft compressible surface, such as a mattress, the measured displacement will include not only the compression into the chest but also the depth of the deformation of the compressible surface. This can lead to an overestimation of compression depth. As another example, if the patient is in a moving ambulance the outside motion may further affect the compression measurements and contribute to error in estimating compression depth. Or, the chest compressions may cause the compliance of the chest to change, for example, due to the occurrence of chest remodeling, broken ribs, collapsed lung, etc., which can ultimately affect chest compression depth calculations. For example, such occurrence may lead to inaccuracies or may change the target depth. Moreover, the patient may have a compressible transition layer located on the anterior of the chest, for example, due to excessive fat, clothing/bandages adhered to the skin, or other non-removable layers that would otherwise lead to erroneous chest compression depth calculations. In such an instance, the chest compression depth may be inaccurate (e.g., overestimated, underestimated) if displacement related to compression of the non-removable layers is unnecessarily figured into the overall chest compression depth measurement algorithm.

As discussed herein, survival rates would likely increase for acute care patients if caregivers were equipped with one or more chest compression devices that exhibit force sensing capabilities. While feedback associated with motion sensing in chest compression devices has been advantageous to increase patient survival, it would be expected that feedback employing force measurements would further enhance the quality of CPR. For instance, a force sensing chest compression device would be able to sense compressive contact and, hence, identify at what point chest compressions have begun. That is, the system may be able to determine whether a chest compression has started or stopped based on force signals recorded from the chest compression device.

When the system has detected that a chest compression has been initiated, signals from the motion sensor (e.g., acceleration signals) may be processed to calculate the displacement of the chest compression device and, hence, estimate chest compression depth in a more accurate manner. Such precision in compression depth measurement may be particularly beneficial when measuring compressions at relatively shallow depths, in cases such as for small patients (e.g., pediatric, infant, neo-natal). While the AHA guidelines may recommend chest compression depths within a range of between 2.0 and 2.4 inches, it may be more preferable for caregivers administering chest compressions to significantly smaller (younger) patients to compress at depths, for example, of less than approximately 1.0-1.5 inches or approximately one third of the chest anterior-posterior distance, in accordance with recommendations provided by the AHA. Accordingly, it may be important for chest compression devices to be able to detect chest compression parameters, such as depth and rate, more accurately than that which had previously been the case. In some embodiments, discussed further below, upon detecting that a chest compression has begun, the system may further make a determination of whether a compressible transition layer is present on the anterior of the patient. If such a layer is present, then the chest compression depth estimation may begin at an even later point during the compression.

As noted above, the force sensor(s) of the chest compression device may exhibit varying resolution over certain dynamic force ranges. In various embodiments, one or more force sensors may be employed to exhibit certain degrees of resolution over particular force ranges, depending on the type of information to be detected. As provided herein and understood by those skilled in the art, the resolution of a sensor is the smallest change that the sensor is able to detect in the quantity that it is measuring, and is an indication of the sensitivity or smallest reliable measurement of the sensor. Such resolution may be quantified as the least significant measurement (LSM) of the unit that is being measured. For instance, a sensor having a high resolution has a LSM that is lower than the LSM of a comparatively low resolution sensor. Accordingly, the force sensor(s) of the present disclosure may exhibit different degrees of resolution depending on the range of force that is being measured. The differences in resolution will depend on the desired use of the force sensor(s).

As an example in the application of chest compressions during administration of CPR, it may be desirable for the system to determine whether contact has been established with the chest compression device, or whether a chest compression has been initiated. For such a determination in detecting the beginning of a chest compression and/or detecting whether contact had been made with the chest compression device, the force sensor(s) may exhibit a relatively high resolution (i.e., highly sensitive) over a small force range. For instance, the range of force over which the initiation of a chest compression may be detected may be approximately between 0.1-10.0 lb, although, it can be appreciated that other ranges of force for chest compression detection may be possible. Because the dynamic range of force detection is so small, the LSM of force (or weight) may also be small, for example, within 1.0 lb or less (e.g., 0.001-1.0 lb).

In another example having to do with chest compressions, the system may be configured to detect the presence of a compressible transition layer located on the anterior of the patient, such as whether an excessive amount of fat or fabric is present on the sternum, which could otherwise lead to inaccurate estimations of chest compression depth. As further discussed herein, the detection of a compressible transition layer may involve processing of motion and force information. Accordingly, the force sensor(s) may also exhibit a relatively high resolution (although perhaps not as high resolution is required as when detecting whether a chest compression is beginning) over a slightly greater force range. For instance, the range of force over which a compressible transition layer may be detected may be approximately between 0.5-5.0 lb, although, other ranges of force for detecting compressible transition layers may be possible. As the dynamic range of force detection for such an application is relatively small, hence, the LSM of force may also be small, for example, within 1.0 lb or less (e.g., 0.001-1.0 lb). While the range of force for detecting a compressible transition may be larger than that for detecting the initiation of a chest compression, the resolution may be similar in magnitude, or in other embodiments, the resolution may differ.

Continuing to refer to chest compressions for CPR, as the chest compression moves further down toward and into the body of the patient, the system may be configured to process motion and/or force information and output an estimated chest compression depth and/or chest compliance, in providing appropriate CPR feedback for a user. Here, the dynamic force range for estimating chest compression depth may be greater than that of the previous two examples, and the resolution of the force sensor(s) may be comparatively less, as such high resolution is not required since the forces during sternal compression are so high. That is, to accurately calculate chest compression depth, compliance and/or other parameter(s), the chest compression device should be able to detect force over the entire range of force in which chest compressions are applied to the patient, with less importance ascribed to resolution. For example, the range of force over which chest compression depth may be estimated may be approximately between 1.0-200.0 lb, although, it should be understood that other ranges of force for estimating chest compression depth may be possible. As the dynamic range of force detection for determining chest compression depth is wide, the LSM of force may be relatively large, for example, within 10.0 lb or less (e.g., 0.5-10.0 lb).

In certain embodiments, the force sensor(s) may exhibit a first sensor resolution having a LSM of less than 1.0 lb (e.g., 0.001-1.0 lb, 0.01-1.0 lb, 0.1-1.0 lb) over a first force range (e.g., 0.1-10.0 lb, 0.1-5.0 lb, 0.1-1.0 lb). The force sensor(s) may also exhibit a second sensor resolution having a LSM (e.g., 0.1-10.0 lb, 0.5-10.0 lb, 1.0-10.0 lb) over a second force range (e.g., 1.0-200.0 lb, 5.0-200.0 lb). In some examples, the second LSM is greater than the first LSM, for example, greater by 2 or more times (e.g., greater by 3 or more times, greater by 4 or more times, greater by 5 or more times, greater by 10 or more times, greater by 15 or more times, greater by 20 or more times, greater by 30 or more times, greater by 40 or more times, greater by 50 or more times, greater by 60 or more times, greater by 70 or more times, greater by 80 or more times, greater by 90 or more times, greater by 100 or more times, etc.). Accordingly, the first resolution of the force sensor(s) over a relatively small initial range of force (e.g., in detecting the initiation of a chest compression) may be greater than the second resolution of the force sensor(s) over a comparatively larger dynamic force range (e.g., in estimating chest compression depth into the sternum).

In various embodiments, a single sensor for measuring force (e.g., single sensor output) may exhibit multiple resolutions of force measurement over different dynamic ranges of force. Alternatively, multiple sensors for measuring force (e.g., multiple sensor outputs) within a single chest compression device may be employed where each of the sensors for measuring force exhibit a respective resolution of force measurement over a corresponding dynamic force range. As a result, the resolution of a sensor for different dynamic force ranges may overlap, and the conversely, the dynamic force range of a sensor for different resolutions may overlap.

Figure 2:
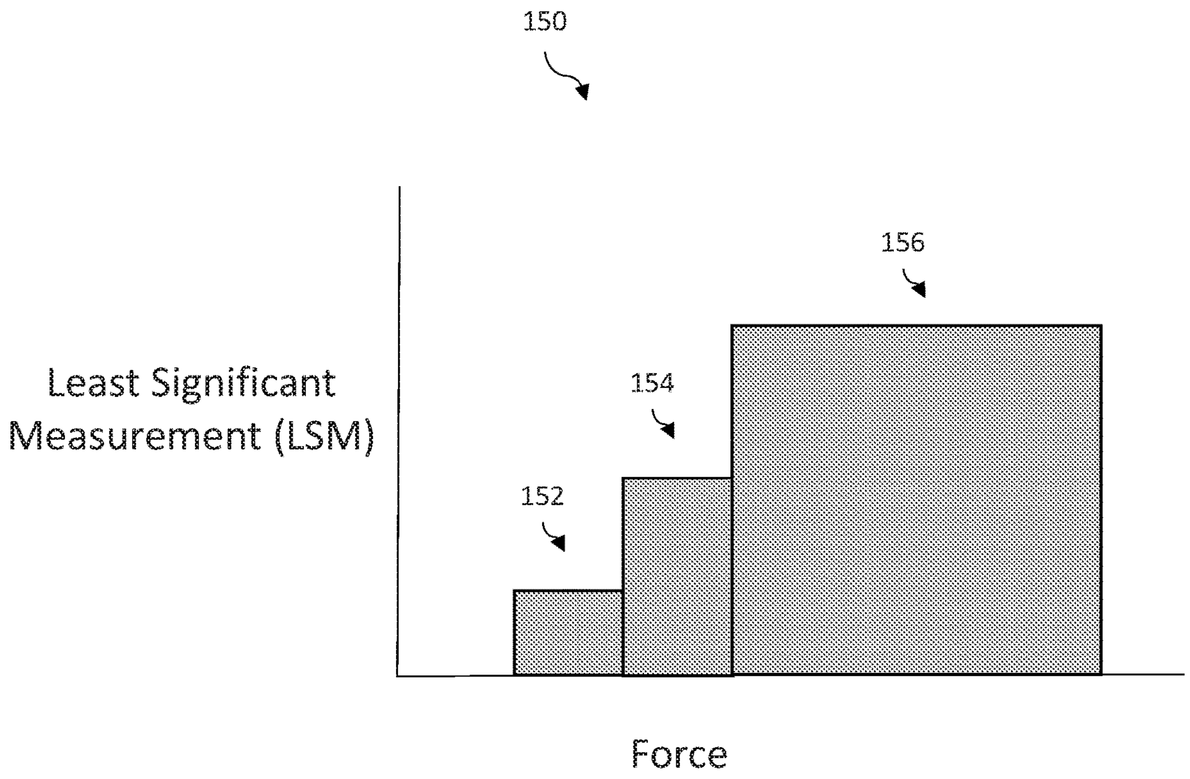
FIG. 2 is a graph illustrating an exemplary force sensor implementation exhibiting varying levels of resolution.

FIG. 2 shows a schematic graph 150 that illustrates how the resolution of the force sensor(s) of the chest compression device may vary depending on the dynamic range of force. The graph 150 includes different levels of resolution over three different force regimes 152, 154, 156 as represented by the bars. As noted above, the LSM provides quantification of the resolution of the force sensor(s) where high resolution force sensing is indicated by lower LSM values over a particular force interval, and low resolution force sensing is indicated by higher LSM values over the force interval. For instance, a force sensor having a LSM of 0.1 lb over a range of 0.1-10.0 lb has a higher resolution than a force sensor having a LSM of 1.0 lb over the same range of 0.1-10.0 lb. Similarly, a force sensor having a LSM of 5.0 lb over a range of 5.0-200.0 lb has a lower resolution than a force sensor having a LSM of 1.0 lb over the same range of 5.0-200.0 lb.

Referring back to FIG. 2, force regime 152 shows in which instance the force sensor(s) exhibits the highest resolution of the three regimes 152, 154, 156 and, hence, the finest sensitivity. This type of high resolution sensitivity in an initial force range may be desirable so as to detect the moment that a chest compression is starting and/or whether initial contact has been made with the chest compression device, e.g., so as to enhance accuracy in chest compression depth calculations.

Force regime 154 demonstrates an instance in which the force sensor(s) exhibits a lower resolution (coarser level of sensitivity) than that within the previous force regime 152. In this regime 154, the resolution within another force range may be appropriate for detecting the occurrence of a compressible transition layer on the anterior of the patient (e.g., via a force-depth relationship or chest compliant relationship), such as whether an excessive amount of fat, bandages, clothing, etc. is present, e.g., which may also be useful to improve the accuracy of estimating chest compression depth.

Force regime 156 shows an example where the force sensor(s) exhibits an even lower resolution (coarsest level of sensitivity) than that within the previous force regimes 152, 154. This relatively low resolution may be sufficient for measuring chest compliance (for estimating chest softening, likelihood of injury, amongst other things) as well as calculating the chest compression depth during CPR. In this regime 156, the dynamic force range is large compared to the other regimes 152, 154. In general, chest compliance may be determined using information from both motion and force sensors, and chest compression depth may be calculated by appropriate mathematical integration of acceleration values.

While FIG. 2 shows three distinct force regimes in which the resolution of the one or more force sensors appear to vary, it should be appreciated that the force sensor(s) described herein may exhibit any suitable number of different resolutions. For example, the resolution of the force sensor(s) may vary within 2 force regimes, 3 force regimes, 4 force regimes, 5 force regimes, 6 force regimes, 7 force regimes, 8 force regimes, 9 force regimes, 10 force regimes, etc., or may be the same or substantially similar within multiple force regimes. In various embodiments, in accordance with one or more force regimes, the resolution of one or more force sensors of the present disclosure may have a LSM of between 0.001 lb and 1.0 lb, between 0.01 lb and 1.0 lb, between 0.1 lb and 1.0 lb, between 0.001 lb and 0.1 lb, between 0.001 lb and 0.01 lb, between 0.01 lb and 0.1 lb, or between 0.001 lb and 1.0 lb, for a force range of between 0.1 lb and 1.0 lb, between 0.1 lb and 2.0 lb, between 0.1 lb and 3.0 lb, between 0.1 lb and 4.0 lb, between 0.1 lb and 5.0 lb, between 0.1 lb and 6.0 lb, between 0.1 lb and 7.0 lb, between 0.1 lb and 8.0 lb, between 0.1 lb and 9.0 lb, between 0.1 lb and 10.0 lb, or another appropriate force range. Alternatively, the resolution of one or more force sensors of the present disclosure may have a LSM of between 0.1 lb and 10.0 lb, between 0.5 lb and 10.0 lb, between 1.0 lb and 10.0 lb, between 0.1 lb and 5.0 lb, between 0.5 lb and 5.0 lb, between 1.0 lb and 5.0 lb, or between 5.0 lb and 10.0 lb, for a force range of between 1.0 lb and 300 lb, between 5.0 lb and 300 lb, between 10.0 lb and 300 lb, between 50.0 lb and 300 lb, between 1.0 lb and 200 lb, between 5.0 lb and 200 lb, between 5.0 lb and 200 lb, between 10.0 lb and 200 lb, between 50.0 lb and 200 lb, between 1.0 lb and 100 lb, between 5.0 lb and 100 lb, between 10.0 lb and 100 lb, between 50.0 lb and 100 lb, or another appropriate force range. In another embodiment, the resolution of one or more force sensors may have a LSM of between 0.001 lb and 1.0 lb, between 0.01 lb and 1.0 lb, between 0.1 lb and 1.0 lb, between 0.001 lb and 0.1 lb, between 0.001 lb and 0.01 lb, between 0.01 lb and 0.1 lb, or between 0.001 lb and 1.0 lb, for a force range of between 0.5 lb and 5.0 lb, between 0.5 lb and 6.0 lb, between 0.5 lb and 7.0 lb, between 0.5 lb and 8.0 lb, between 0.5 lb and 9.0 lb, between 0.5 lb and 10.0 lb, or another appropriate force range. Other embodiments of force sensors described herein may perform according to desired levels of resolution for other force ranges. And, as noted herein, the force sensor(s) may exhibit a particular resolution for a one dynamic force range, and different resolution for another dynamic force range. In certain embodiments, the range of resolution and force range are not mutually exclusive, and may overlap. For example, the force sensor(s) may exhibit a resolution with a LSM of less than 1.0 lb (e.g., between 0.001 lb and 1.0 lb) within a dynamic force range of between 0.1 lb and 10.0 lb, and may have a resolution with a LSM of between 0.5 lb and 10.0 lb within another force range of between 10.0 lb and 200 lb. Or, the LSM over a first force range may differ from the LSM over a second force range. For example, the resolution for a first force range (e.g., between 0.001 lb and 1.0 lb) may be greater than the resolution for a second force range (e.g., between 10.0 lb and 200 lb). Hence, the LSM of the second force range may be greater than the LSM of the first force range by at least 1.5 times, at least 2.0 times, at least 2.5 times, at least 3.0 times, at least 3.5 times, at least 4.0 times, at least 4.5 times, at least 5.0 times, at least 6.0 times, at least 7.0 times, at least 8.0 times, at least 9.0 times, at least 10.0 times, at least 20.0 times, at least 30.0 times, at least 40.0 times, at least 50.0 times, at least 60.0 times, at least 70.0 times, at least 80.0 times, at least 90.0 times, at least 100.0 times, etc. Various implementations of such characteristics are described further herein.

Chest compliance is the mathematical description of the tendency to change shape as a result of an applied force. Chest compliance is the inverse of stiffness. Chest compliance is the incremental change in depth divided by the incremental change in force at a particular instant in time. In some implementations, the system determines (e.g., calculates) a chest compliance relationship that may then be used to in ultimately providing appropriate feedback to the user. For example, the system may calculate a mathematical relationship between two variables, such as displacement and force, related to chest compliance. The system may then identify one or more features of this relationship to determine information about the patient and/or CPR treatment. Once the information about the patient and/or CPR treatment is determined, the system can determine the appropriate type of feedback to provide to the user, e.g., feedback about the progress of the CPR treatment, feedback related to the state of the patient, feedback related to the presence of a compressible transition layer on the patient, feedback related to chest compression depth when in the non-elevated portion of the chest compression cycle, feedback related to the force when in the elevated portion of the chest compression cycle, etc.

Figure 3A:
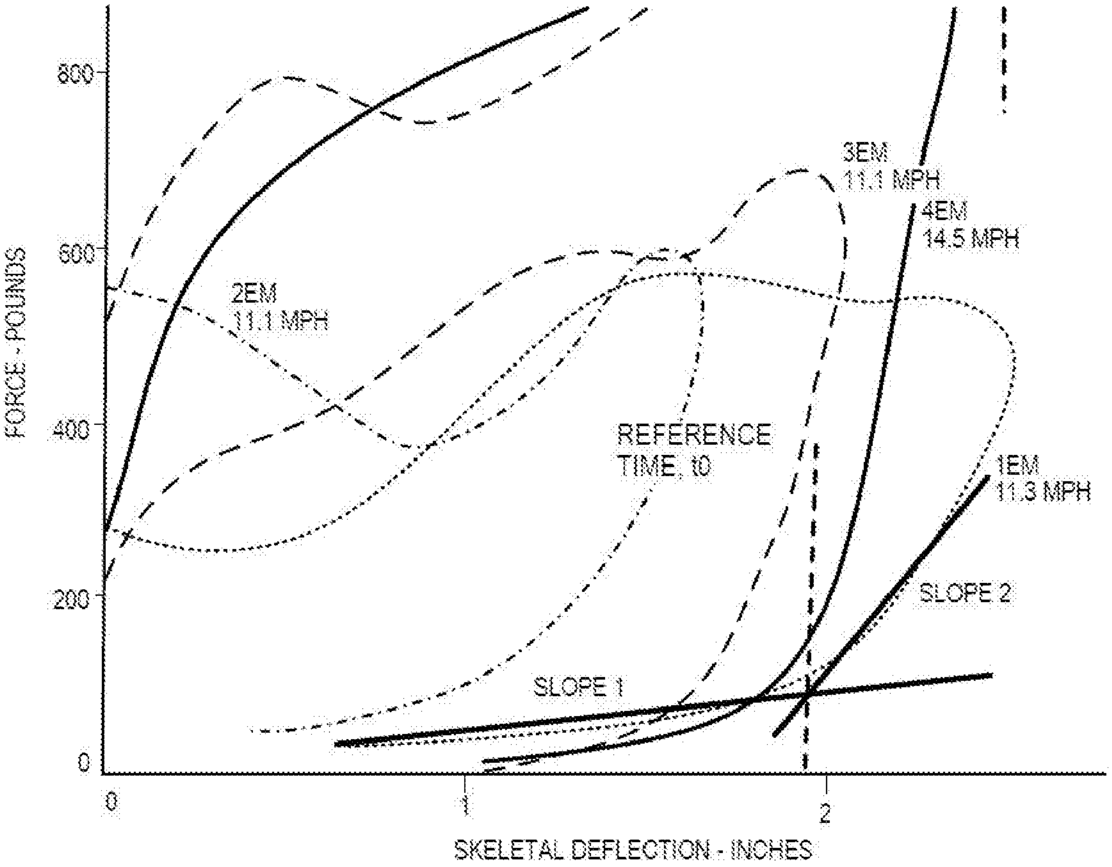
FIG. 3A shows a graph of multiple stiffness curves during the course of chest compressions.
Figure 3B:
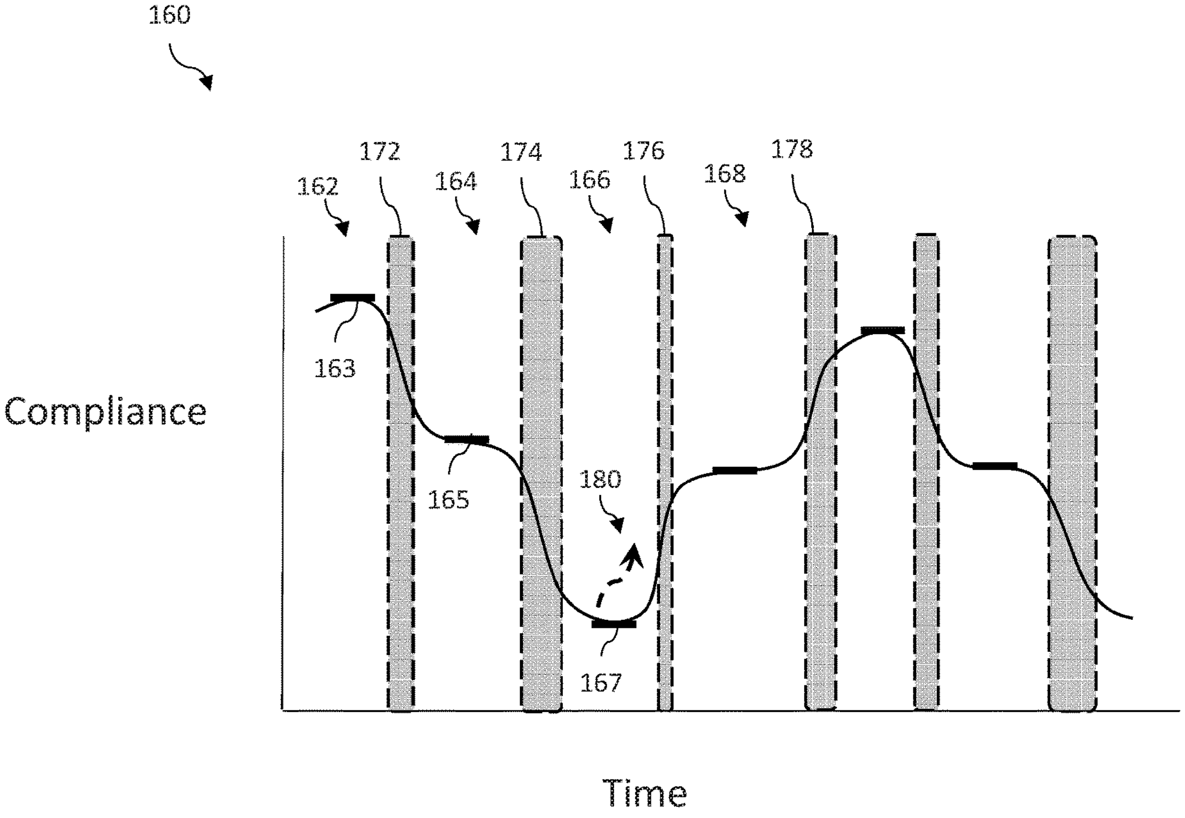
FIG. 3B is a graph illustrating an exemplary chest compliance relationship measured over time during an instance of a caregiver administering chest compressions.

In some implementations, the chest compliance relationship can be thought of or represented as a curve, such as a curve of a graph representing the relationship, an example of which is shown in FIG. 3B. In some implementations, the chest compliance relationship can be stored as data such as a table of measured values (e.g., values for displacement and force at multiple time indices). For each point in time, n, for which a displacement measurement is taken by the system, a force measurement is also taken, resulting in a displacement/force vector-pair for each sample time n, $[d_n, f_n]$. In general, compliance, c, equals the change in displacement divided by the change in pressure, compared to a reference time point: $c=\Delta d/\Delta p$.

"Instantaneous Compliance" (IC) refers to when the reference time point, to, is adjacent or nearly adjacent to the time point, $t_n$, and is thus more a measure of the slope of the displacement-force curve, at a particular point in time. For instance, the reference time point, to, may be the sample time point immediately preceding time, $t_n$. The reference time point may be composed on multiple sample points immediately preceding time, $t_n$, for instance using a moving average, weighted moving average or low pass filter, known to those skilled in the art. There may be a small gap in time between the reference time point and time, $t_n$, for instance 1 second or less. In some versions, the reference time point may be chosen to be the beginning of a segment, for instance the beginning of the compression for Slope 1 (the first segment in the compression, and thus the segment start is also the compression start) in FIG. 3A or the dotted line for reference time $t_0$ for Slope 2 in the same figure.

$$\text{Instantaneous Compliance } InC_n=|(d_n-d_r)/(p_n-p_r)|$$

Where $InC_n$ is the estimate of the slope of the distance/pressure curve at a point in time, $t_n$; $d_n$ is the displacement at time, $t_n$; $p_p$ is the pressure at time $t_n$; and $d_r$ and $p_r$ are the distance and pressure at the reference time, $t_r$, respectively.

"Absolute Compliance" (AC), on the other hand, refers to when the reference point, to, uses an absolute reference such as the pressure and displacement at the very start of a group of chest compressions. During CPR, there may be what are termed "rounds" of chest compressions which are periods of approximately 1-3 minutes where chest compressions are delivered, and then at the end of the time period, compressions are halted and various other therapeutic actions may be performed, such as analyzing the patients ECG, delivering a defibrillation shock or delivering a drug such as epinephrine or amiodarone. Thus for determination of AC, reference point, to, prior to the beginning of any of the rounds of chest compressions, including prior to the first round of compression, i.e. at the beginning of CPR. In most instances, the pressure will be zero at this point in time, and the displacement will be effectively calibrated to zero by the displacement estimation software. The Absolute Compliance of the chest can be estimated from the compression displacement and the related compression pressure. The reference pressure "$p_0$" is the pressure at time, to, and chest displacement "$d_0$" is the displacement at time, to. The pressure "$p_n$" is the pressure required to achieve the displacement "$d_n$." The chest compliance is estimated from the following equation:

$$\text{Absolute Compliance}=|(d_p-d_0)/(p_p-p_0)|$$

Where $d_p$ is the displacement at the peak of the compression and $p_p$ is the pressure at the peak of the compression.

FIG. 3A shows representative stiffness curves and regions of interest for sternal impact for different subjects. Referring to this figure, the slopes of the representative curves are the stiffness (e.g., the inverse of compliance). Each of the loops is the curve for a different subject. Slope 1 in FIG. 3A is the stiffness for the CN phase (described above as non-elevated compression) of the compression; it is a lower slope value and less stiff (and thus higher compliance). Though the slopes for the CN phase of compression for each subject varies as seen in the multiple loops in the figure, in most if not all cases, there will be a change in slope to a second, steeper slope (lower compliance, and more stiff) at some inflection point during the compression, represented by the shift to Slope 2.

At the inflection point represented by the intersection of the two lines, Slope 1 and Slope 2 in the figure, the risk of fracturing is still relatively low. Once the inflection point has been detected, the system can prompt the rescuer to maintain that compression depth, as it is still in the safe range. This patient-specific compression depth will likely be different that AHA/ILCOR Guidelines (e.g. more than 2 inches). For instance, initially at the start of resuscitation efforts, the patient's chest may be much stiffer, particularly for elderly patients, where their sternal cartilage attaching the sternum to the ribs has calcified and stiffened. If the rescuer were to try and deliver compressions at a depth recommended by the AHA/ILCOR Guidelines, they would likely cause rib fractures in the patient. In fact, in the Guidelines statement themselves, it is acknowledged that rib fractures are a common occurrence using existing chest compression methods. "Rib fractures and other injuries are common but acceptable consequences of CPR given the alternative of death from cardiac arrest." (From the 2005 International Consensus Conference on Cardiopulmonary Resuscitation and Emergency Cardiovascular Care Science with Treatment Recommendations, hosted by the American Heart Association in Dallas, Texas, Jan. 23-30, 2005.) Aside from the discomfort of the nosocomial rib fractures, an unfortunate side effect of the rib fractures is that they result in reduced resilience of the chest wall and thus a reduction in the natural recoil of the chest during the decompression phase resulting in a reduced venous return and degraded chest compression efficacy. It is desirable to minimize or eliminate rib fractures for these reasons. By detecting changes in the chest wall compliance, and prompting the rescuer as a result of those detections, chest compression depth will not exceed the injury threshold of ribs and sternum.

Because the neutral position as well as the overall compliance of the chest varies over the course of the resuscitation effort, the depth to which the rescuer is being guided by the real-time prompting of the system will also vary using this approach. A phenomena known as chest-wall remodeling occurs during the initial minutes subsequent to the initiation of chest compressions. AP diameter may decrease by as much as 0.5-1 inch, and compliance of the chest wall will increase as the sternal cartilage is gradually softened. By staying within the safety limits in a customized fashion for each individual patient for each compression cycle as the chest gradually softens, injuries are reduced, but more importantly, the natural resilience of the chest wall is maintained and more efficacious chest compressions are delivered to the patient.

Generally speaking, methods for detecting the change in slope can include determining initial statistical characteristics of the slope of the CE phase, and then analyzing the slope for any significant, sustained increase in slope. For instance, techniques can be used such as change point analysis such as that described by Basseville (Basseville M, Nikiforov IV. Detection of Abrupt Changes: Theory and Application. Englewood, N.J.: Prentice-Hall 1993) or Pettitt (Pettitt A N) A simple cumulative sum type statistic for the change point problem with zero-one observations. (Biometrika 1980; 67:79-84.) Other methods such as Shewhart control charts may be employed for first detecting changes in the slope and then assessing whether the change detected is both an increase and of a sufficient magnitude to generate a prompt to the rescuer indicating that the depth of compression is too deep, and in some way to compress less deeply for future compressions. In simpler versions, prompting may be initiated when the compliance decreases below some percentage threshold below the initial compliance values at the start of a particular compression, e.g. 15% reduction in compliance. The initial compliance value may be averaged over more than one compression phase; it may be used as a comparative value for multiple compression cycles.

Chest compliance is also described in U.S. Pat. No. 7,220,235, entitled "Method and Apparatus for Enhancement of Chest Compressions During CPR," issued May 22, 2007, and is hereby incorporated by reference in its entirety. Compression velocity and displacement can be estimated via such methods as described in U.S. Pat. No. 6,390,996, entitled "CPR Chest Compression Monitor," which is hereby incorporated by reference in its entirety.

In some examples, the feedback about the CPR treatment can comprise and/or employ information about the patient such as a neutral position of chest compression, whether the patient has an excessive amount of adipose tissue, if the patient is wearing a substantial amount of clothing, if the patient has or is at risk of suffering injury, amongst other information. The system can determine such information (e.g., calculate an estimated neutral position of chest compression) based on data such as estimated depth of chest compression and estimate of chest compliance. The calculation can be based in part on a feature of a compliance relationship as described below in further detail with respect to the graph 160 of FIG. 3B.

In the case of a chest compression cycle, the compliance may be plotted with time on the abscissa as shown in FIG. 3B. The graph 160 of FIG. 3B shows a number of regions 162, 164, 166, 168 where the patient may exhibit distinct differences in chest compliance during a series of chest compressions. In particular, regions 162, 164, 166, 168 indicate where the chest compliance of the patient is relatively constant whereas regions 172, 174, 176, 178 are areas in between regions 162, 164, 166, 168 where the chest compliance is undergoing a substantial change, for example, due to a transition in material properties of the patient during the course of compression. Such behavior in chest compliance may be useful for the system to identify so as to provide appropriate feedback. The compliance threshold(s) for detecting the initiation of a compression, the presence of a compressible transition layer and/or other patient-related features will vary from patient to patient, and so to identify particular regions of interest of the compliance curve, it may be preferable to obtain additional compliance information, such as the rate of change of compliance. Accordingly, for some embodiments, along with instantaneous compliance, the system determines a rate of change of compliance via a suitable derivative calculation.

As further shown in FIG. 3B, the system may identify regions 162, 164, 166, 168 of the compliance curve where the compliance begins to level off, or is substantially constant, separated by regions 172, 174, 176, 178. This may be determined, for example, by setting a threshold range within which the absolute value of the first derivative falls. Hence, the system may detect the presence of a plateau in compliance by determining when the absolute value of the first derivative of compliance is below a threshold level. In some cases, such a threshold level may be a predetermined value stored in memory, or may be determined once a baseline calibration over a series of initial compression cycles has been performed. Or, in some cases, a second derivative of compliance may be calculated so as to identify an inflection point at which the rate of change of the slope of compliance is beginning to decrease. Once a substantially constant region 162, 164, 166, 168 of chest compliance has been identified, and distinguished from other regions 172, 174, 176, 178 where compliance is subject to change, the system may employ the appropriate type of feedback.

For instance, region 162 of FIG. 3B depicts compliance during the initiation of a chest compression. Here, the compliance is relatively high as compared to the compliance during other portions of a chest compression cycle. Region 162 is also characterized by a substantially constant compliance, as indicated by the horizontal line 163 where the first derivative of the compliance curve is approximately 0. This relatively high and constant value of compliance may be due, for example, to the presence of a soft, highly compressible transition layer on the anterior of the patient, such as clothing, bandages, large amounts of adipose tissue, or another substantially pliable material. Though, for purposes of providing chest compression feedback, the presence of a highly compressible layer (e.g., excessive fat, thick clothing/fabric, etc.) may lead to inaccuracies in calculating chest compression depth where non-sternal displacement is improperly tracked as compression depth. That is, when such a highly compressible layer is present, it may be more accurate for the chest compression depth to be calculated at a later point during chest compression, once the compressible layer has been adequately pushed aside and/or compressed to a relatively stiff state, and upon reaching the sternum of the patient.

Based on the above discussion, the system 1 may detect the initiation of a chest compression upon sensing that the instantaneous compliance has reached a suitable threshold. However, while reaching a particular threshold may be sufficient for the system to detect the initiation of a chest compression, for example, within region 162 of the compression cycle, the system may determine that the compliance is still too high for accurately estimating chest compression depth. For instance, an obese patient may have a thick layer of soft adipose tissue that would first need to be compressed to a higher stiffness or pushed aside before using motion information from the chest compression device to calculate compression depth. Accordingly, by processing information gathered from the motion and force sensor(s), the system may identify the presence of such a compressible transition layer. Though, during region 162, because of inaccuracies that may be introduced due to the presence of the compressible transition layer, the system may refrain from calculating or otherwise displaying chest compression depth estimations. A measure of peak compliance may also be indicative that the chest compression is at a neutral position (generally corresponding to the natural resting position of the chest), where chest compliance tends to be at its highest point.

FIG. 3B further depicts how compliance in the graph 160 decreases from region 162 to region 164 as compression continues further into the patient toward the sternum. Once the measured compliance has reached a lower level of substantially constant compliance, as indicated by the horizontal line 165 in region 164, the system may determine that the compression has reached the sternum. Similar to the discussion above, such a determination may be made, for example, by setting a threshold range within which the absolute value of the first derivative of compliance falls and, hence, identifying where the compliance curve levels off to become substantially constant. As noted above, once this region 164 is identified, the system may begin to use motion information derived from the chest compression device to calculate compression depth more accurately than would otherwise be the case, for example, than if compression depth was estimated from the initiation of compression with a compressible transition layer present. The calculated compression depth during the appropriate compression regime 164 may then be used to provide appropriate feedback for a user. FIG. 3B shows region 164 to be a desired regime where chest compression depth may be accurately measured, separated by regions 172, 174 where the rate of change of compliance is significant. Accordingly, while the compliance remains within this region 164, signals from the motion sensor(s) may be used to calculate chest compression depth.

In various instances, the patient may not have an appreciable compressible transition layer, for example, the patient may be skinny (absent an excess amount of adipose tissue on the anterior chest) and the patient's clothing may have already been removed therefrom. As a result, an exemplary graph of compliance with time (not shown in the figures) may not necessarily have a region 162 where such high levels of compliance are detected. Instead, absent such a soft compressible transition layer, only regimes similar to regions 164, 166, 168 may be present upon initiation of a chest compression. Hence, the system may sense the start of a chest compression and, if the compliance immediately reaches an appropriate threshold (e.g., predetermined compliance threshold), indicative of the proper location at which sternal displacement begins, the system then immediately initiates the algorithm for calculating chest compression depth. Alternatively, the system may be able to determine the current compliance regime of the chest compression(s) based on the shape of the compliance waveform. For instance, during the course of compressions, the system may recognize three relatively flat regions (e.g., by first derivative calculations) in the compliance curve and determine that a compressible transition layer exists, or the system may recognize only two relatively flat regions and determine that a compressible transition layer does not exist or is negligible.

As compression progresses even further into the patient, the body becomes increasingly stiff, resulting in a relative decrease in patient compliance. FIG. 3B shows how compliance in the graph 160 decreases even further from region 164 to region 166 (crossing a significant change in compliance denoted by region 174) with the application of additional force. Generally speaking, the deeper the compression, the greater amounts of force will be required to push further into the patient. Though, the body will only be able to sustain forces up to a certain point before injury (e.g., rib/bone fracture, organ crushing, etc.). Hence, patient compliance will come to a lower limit before reaching a breaking point.

In certain implementations, once the system has detected that the measured compliance has reached a minimum compliance (e.g., identifying a substantially constant compliance from a first derivative calculation, indicated by horizontal line 167), the system may provide an indication that the patient may be at risk of injury. That is, when the system detects the patient compliance to be approaching a lower limit, it may be beneficial to warn the rescuer that the patient is susceptible to injury to provide the rescuer with the option of whether to lessen the force at which compressions are being applied. Or, if the chest compression depth is within a desired range, or even slightly deeper than the recommended range, it may be desirable for the rescuer to decrease the amount of compressive force on the patient. However, if the chest compression depth is barely within or even shallower than the desired range, yet the patient compliance has reached a lower limit, then it may be more preferable for chest compressions to continue as is, or even more forcefully, risking patient injury for the sake of enhancing circulation within the blood vessels. In such a case, it may generally be preferable for the patient to experience a rib fracture or other injury if it will mean that adequate blood circulation (leading to patient survival) will be achieved. FIG. 3B further shows an exemplary divergence 180 in compliance within the region 166, indicating the occurrence of an acute event, such as an injury due to fractured rib or collapsed lung, discussed further below.

Based on the above discussion, the system may be configured to selectively provide a warning to a user that the force of compressions is excessive and/or that the patient is at risk of bodily injury. For instance, the system may prioritize blood circulation as having a greater importance than preventing patient injury. As an example, if the system determines that the quality of chest compressions is sufficient (e.g., chest compression depth and/or rate are within desired limits) and the system detects that a minimum compliance is reached (e.g., local minimum indicated by horizontal line 167, or reaching a threshold limit), the system may actively warn the user that the patient is at risk of injury. However, if the system detects the quality of chest compression to be insufficient (e.g., chest compression depth and/or rate is not within desired limits) and a minimum compliance is reached, the system may refrain from warning the user of the risk of patient injury. The intent in such a case is to first ensure that quality chest compressions are given to the patient so that a desired level of blood circulation is able to occur, despite a present risk or actual injury to the patient. Otherwise, if the quality of chest compressions does not meet adequate standards, a warning to the user that the patient may be injured may result in the user continuing to give low quality chest compressions or, worse yet, may cease applying chest compressions altogether when the patient is more likely to survive if compressions are continued.

When the caregiver has reached the end of a chest compression, the force applied to the chest decreases as the hands are released therefrom. Such release allows for the chest to naturally recoil, or in the case of active decompression, the chest is dynamically brought back toward a non-compressed state. As the chest cavity returns to its previous conformation, or similar configuration, the instantaneous compliance of the patient decreases, as indicated in region 168. As depicted in the compliance curve, the chest exhibits a reasonable degree of elasticity, although the chest may also exhibit inelastic aspects. Accordingly, chest compressions may be repeatedly delivered in a cyclical manner where the mechanical behavior (e.g., stiffness, compliance) of the chest follows a pattern similar to the example schematically illustrated by the graph 160.

Embodiments of the present disclosure may be able to provide information regarding the current state of the patient as a result of the application of chest compressions. For example, as discussed above, during the course of chest compressions, a significant amount of force may be applied to the patient. In fact, the amount of force applied to the patient may be sufficient to cause injury, such as to the ribs, lungs, thorax and/or other parts of the body. Referring back to FIG. 3B, the exemplary divergence 180 (shown by the dashed arrow) within the region 166 indicates the occurrence of an acute event, such as an injury due to broken rib, collapsed lung, chest softening or remodeling, etc. Such a divergence 180 may exhibit any appropriate shape, but is characterized by irregularity in behavior indicative of a structural failure (e.g., fracture, collapse), or other change in compliance suggestive of injury or remodeling behavior. Once the divergence 180 has been reached, the chest compliance behavior may be unpredictable. Though, in some cases, once such an acute event occurs, the chest compliance behavior may still follow a pattern similar to that depicted by the solid line curve of FIG. 3B.

In some embodiments, the shape of the anomaly in the compliance curve may be predictive of the type of injury, such as a bone fracture as compared to a collapsed organ. Accordingly, the system may provide an output that notifies the user or record station of the type of injury that the patient may have experienced.

Upon such an acute occurrence, it would be beneficial if the resuscitation system is able to detect and provide an alert or warning to the caregiver and/or other reporting station as to whether the patient has suffered injury, is likely to have suffered injury, or is at risk of suffering injury. Based on such an alert or warning, the type of resuscitation treatment may vary. For example, upon learning of such a possibility, it may be prudent for the caregiver to check the degree to which the patient has suffered the injury and whether the nature of the applied chest compressions should be suspended or altered in anyway. If the injury is serious, provided that the quality of chest compressions is maintained (e.g., falling within suitable ranges of chest compression depth/rate) it may be preferable for the chest compressions to be provided with relatively less force than that which would normally be applied, or for the technique of applying chest compressions to be changed, effectively varying the force distribution. For instance, in small pediatric patients, the force distribution may be varied by altering the position(s) at which compressions are applied (e.g., applying chest compressions using a full palm, fingers, squeezing between thumbs and fingers, widening the area of pressure distribution, etc.).

However, as noted above, despite such an indication, in the interest of maintaining blood circulation through the patient's body, it may be more prudent to continue chest compressions regardless of whether the patient has been injured. Accordingly, for some cases, it may be imperative to continue chest compressions on the patient, and so such information regarding the possibility or risk of injury may simply serve as a notification that the patient should be checked for treatment of the injury at a later time, when stabilized. Such a notification may be provided to a reporting station (e.g., hospital, remote diagnosis/records center, ambulance service, etc.) without informing the actual caregiver(s) at the scene who is performing or directing chest compressions on the patient. Withholding such information from the caregiver(s) at the scene may be beneficial for them to focus on the task at hand and not be distracted or take away from the act of giving chest compressions. Or, if the caregiver(s) are knowledgeable enough to understand that appropriate treatment (e.g., CPR, chest compressions) should not be withheld, the system may still provide the notification.

The system may comprise an appropriate output device that is configured to provide such notification(s) to alert a user and/or remote station regarding the state of the patient. The output device may further provide instructions prompting a user to continue chest compressions, check to see if the patient is injured (e.g., during desired pauses between chest compressions such as during ventilation or patient transport), increase or lessen the force of chest compressions, increase or decrease the depth of chest compressions, increase or decrease the rate of chest compressions, or another set of instructions for the user. Notifications and/or instructions may be provided in any suitable manner, such as through a visual display (e.g., textual, color coded indication, picture), audible sound (e.g., verbal instruction, tone), haptic feedback, amongst others.

Figure 4:
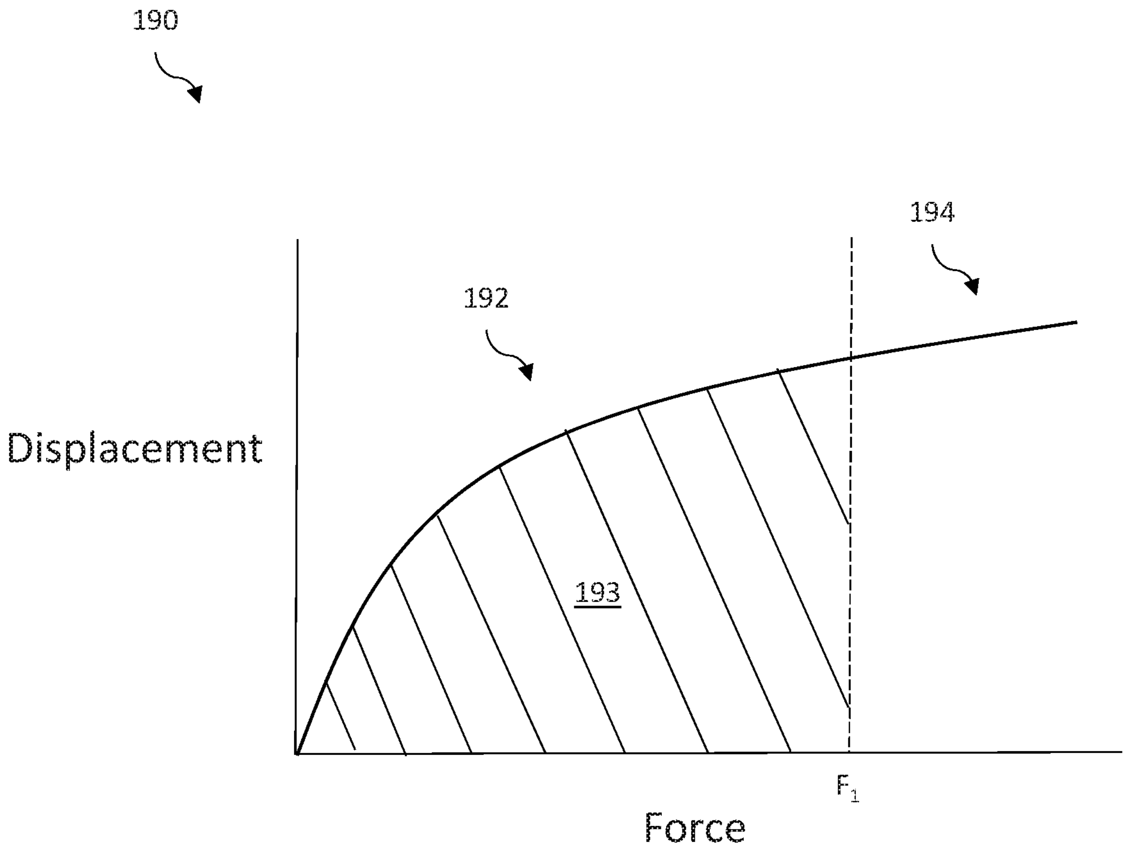
FIG. 4 is a graph showing an exemplary force-displacement relationship measured during an instance of a caregiver administering chest compressions.

It may be further advantageous to assess the amount of work that is being applied to the patient during chest compressions. Accordingly, embodiments of the present disclosure may use the calculated displacement from the motion sensor(s) and force from the force sensor(s) during chest compressions and further calculate the amount of work associated with each chest compression, as well as the cumulative amount of work expenditure during the course of a resuscitation. FIG. 4 depicts a schematic of a force-displacement graph 190 that shows the relationship of force and displacement during a chest compression. In general, as shown, the displacement increases as force is applied to the chest, however, as more force is applied, with the chest experiencing an overall decrease in compliance, the displacement begins to level off. The work applied during a chest compression is given by the area under the curve in the force-displacement relationship. The graph 190 is divided into two regions 192, 194 where the work (e.g., energy expended by the caregiver) calculated for the first region 192 up to a force $F_1$ is shown by the labeled region 193.

By assessing the amount of energy (or power) expended by the caregiver, the system may make a determination or estimate of how tired the caregiver might be by comparing the estimated amount of work performed (e.g., energy expenditure by the caregiver) to a predefined threshold. A commonly measure of energy is the Calorie (capital C). 1 Calorie is equal to 1 kilocalorie or 1,000 calories (lowercase c). In general, for some cases, 15 minutes of conventional chest compressions has been found to burn approximately 165 Calories. By measuring how long a caregiver has been performing chest compressions on the patient, the computing device or system is able to determine approximately how much energy has been exerted during the performance of chest compressions. Based on the energy expenditure, the computing device and/or system can make an approximate determination of whether a caregiver is becoming fatigued. For example, the computing device may comprise thresholds at various expenditure levels such as after 50, 100, or 150 Calories are burned. Then, in response to surpassing each of the thresholds, an indication could be provided to the caregiver. Additionally, the indications may become more prominent as the various thresholds are surpassed. Furthermore, the energy expenditure information could also be combined with processed signal information from the chest compression device to assist in determining if the quality of the of chest compressions has declined as a result of the fatigue. Or, an indication (e.g., display on a screen) could be provided to the caregiver of approximately how much energy has been expended, simply as a reference, without requiring an explicit instruction/guidance that a threshold or fatigue level has been surpassed.

Alternatively, as a preventative measure to prospectively manage rescuer fatigue, the system may have a recommended limit (e.g., pre-configured, default setting) for the amount of work that a caregiver should expend during a series of chest compressions. Fatigue has a tendency to significantly affect the quality of chest compressions, for example, if tired, the caregiver may be less likely to reach the desired chest compression depth. Or, even more commonly, when tired, the caregiver may have a tendency to lean on the patient and not release properly, which has an adverse effect chest recoil. Accordingly, it may be useful to provide chest compression feedback based on the amount of work that a particular caregiver has exerted. In addition, measured parameters, such as compression depth, rate, release velocity, and whether those parameters fall within target ranges may also be indicative of rescuer fatigue. As a result, chest compression depth, rate, release velocity, etc. may be used in combination with measurements of caregiver work to determine levels of fatigue/tiredness.

When the particular caregiver who is giving chest compressions reaches the recommended limit of energy expenditure, the system may provide feedback information for the caregiver and/or other medical personnel. For example, the system may comprise an output device having a visual and/or audio interface (e.g., display, speaker, haptic engine) that provides an indication of the amount of energy that the caregiver has expended during the course of chest compressions. Once the amount of energy has reached the recommended limit, the system may give an alert notification to the caregiver that a substantial amount of work has been done and that the caregiver might be fatiguing in a manner that could ultimately affect the quality of chest compressions. The system may further provide prompting or suggestion for the caregiver(s) to switch out so that a more well-rested caregiver can take over.

In some embodiments, the system may have multiple energy thresholds pre-stored or pre-configured in memory to provide escalating feedback for the user. For example, a first energy threshold may be useful to alert whether the caregiver might be starting to fatigue. A second energy threshold, higher than the first threshold, may be used to alert that the caregiver has expended an excessive amount of energy and may be exhausted. Accordingly, when the first energy threshold is met, the system may provide a simple warning (e.g., color change in the visual display, audio notification, etc.) that the caregiver may be likely to fatigue. Though, when a subsequent (e.g., second, third, or further) energy threshold is met, the system may provide a more conspicuous signal (e.g., loud tone, flashing screen, vibrating device, etc.) for users to switch roles in the resuscitation.

In various embodiments, the system may incorporate multiple sensors placed at different locations on the patient (e.g., at an anterior position and a posterior position of the patient), which may provide for enhanced resuscitation feedback, in some cases, improved over systems with a sensor placed at a single location on the patient. Such enhanced resuscitation feedback may comprise, for example, providing improved accuracy, detection and/or correction in determining resuscitation related parameters, such as chest compression depth, release velocity, angle of chest compressions, the presence of an error-inducing surface (e.g., compressible surface under patient, such as a soft mattress, etc.), chest compression rate and/or timing, etc. Such systems may advantageously provide improved feedback on whether chest compressions are appropriately applied and/or whether the rescuer needs to correct for error from an external source (e.g. change the surface on which the patient is placed, reduce other motion induced error, etc.).

As an example, it is common practice to place a patient on a sufficiently rigid surface (e.g., a floor, gurney, backboard, or hospital bed) prior to initiating chest compressions. However, if the patient is not provided on such a surface and is instead placed on a compressible surface (e.g., adults in hospitals are commonly treated on compressible surfaces, and mattresses for pediatric patients can be especially compressible, even more so than adult mattresses), such as a soft mattress, the rescuer may need to perform more intense work to achieve the required compression depth. As a result, the rescuer may either have difficulty achieving sufficient compression depth and/or fatigue quickly. Or, without the feedback mechanism, the rescuer may have the impression of reaching a sufficient depth without actually achieving it. Accordingly, sensors placed at both anterior and posterior locations may assist in providing more accurate determinations of chest compression depth (e.g., by subtracting displacement of anterior and posterior sensors). Such a sensor configuration may also be used to determine whether the surface on which the patient is positioned is overly soft/compressible (e.g., soft mattress as opposed to a hard floor or backboard) and, hence, may enable the system to provide a suggestion or instruction that the underlying surface on which the patient resides be changed.

In various embodiments, a sensor placed on the posterior (in addition to the anterior) of the patient may not only comprise a motion sensor, but may also incorporate force sensing capabilities. For instance, it may be beneficial to determine whether the posterior placed sensor has been placed in contact with a surface. A force sensor placed on the posterior of a patient will provide the ability for the system to identify when contact has been made between the posterior sensor and a surface. Such contact may be used by the system as a check as to whether the patient is about to receive chest compressions. Further description of advantages and configurations of multiple sensor arrangements are provided in U.S. application Ser. No. 15/282,530, filed on Sep. 30, 2016 and entitled "Dual Sensor Electrodes for Providing Enhanced Resuscitation Feedback," which is hereby incorporated by reference herein in its entirety.

As discussed herein, the present disclosure provides a number of implementations in which force sensors for providing CPR feedback may be constructed. The force sensor may be placed on the sternum of the chest, for example, beneath the hands of a caregiver during delivery of chest compressions, and signals generated from the force sensor may be processed to provide an estimate of force applied to the patient during chest compressions.

In various embodiments described further below, the force sensor may comprise a pressure sensor provided within a sealed fluid-filled enclosure, an emitter and optical detector arranged with a reflective surface, a strain gauge, a load sensor, a circuit layer having multiple electrical terminals in contact with a compliant electrically resistive layer, amongst other implementations. In these constructions, a signal is generated by the particular type of sensor indicative of a measurement which is proportional to the force applied thereto.

As provided herein, variables (e.g., sensed values, force, pressure, optical light detection time, electrical resistance, etc.) are proportional when related by a function, for example, if a change in one variable is accompanied by a change in the other variable. Proportional variables may be related by any suitable manner, for example, may be characterized by a linear function, a non-linear function, a polynomial, complex function, look up table, or any other appropriate relationship. Accordingly, the system may receive a signal from a sensor and process that signal as an estimate of force applied to the patient during the delivery of chest compressions.

The estimate of force may be further processed according to methods described herein, so as to provide appropriate resuscitation feedback (e.g., chest compression feedback, display parameters) to the appropriate user(s) via an output device. This resuscitation feedback may, for example, comprise any of the information described herein, such as compliance, work, energy, force, etc., which may further be used to advise the user(s) on how to better provide resuscitative treatment for the patient.

As detailed previously, in various embodiments, a single force sensor (e.g., a pressure sensor) may exhibit multiple resolutions of measurement over different dynamic ranges. Alternatively, multiple sensors within a single chest compression device may be employed where each of the sensors exhibit a respective resolution of measurement over a corresponding dynamic range. As a result, the resolution of a sensor for different dynamic ranges may overlap, and the conversely, the dynamic range of a sensor for different resolutions may overlap.

Figure 5:
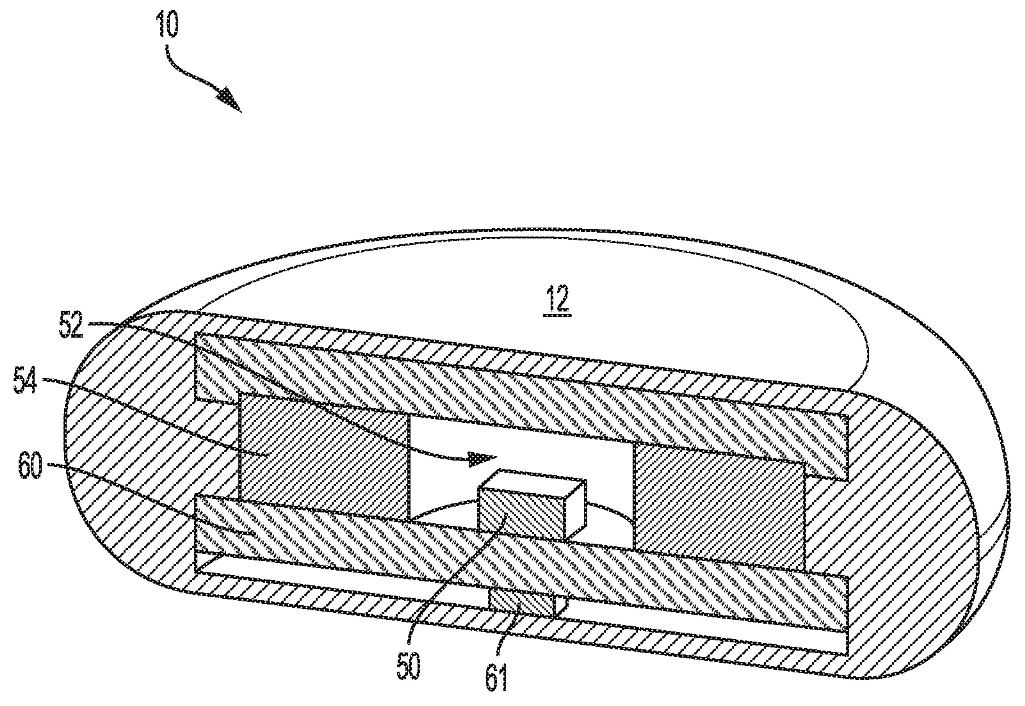
FIG. 5 is a cross-sectional perspective view of a chest compression device in accordance with some embodiments.

In some embodiments, the force sensor incorporates a pressure sensor provided within a sealed enclosure such that measurements recorded by the pressure sensor correlate with forces applied to the patient during chest compressions and transferred to the enclosure. FIG. 5 depicts an embodiment of a chest compression device 10 having multiple sensors in a single housing. Specifically, the chest compression device 10 comprises a housing 12 that forms a chamber 52 acting as a sealed enclosure within which a pressure sensor 50 is located. The sealed chamber 52 may comprise any suitable fluid (e.g., gas, air, liquid, saline, water, viscous fluid, oil, etc.) or fluid-like material (e.g., gel). As shown, the pressure sensor 50 is provided on a printed circuit board (PCB) 60 also held within the housing 12. The printed circuit board 60 also comprises another (i.e., second) sensor 61, for example, an accelerometer for recording motion of the chest compression device 10, or a force sensor for sensing other types of force.

The chest compression device 10 further comprises a compliant material 54 surrounding the pressure sensor 50 and providing an air-tight seal for the chamber 52. As an example, the compliant material 54 may be composed of an elastic, deformable material such as an elastomer, rubber, plastic, silicone, amongst other materials. The surrounding material of the housing 12 may have a similar mechanical behavior as compared to that of the compliant material 54, or may differ. For example, the surrounding material of the housing 12 may comprise a plastic or foam that offers a comfortable touch for the user, though, may be flexible enough to transfer load directly to the compliant material 54, resulting in pressure changes within the chamber 52. Such pressure changes are proportional to the force applied to the patient during chest compressions and, thus, the applied force during chest compressions may be suitably estimated.

Force applied to the exterior of the housing 12 is transferred to the compliant material 54, which causes the chamber 52 to deform (e.g., increase or decrease in volume). Because the chamber 52 is sealed, pressure within the chamber is directly correlated with the force applied to the housing 12 and the compliant material 54 via the applied chest compressions. Accordingly, signals generated from the pressure sensor 50 are indicative of the force applied to the overall chest compression device 10, for example, due to the delivery of chest compressions. As an example, a user pressing on the top of the chest compression device 10 would cause the chamber 52 to compress, increasing the pressure within the chamber 52, resulting in pressure measurements proportional to the overall force applied. The resolution or dynamic range of the force sensor may be tuned based on physical properties of the system. For example, the type of fluid within the sealed chamber 52 may contribute to the resolution and/or dynamic range of force sensing capability. A more viscous fluid may provide a more sensitive force resolution within a relatively small dynamic range, whereas a less viscous fluid may provide for a comparably less sensitive force resolution within a substantially large dynamic range.

Any suitable pressure sensor may be employed. In various embodiments, the pressure sensor is an absolute pressure sensor provided as a miniature electro-mechanical system (MEMS) device. Examples of such absolute pressure sensors include the BME 280 sensor or BMP 200 sensor manufactured by Bosch Sensortec GmbH.

Figure 6A:
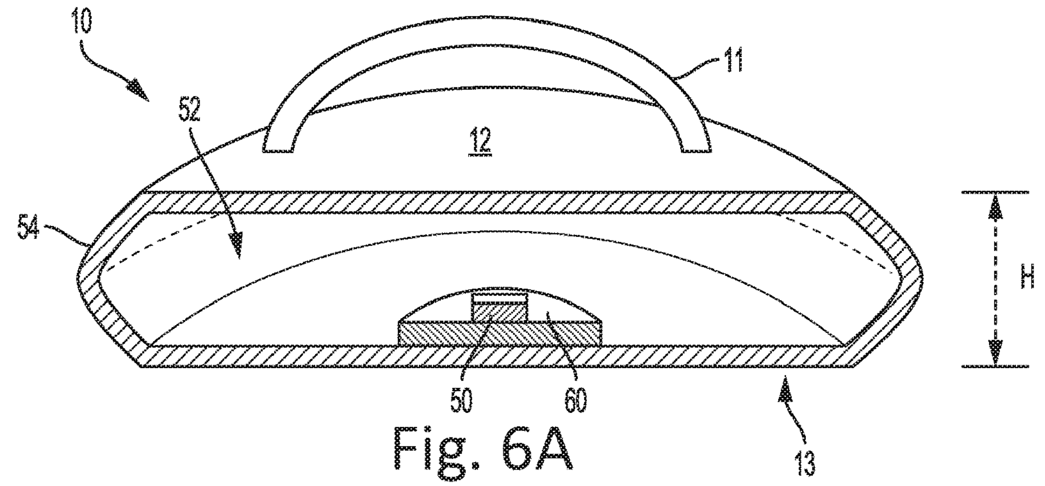
FIG. 6A is a cross-sectional perspective view of yet another chest compression device in accordance with some embodiments.
Figure 6B:
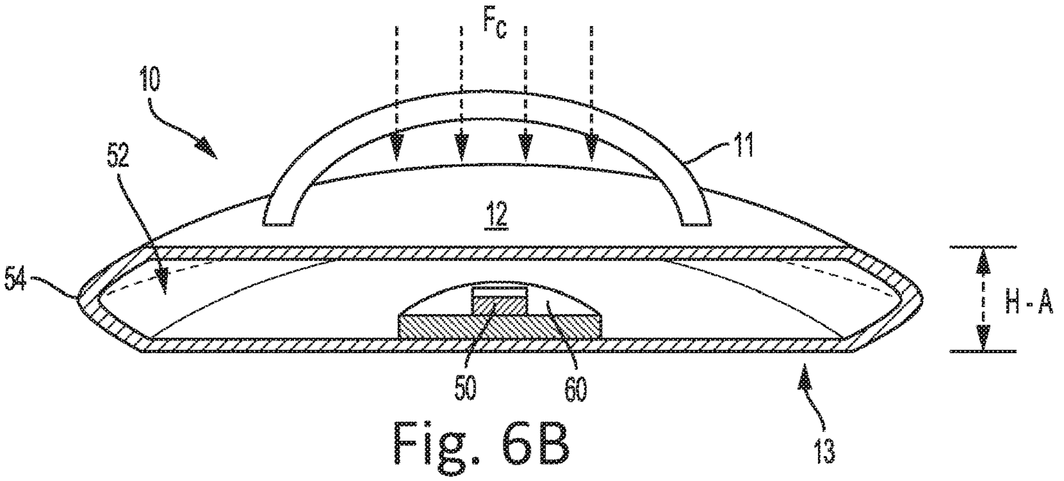
FIGS. 6B-6C are cross-sectional perspective views of the chest compression device of FIG. 6A in use in accordance with some embodiments.
Figure 6C:
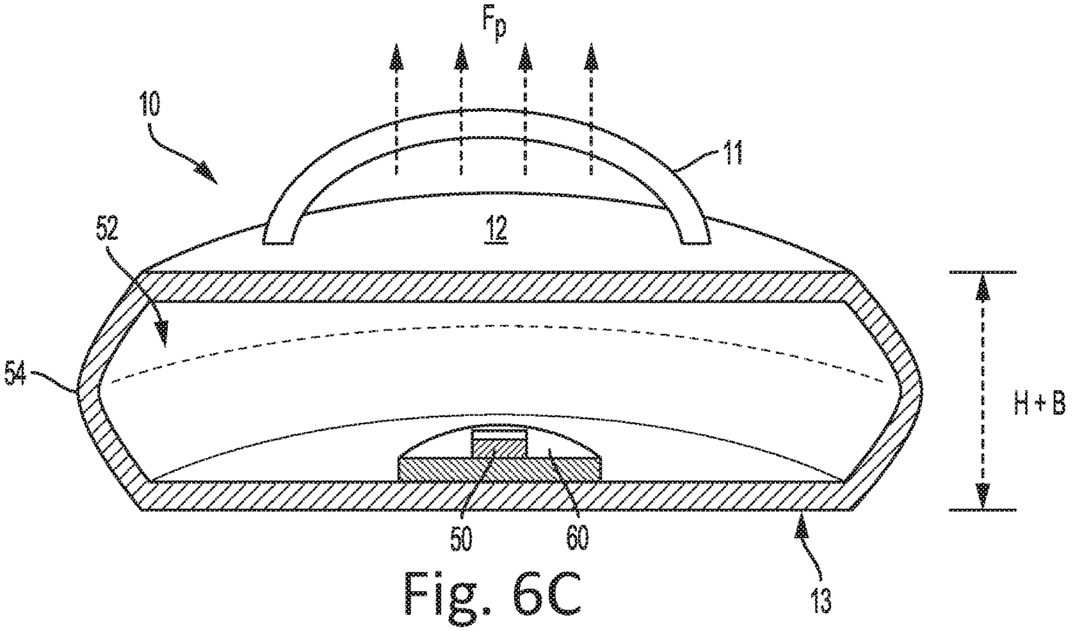

FIGS. 6A-6C depict another embodiment of a chest compression device 10 in operation. Similar to the previous embodiment, the chest compression device 10 comprises a compliant material 54 that forms a sealed chamber 52 within which a pressure sensor 50 mounted on a PCB 60 is located. This embodiment, however, does not include the second sensor 6. The chest compression device 10 further comprises a handle 11 with which a user may grasp and/or place his/her hand to provide compressions (pushing into the patient) and decompressions (pulling out away from the patient). It can be appreciated that any suitable mechanical structure (e.g., handle, strap, grip, structural support member, attachment, adapter, etc.) may be employed for a user to conveniently apply active compressions and decompressions to the patient. In some cases, the chest compression device 10 is configured so that the upward pulling force due to active decompression is transferred through structural support members that are attached to the housing 12. For example, the chest compression device may employ an adapter for attaching an automated chest compressor (e.g., piston based) or for transferring manually applied forces to the force sensing system.

While not expressly shown in the figures, the underside 13 of the chest compression device 10 may incorporate a mechanism for maintaining adherence to the patient during active decompression. For example, the underside 13 of the chest compression device 10 may comprise one or more suction cups, a relatively strong adhesive, or other appropriate structure that allows for the user to pull up on the patient. In some cases, the underside 13 may be able to couple with another mechanism or structure (not shown in the figures), for example, the underside 13 may have mechanical features (e.g., locking mechanisms, fasteners, etc.) that allow the chest compression device 10 to attach to a structural member that, in turn, adheres to the patient during active decompressions. Such a configuration may also be employed with types of sensors other than pressure sensors, for example, optical emitter/detectors, as discussed further below.

FIG. 6A shows the chest compression device 10 in an equilibrium position, where no force is exerted thereto. For illustrative purposes, the chamber 52 has a resting height H. However, when compressive force Fc is applied to the chest compression device 10, as depicted in FIG. 6B, the compliant material 54 deforms downward and, as a result, the chamber 52 compresses to a height H-A. This height H-A corresponds to a temporary change in volume of the chamber 52, which translates to an increase in pressure within the chamber 52. This increase in pressure is recorded by the pressure sensor 50 and subsequently processed to estimate the compressive force applied to the sensor.

Conversely, when pulling force $F_p$ is applied to the chest compression device 10, as shown in FIG. 6C, the compliant material 54 deforms upward and, hence, the chamber 52 stretches to a height H+B. This height H+B also corresponds to a temporary change in volume of the chamber 52, resulting in a pressure decrease within the chamber 52. This decrease in pressure is recorded by the pressure sensor 50 and is processed to estimate the upward decompression force applied to the sensor. Accordingly, such force sensing capability may be useful to detect the presence of active decompressions applied to the patient. The compliant material 54 is elastically resilient such that when no force is applied to the chest compression device 10, the chamber 52 returns to its original conformation having a height H, as shown in FIG. 6A.

Figure 7:
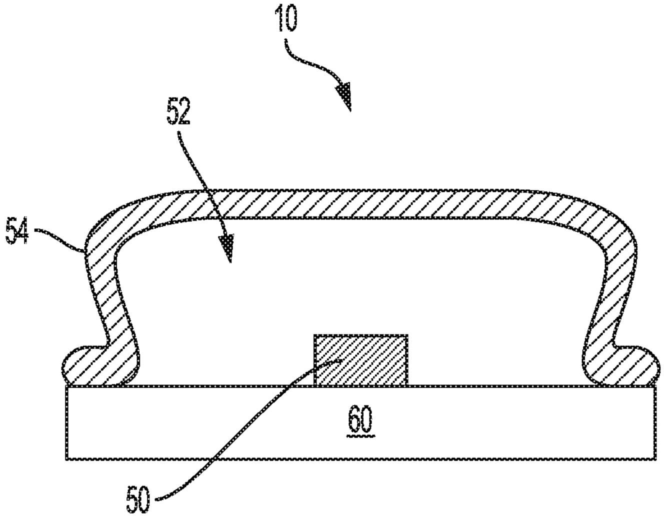
FIG. 7 is a cross-sectional view of another chest compression device in accordance with some embodiments.
Figure 8:
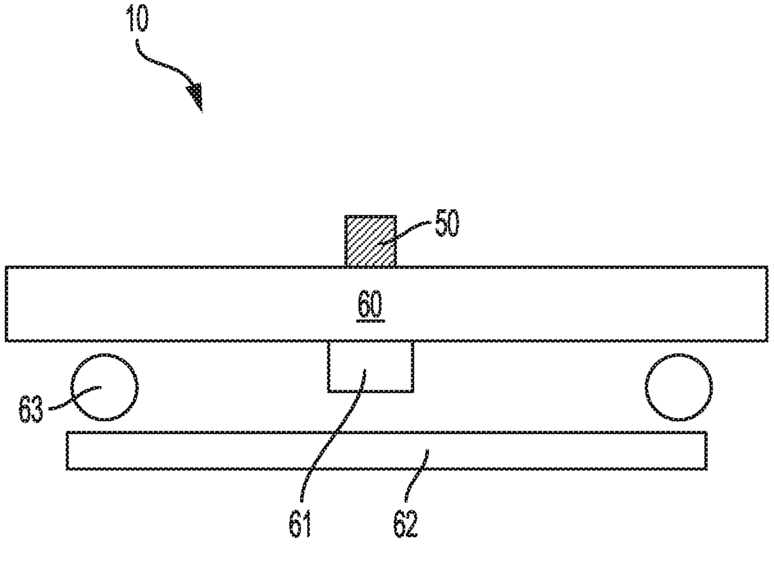
FIG. 8 is a cross-sectional view of yet another chest compression device in accordance with some embodiments.

FIGS. 7-8 show more embodiments of a chest compression device 10 employing a pressure sensor 50 for estimating the applied force during chest compressions. In each of these embodiments, the pressure sensor 50 measures changes in pressure of the immediate environment arising from the application of external force(s). For example, the chest compression device 10 of FIGS. 7-8 may be placed within a sealed environment (e.g., created by a suction cup, adhesive, or other mechanism) and the pressure sensor 50 detects adjustments in pressure within the sealed environment as it is subject to compression and/or decompression forces.

In the embodiment of FIG. 7, the compliant material 54 provides a sealed yet conformable pocket containing a fluid (e.g., air, liquid, gel) such that the chamber behaves effectively as a bladder or bag. Here, the compliant material 54 functions to protect the pressure sensor 50 within the sealed chamber 52. The compliant material 54 may be composed of a flexible material, such as a plastic sheet or wrap, film, elastomer, silicone, bladder lining, compliant polymer, or other suitable material that exhibits little resistance to force and is impermeable to air flow there through. Accordingly, due to the flexibility of the compliant material 54, the chest compression device 10 of FIG. 7 is able to sense pressure changes of the immediate ambient environment. Hence, the chest compression device 10 may be used in settings where ambient pressure changes are correlated to the applied external force due to chest compression therapy.

The embodiment of FIG. 8 is similar to that of FIG. 7, except absent the protective compliant material 54. Accordingly, when the pressure sensor 50 is placed within a sealed environment, sensed changes in pressure of the immediate sealed environment may be indicative of applied external force to the overall system. Additionally, as further shown, the PCB 60 may support another sensor 61, such as a motion or force sensor. In some embodiments, the sensor 61 is a motion sensor (e.g., accelerometer) for determining the displacement of the overall chest compression device 10. Or, the sensor 61 may be another force sensor, also configured to measure force in a manner complementary to the pressure sensor 50. For example, where the pressure sensor 50 may be more suitable to measure forces due to active decompression pulling up on the patient, the sensor 61 may be able to sense forces due to compression pushing into the patient. The sensor 61 may be housed by structural elements 62, 63 for support and/or protection thereof. Such a sensor 61 may incorporate any suitable element of a force sensor described herein. For example, the sensor 61 may be a pressure sensor similar to pressure sensor 50 where the structural elements 62, 63 form a sealed enclosure to provide a pressure controlled environment. Such structural elements may further provide a compartment within which a cable or other electronics may be kept. Or, the sensor 61 may be an optical emitter/detector where the structural element 63 is elastically deformable (e.g., elastomeric ring) and structural element 65 has a reflective surface that reflects light transmitted from the emitter back to the detector, to provide a measure of force applied thereto. Alternatively, the second sensor 61 may comprise a compliant electrically resistive layer that experiences changes in electrical resistance due to applied external forces. Other force sensing configurations may be possible.

The system shown in FIG. 1B provides an illustrative example where the chest compression devices described in embodiments of FIGS. 7-8 may be employed. In FIG. 1B, the chest compression device 20 employs a suction cup 22 that forms a sealed environment when properly applied to the patient. Here, the suction cup 22 and/or components coupled therewith provide a housing for the chest compression device 10. Accordingly, the seal may be reinforced every time the chest compression device 20 is pressed against the patient. This sealed environment is subject to changes in pressure as active compressions and decompressions are applied to the patient. Either of the chest compression devices of FIGS. 7-8 may be placed within the space under the suction cup 22 such that when the suction cup 22 forms a seal against the patient, the chest compression device 10 is able to measure changes in pressure within the sealed environment under the suction cup. For example, as the suction cup 22 is pulled upward from the patient, as long as the space under the suction cup remains sealed, the pressure change within the space (e.g., negative pressure), as sensed by the pressure sensor, correlates with the applied upward force. Similarly, pressure changes associated with compression toward the patient may also be recorded by the pressure sensor. Though, practically speaking, as discussed above with respect to the additional sensor 61, it may be preferable for another type of force sensing configuration to be employed for compression.

As discussed previously, the chest compression device may employ other arrangements. For instance, the chest compression device may incorporate an emitter and an optical detector directly adjacent one another and positioned opposite a suitable reflective surface supported by a compliant resilient material such that movement of the reflective surface relative to the emitter/detector is indicative of force applied or transferred to the compliant material due to chest compressions delivered to the patient.

Figure 9:
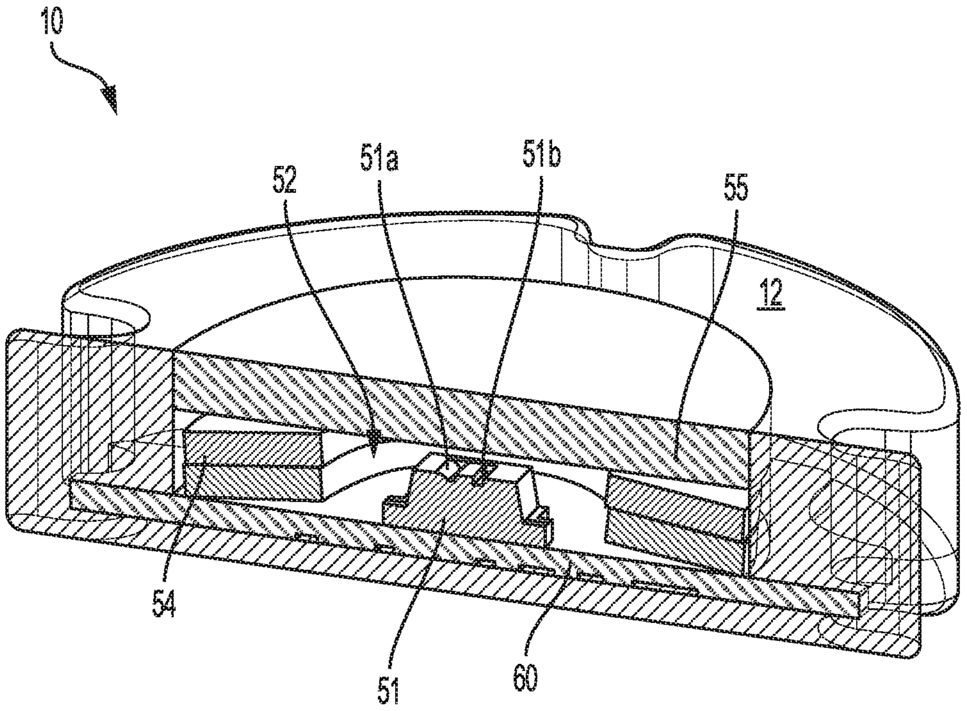
FIG. 9 is a cross-sectional perspective view of a chest compression device in accordance with some embodiments.

FIG. 9 depicts an illustrative embodiment of a chest compression device 10 employing such a configuration. Here, the housing 12 of the chest compression device 10 comprises and supports a photointerrupter 51 mounted on the surface of a PCB 60, where the photointerrupter incorporates an emitter 51*a* and an optical detector 51*b* located adjacent one another. As known to those of skill in the art, a photointerrupter generally involves a transmission-type photosensor that integrates optical receiving and transmitting elements in a single package. An example of a photointerrupter that may be used in accordance with aspects presented herein may be the GP2S60 series photointerrupter provided by Sharp Corporation. Other types of emitter-detector systems may be employed. Though, it can be appreciated that the emitter 51*a* and optical detector 51*b* may be provided as separate components and are not necessary incorporated in a single package. The housing 12 further comprises a compliant material 54 and a cover 55, forming a chamber 52 surrounding the photointerrupter 51.

In this particular implementation, the compliant material 54 exhibits a substantial amount of resilience such that the material 54 is able to elastically recover upon deformation thereof. In some embodiments, the compliant material 54 comprises an elastomer, rubber, spring, spring washer, elastic foam, biasing member, or similar type of resilient material. The compliant material 54 supports a cover 55 located opposite the surface of the PCB 60 and photointerrupter 51.

As shown in FIG. 9, the compliant material 54, which functions as a resilient member that deflects in a manner proportional to the force delivered to the patient during chest compressions, is positioned between and coupling the inner face of the PCB 60 and the inner face of the cover 55. The inner face of the cover 55 further comprises a reflective surface that faces toward the photointerrupter 51. Accordingly, the surface of the PCB 60 provides a first inner face on which the emitter 51*a* and optical detector 51*b* are mounted, and the cover 55 provides a second inner face having the reflective surface facing toward the emitter 51*a* and optical detector 51*b*. Any suitable reflective surface may be employed on the inner face of the cover 55 or other part of the housing. For example, a prismatic sheeting that exhibits appropriately diffusive reflective properties, such as those of Reflective Sheeting Series 4000 provided by 3M™. The PCB may incorporate additional electronics such as force sensing and/or motion sensing circuitry, as discussed herein.

Accordingly, during operation of this embodiment, the emitter 51*a* transmits light toward the reflective surface of the inner face of cover 55, which then redirects the light back in a suitable manner toward the optical detector 51*b*. The reflective surface, being supported by and coupled to the resilient compliant material 54, moves in accordance with overall deformation thereof, during the delivery of chest compressions. That is, compression of the cover 55 against the resilient compliant material 54 results in movement of the reflective surface toward the photointerrupter 51, yielding signal from the photointerrupter substantially proportional to the force applied to the patient during the delivery of chest compressions. This signal could be the intensity of light or time elapsed for a pulse of light to travel from the emitter to the detector (having been reflected back) where the intensity or time elapsed is correlated with the distance between the reflective surface and the photointerrrupter. Based on the material properties (e.g., elasticity) of the compliant material 54, the distance changes are, in turn, correlated with the force applied. Hence, in this example, the detected light by the optical detector, indicative of movement of the reflective surface, may be used to provide an estimate of force applied by a caregiver during CPR treatment.

In various embodiments, the inner faces of the housing have an orientation within a suitable angle (e.g., approximately 5 degrees, 10 degrees, 15 degrees, 20 degrees, 30 degrees, etc.) of perpendicular to the direction of the force of the chest compressions. For example, the inner faces of the housing may be substantially parallel to one another, as shown in FIG. 9. Such an orientation may be desirable so that light transmitted from the emitter 51*a* is reflected from the reflective surface back for the optical detector 51*b* to measure the intensity of the light reflection. Otherwise, if the angle of orientation at which the inner faces of the housing is too extreme, then the optical detector 51*b* might not be in an appropriate position to sufficiently detect the reflected light originated from the emitter 51*a*.

As previously discussed, the implementation discussed above with respect to FIGS. 6A-6C may incorporate an emitter/detector configuration in place of the pressure sensor. For example, the chest compression device 10 may comprise a photointerrupter 51 incorporating an emitter 51*a* and detector 51*b* mounted on the PCB 60. The inner face of the housing 12 that faces toward the photointerrupter may comprise a reflective surface that reflects light transmitted from the emitter back toward the detector. Similar to the discussion of FIGS. 6A-6C, when compressive force Fc is applied to the chest compression device 10, the compliant material 54 deforms downward and the chamber 52 compresses to a height H-A. During this time, the emitter transmits light toward the reflective surface which redirects the light back toward the detector. Hence, the detector tracks the back and forth movement of the reflective surface, as indicated by the change in height H-A, which when appropriately calibrated to the mechanical behavior of the compliant material 54, may then be processed as an estimate to the compressive force applied to the sensor. Conversely, when pulling force $F_p$ is applied to the chest compression device 10, the compliant material 54 deforms upward and, hence, the chamber 52 stretches to a height H+B. The optical detector tracks this change in distance from the reflective surface and, based on appropriate mechanical calibration with the compliant material 54, the decompression force may be estimated. Accordingly, such a force sensing arrangement may be used to estimate force applied to the patient during active compression decompression therapy.

In other embodiments, the force sensor may comprise a layer having a circuit layer having at least two electrical contacts laminated against a compliant, electrically resistive layer, where compression of the two layers together results in a change in resistance of the electrically resistive layer. This change in resistance is proportional with the applied force (and, hence, the force applied to the patient during the delivery of chest compressions) and can be measured by an appropriate resistance sensor via the voltage-current relationship provided by Ohm's law. For example, the resistance sensor may involve a voltage source provided across the electrical contacts of the circuit layer including a measure of current there between, or a current source provided across the electrical contacts of the circuit layer including a measure of voltage between the electrical contacts.

Figure 10A:
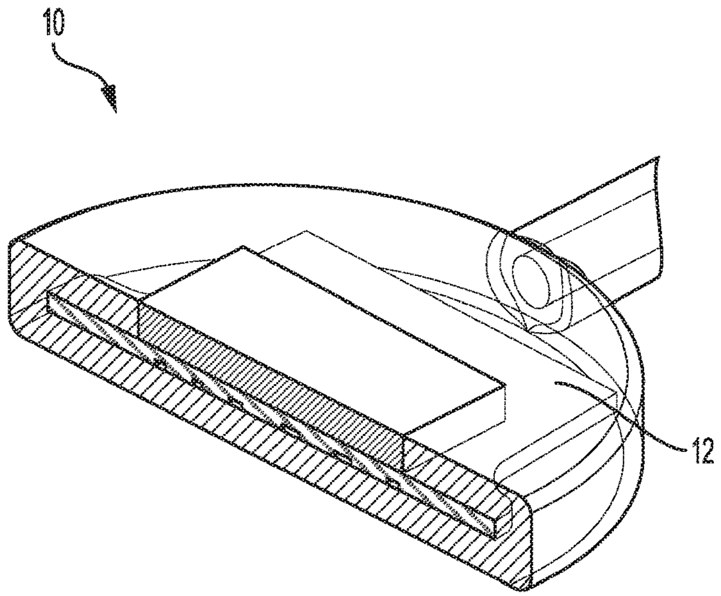
FIG. 10A is a cross-sectional perspective view of a chest compression device in accordance with some embodiments.
Figure 10B:
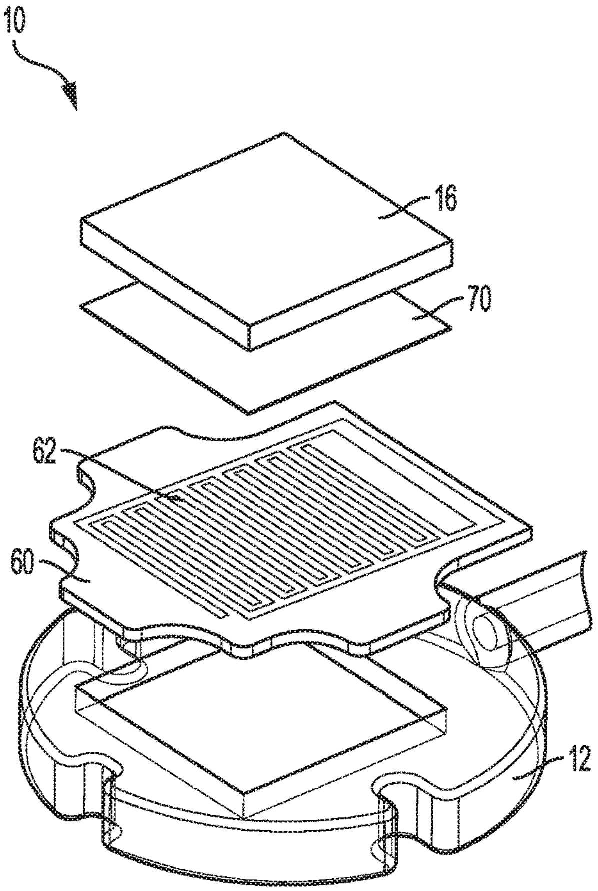
FIG. 10B shows an exploded view of the chest compression device of FIG. 10A.

FIGS. 10A-10B depict an illustrative embodiment of a chest compression device 10 having such circuit and electrically resistive layers. The exploded view of FIG. 10B shows different parts of the chest compression device 10. The housing 12 is constructed to hold each of the layers one on top of the other beneath a compressible support layer 16 which transfers externally applied force directly to the PCB 60 and electrically resistive layer 70. As shown, the PCB 60 comprises a pair of electrical traces 62 interdigitated with respect to one another, but not in electrical contact. That is, without an electrical connection between the two traces, the traces of the circuit remain as open electrical contacts.

In various embodiments, the electrically resistive layer 70 may comprise a force-sensing resistor, such as a polymer film, which changes resistance in a predictable manner following the application of force to its surface. For example, the polymer film may have a base matrix formed as an insulative sheet or ink that comprises electrically conducting particles (e.g., carbon, metallic, conductive nanoparticles, conductive microparticles, etc.) suspended in the matrix. Hence, applying a force to the surface of the polymer film may allow for the conductive particles to transmit electrical current (e.g., through direct electrical contact, or through electrical tunneling effects), changing the overall electrical resistance of the material. As a result, the degree of applied pressure is correlated with the resistance of the electrically resistive layer 70.

As the electrically resistive layer 70 is pressed against the interdigitated trace 62 with increasing force, the electrical resistance through the trace decreases. Conversely, when little to no force is applied between the electrically resistive layer 70 and the interdigitated trace 62, the electrical resistance through the trace remains relatively high, similar to that of an insulator. Accordingly, when a constant voltage is applied between the pair of interdigitated traces 62, the current measured between the traces is correlated to the force applied to the electrically resistive layer 70. Or vice versa, when a constant current is applied between the pair of interdigitated traces 62, the voltage measured between the traces is correlated to the force applied to the electrically resistive layer 70. Such a configuration may be particularly useful in measuring compressive forces applied to the chest compression device 10.

One example of a force sensing implementation employing an electrically resistive layer includes the Flexiforce™ A201 Sensor provided by Tekscan, Inc. In this product, the output electrical resistance in these sensors is inversely related to the applied force. For example, when no force is applied to the sensors, the output electrical resistance may be between approximately 900,000 Ohms and 1 megaohm. As the applied force increases, the output electrical resistance decreases. For example, 120 pounds of force may result in a resistance of about 10,000 Ohms. In this example, the conductance, however, is linear with respect to force. As the applied force increases, the conductance (calculated as 1/Resistance) also increases. For instance, a force of approximately 5 pounds may give rise to about 0.001 S (Siemens) and a force of about 120 pounds may give rise to about 0.018 S.

In general, the output of the sensors (e.g., electrical resistance between electrical leads) is calibrated and mapped to measured force associated with CPR chest compressions. This mapping of the force information is performed such that measurements from the sensors are translated into actual amounts of force applied during chest compressions. This process allows the information generated from the sensor to be directly correlated with the force applied during CPR chest compressions performed on the patient.

Combinations of various force sensing implementations may be employed, examples of which are described further below. For instance, force sensors having a PCB with open electrical contacts laminated with electrically resistive layers, photointerrupter configurations, pressure sensor implementations, or combinations thereof. Such combinations may be used, for example, in instances where the force sensor(s) exhibit varying degrees of resolution over different dynamic ranges of force.

As noted above, it may be desirable for the force sensor(s) to exhibit high resolution over a relatively small range of force, for example, to determine whether initial contact has been made in beginning or finishing a chest compression. The force sensor(s) may exhibit a slightly less level of resolution over a larger range of force, for example, to detect whether a compressible transition layer is located on the anterior of the patient, and/or for accurately estimating chest compression depth. Or, to determine whether the patient has suffered an injury, such as a broken rib, it may be preferable for the force sensor(s) to have a large dynamic range of force and/or depth, with resolution having relatively less importance as compared to the other cases presented above.

Figure 11A:
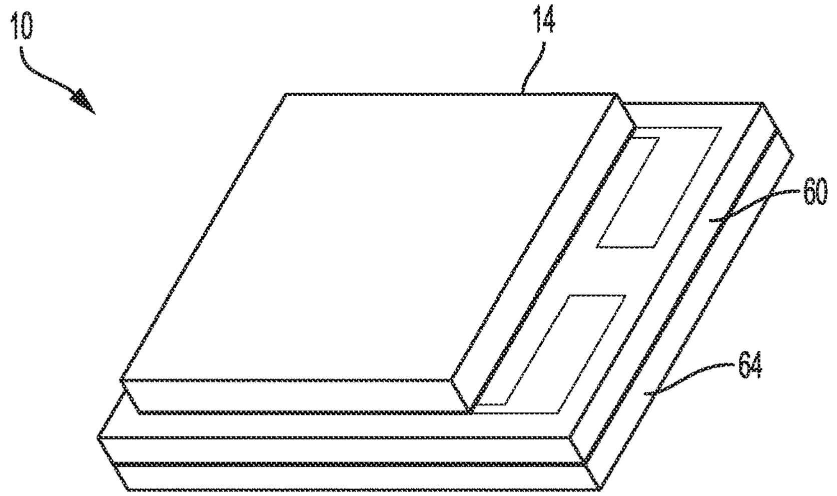
FIG. 11A is a perspective view of a chest compression device in accordance with some embodiments.
Figure 11B:
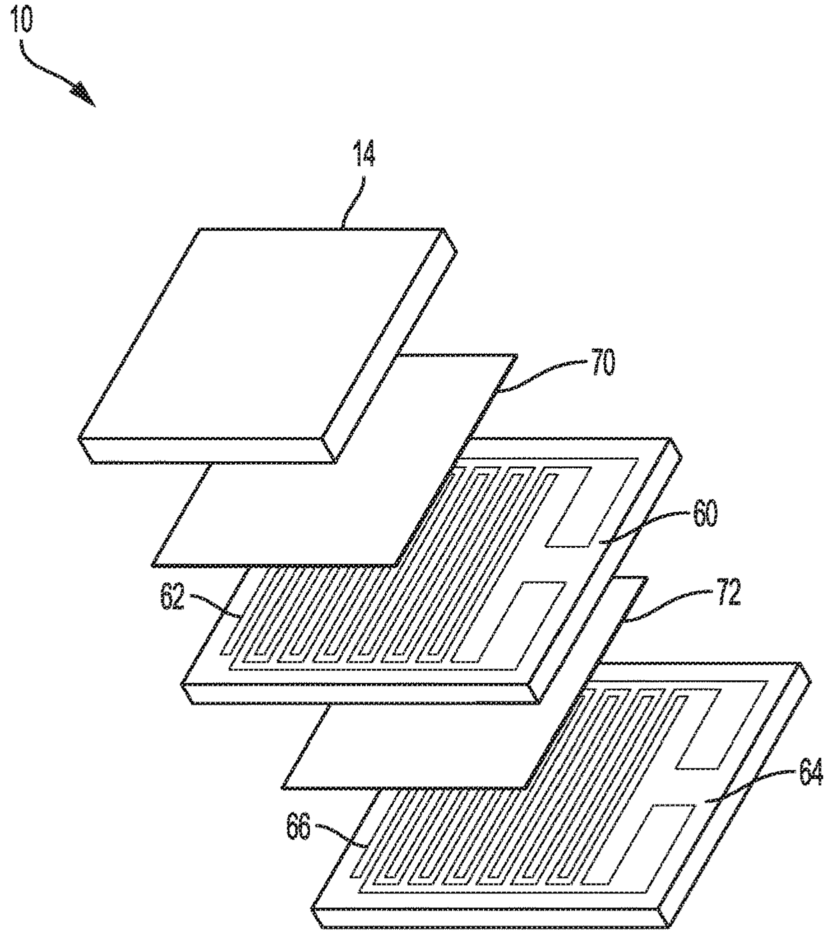
FIG. 11B shows an exploded view of the chest compression device of FIG. 11A.

FIGS. 11A-11B depict an illustrative embodiment of a force sensor 75 that is comprised of multiple resistive sensors, where each of the sensors exhibit a respective resolution of force measurement over a desired dynamic force range. In more detail, the force sensor 75 is disposed in a chest compression device 10 and comprises multiple electrically resistive layers 70, 72 and PCBs 60, 64 each having interdigitated traces 62, 66 with open electrical contacts incorporated therein. The force sensor 75 also comprises a support layer 14, which transfers externally applied force from chest compressions to the underlying layers. As shown, the PCB 60 having interdigitated trace 62 is laminated against the electrically resistive layer 70 to form a first force sensing implementation, and the PCB 64 having interdigitated trace 66 is laminated against the electrically resistive layer 72 to form a second force sensing implementation.

The resolution and/or range of each of the force sensing implementations of FIGS. 11A-11B may depend, at least in part, on the thickness of the electrical traces, spacing distance between electrical traces and/or the matrix of the respective the electrically resistive layer. For example, the shorter the spacing distance is between electrical traces, the less force will be required for a current to be able to flow between the traces and the more sensitive and, thus, higher resolution the force sensing capability will be. Moreover, the higher the density of conductive particles within the electrically resistive matrix or the thinner the electrically resistive layer, the less force will be required for a sufficient electrical contact to be made between the traces to conduct a current, leading to a more sensitive force sensor. Accordingly, the force resolution or range may be appropriately tuned depending on the physical parameters of the electrically resistive layer and/or circuit layer having interdigitated electrical contacts.

Accordingly, the force sensing arrangement of FIGS. 11A-11B may exhibit high resolution force sensing over a first force range (e.g., small force range, 0.1-1.0 lb) and comparatively lower resolution force sensing over a second force range (e.g., larger force range, 1.0-200 lb). As an example, the combined PCB 60 and electrically resistive layer 70 may form the higher resolution first force sensing implementation and the combined PCB 64 and electrically resistive layer 72 may form the lower resolution second force sensing implementation. Taking this example, the conductive particles of the electrically resistive layer 70 may be more densely populated and/or closer together as compared to the conductive particles of the electrically resistive layer 72; and/or the electrical traces 62 of PCB 60 may be closer together than the electrical traces 66 of PCB 64, resulting in higher resolution force sensing capability. The electrically resistive layer 72 and PCB 64 may further be configured so that a larger dynamic force range may be measured.

In some cases, it may be preferable to provide protection for various components. For example, while not shown in the figures, mechanical supports (e.g., pegs, posts) may be provided between parts so that one or more of the electrically resistive layers are not damaged. For example, the electrically resistive layer 70 may be designed to be high resolution over a small force range, and so may be more fragile than the electrically resistive layer 72, which may be designed to function at a larger force range. Accordingly, one or both PCBs 60, 64 may incorporate support posts such that when the chest compression device 10 is compressed to a degree such that the dynamic force range of the first sensing implementation is surpassed, the support posts serve to protect the electrically resistive layer 70 while the larger dynamic range of force is explored with the electrically resistive layer 72.

Figure 12A:
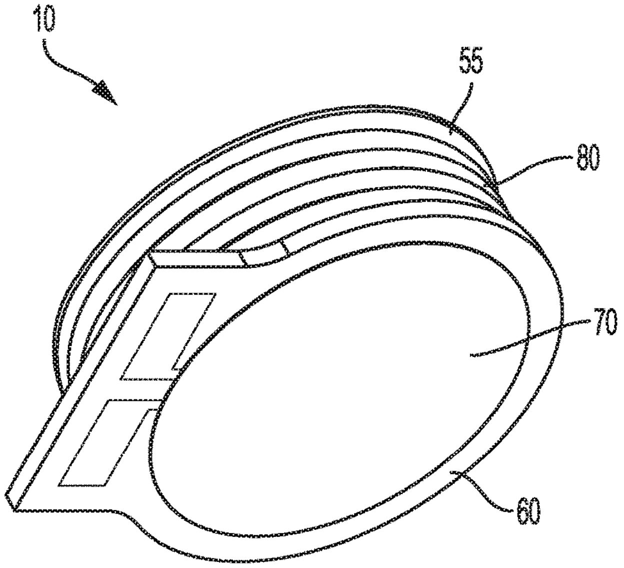
FIG. 12A is a perspective view of another chest compression device in accordance with some embodiments.
Figure 12B:
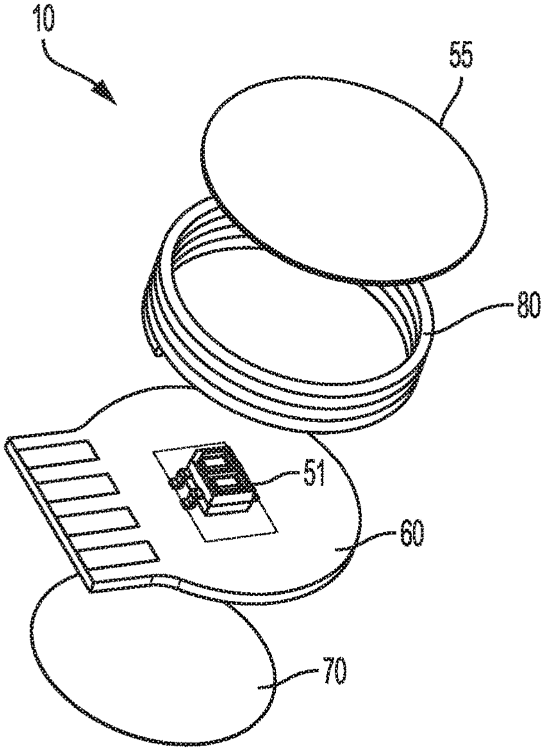
FIGS. 12B-12C shows an exploded view of the chest compression device of FIG. 12A.
Figure 12C:
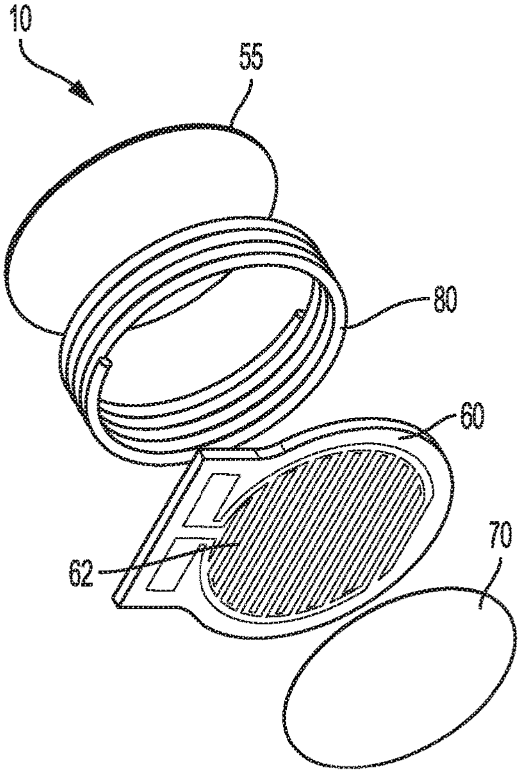

FIGS. 12A-12C show another embodiment of a chest compression device 10 that incorporates both a photointerrupter force sensing arrangement and an electrically resistive arrangement. The chest compression device 10 comprises a PCB 60 having an inner face with a photointerrupter 51 mounted thereon, with a cover 55 having an inner face with a reflective surface facing toward the photointerrupter 51. A resilient member 80 couples together the upward facing surface of the PCB 60 and the downward facing surface (reflective portion) of the cover 55. In this case, the resilient member 80 is a spring, which is biased toward an equilibrium position whether perturbed in either direction toward or away from the photointerrupter 51. Though, it can be appreciated that types of resilient members other than springs may be employed. On the other side of the PCB 60 is an interdigitated trace 62 with open electrical contacts laminated against an electrically resistive layer 70, similar in construction to other embodiments presented herein.

As a result, for a given compression, each of the force sensing implementations will be able to sense force according to its particular construction. For example, as discussed above, the resolution and dynamic range of the force sensing implementation provided by the combined interdigitated trace 62 and electrically resistive layer 70 may depend on the spacing distance between electrical traces and/or density of conductive particles within the electrically resistive matrix. The resolution and dynamic range of the force sensing implementation provided by the photointerrupter 51 may depend on the stiffness of the resilient member 80. For example, a lower spring constant of the resilient member 80 may result in a higher resolution (e.g., lower least significant measurement) force sensing implementation, whereas a higher spring constant may result in a lower force sensing resolution (e.g., higher least significant measurement) and larger dynamic range of force measurement. In addition, the height of the resilient member 80 may further contribute to the dynamic range of force that is measured. For instance, a greater height of the resilient member 80 may result in a larger dynamic range of force while a lower height may lead to less of a dynamic range within which force is measured. Accordingly, each of the force sensing arrangements may be appropriately tuned to suit to desired resolution and dynamic range of force.

In some cases, the embodiment of FIGS. 12A-12C may be useful for sensing the force of compression into the patient as well as the force of active decompression as the patient is pulled upward. For example, the combined interdigitated trace 62 with open electrical contacts and electrically resistive layer 70 may be configured to sense the force upon compression, where the resistance of the electrically resistive layer 70 will vary based on the applied external compressive force. The photointerrupter force sensing arrangement may be useful to not only sense force upon compression into the patient, but as discussed previously, may also sense the pulling force away from the patient during active decompressions. While not expressly shown in this figure, the cover 55 may be coupled to a handle or other mechanical structure that allows for upward pulling force to be transferred thereto during active decompressions.

Figure 13A:
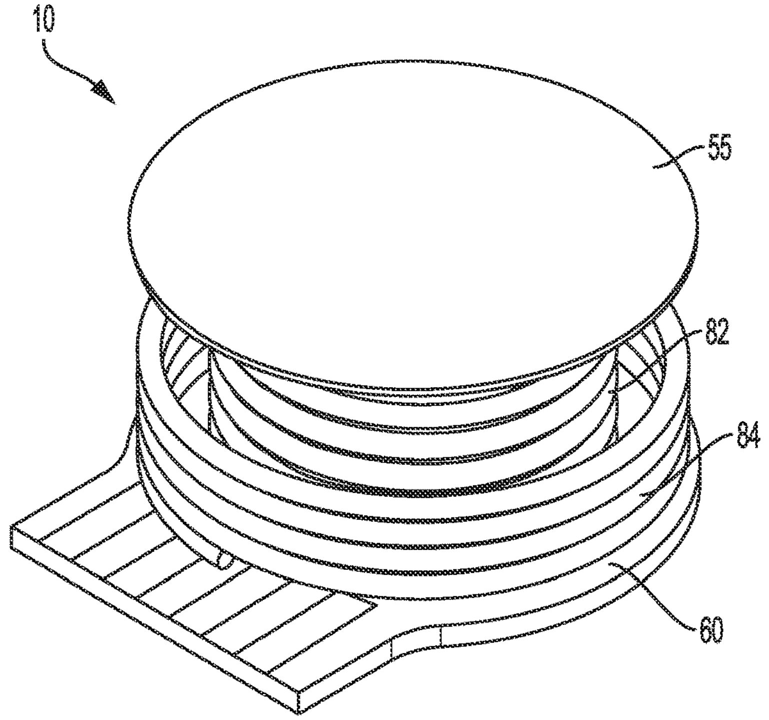
FIG. 13A is a perspective view of a chest compression device in accordance with some embodiments.
Figure 13B:
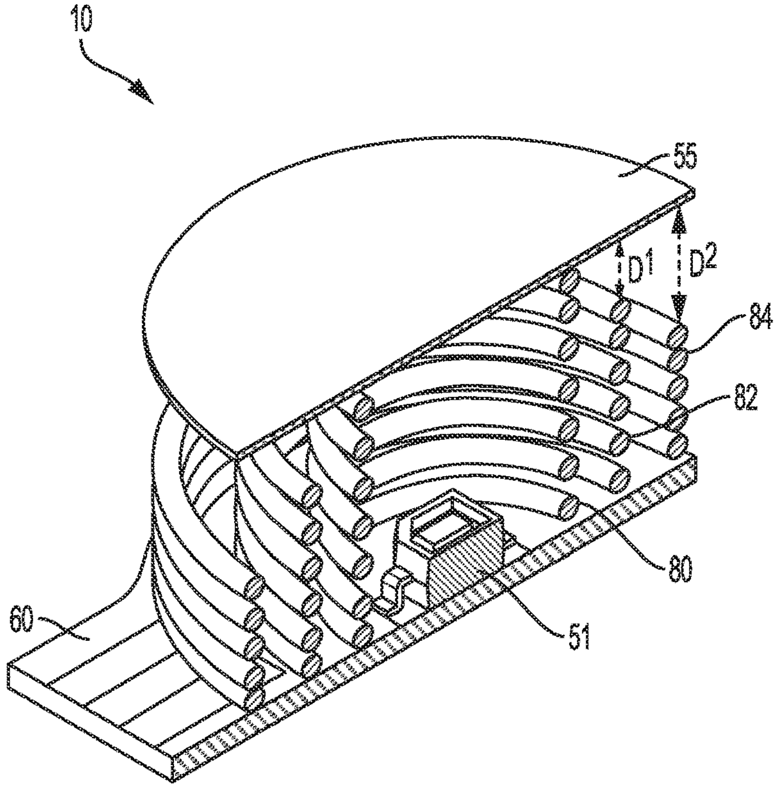
FIG. 13B is a cross-sectional perspective view of the chest compression device of FIG. 13A.

FIGS. 13A-13B show another embodiment of a chest compression device 10 that incorporates a photointerrupter 51, a cover 55 and a number of resilient members 80, 82, 84 within a single force sensing arrangement. Similar to previous embodiments, the cover 55 has a reflective surface facing downward toward the photointerrupter 51 such that light generated from the emitter is reflected back toward the optical detector. The cover 55 is also constructed so as to couple with each of the resilient members 80, 82, 84 at various points during compression. Accordingly, tracked movement of the reflective surface relative to the emitter and detector provides an indication of the force applied thereto.

FIGS. 13A-13B illustrate an example of a single force sensor 51 within a chest compression device 10 that exhibits multiple resolutions of force measurement over different dynamic ranges of force. Here, the photointerrupter 51 provides a single output to the processor(s) for determining the force applied to the chest compression device, however, the resolution varies over different ranges of force based on the mechanical spring properties of the resilient members 80, 82, 84. In this embodiment, each of the resilient members 80, 82, 84 is a spring having an appropriate stiffness and height and being mechanically biased to an equilibrium position. The stiffness and height of each resilient member 80, 82, 84 may depend on the desired resolution and dynamic range for the chest compression device 10. For example, the height of the resilient member 80 is such that the resilient member 80 extends from the surface of the PCB 60 on which the photointerrupter 51 is mounted all the way to the cover 55. Though, the height of each of the resilient members 82, 84 is not quite high enough so as to extend from the PCB 60 to the cover 55. Instead, the heights of the resilient member 82, 84 are such that there are respective clearance distances $D_1$, $D_2$ to the cover 55.

Thus, when compressive force is applied to the cover 55, the resilient member 80 immediately provides mechanical resistance according to its stiffness. Based on the stiffness of the resilient member 80 and the movement of the cover 55, the externally applied force can be suitably estimated over the allotted range. When the cover 55 travels the clearance distance $D_1$ further toward the PCB 60, the resilient member 82 then begins to contribute additional mechanical resistance based on its stiffness. Hence, at this point, both resilient members 80, 82 are now providing biasing force against the externally applied compression. This additional mechanical resistance adjusts the resolution (lowers the sensitivity) of force sensing for the sensor over the added range. As the sensor is further compressed, the cover 55 may travel the remaining clearance distance $D_2$ toward the PCB 60, resulting in the resilient member 84 contributing even more mechanical resistance. Here, each of the resilient members 80, 82, 84 now provides biasing force against the externally applied compression, adjusting the force sensing resolution (lowers the sensitivity) all the more over the additional range.

The force sensing arrangement of FIGS. 13A-13B may be useful, particularly with respect to having varying resolution over different dynamic ranges of force. For example, the distance (or force) range through which only the resilient member 80 is compressed may be useful for determining whether a rescuer has initiated a chest compression on the patient. Here, the stiffness of the resilient member 80 provides a high resolution (fine sensitivity) for detecting the start of a chest compression.

The subsequent distance/force range through which the resilient members 80, 82 is further compressed may assist in determining whether a compressible transition layer exists on the anterior of the patient, resulting in chest compression depth measurements to be taken once the softer layer is compressed to a minimally compliant state. Accordingly, the resolution for such a detection may be coarser than for detecting the initiation of a compression, yet higher in resolution than for actually measuring chest compression depth. The next distance/force range through which the resilient members 80, 82, 84 is even more compressed may be a range through which the actual chest compression depth is calculated/estimated.

In some cases, the resilient member 80 may be mechanically attached or otherwise coupled to the cover 55 such that if the cover 55 is pulled upward (via a handle or other mechanical structure for pulling upward which is not expressly shown) for active decompression therapy, the resilient member 80 extends with the cover 55 away from the PCB 60. Accordingly, based on the stiffness of the resilient member 80 and the dynamic range that it provides, force measurements for active decompression may also be determined.

Figure 14A:
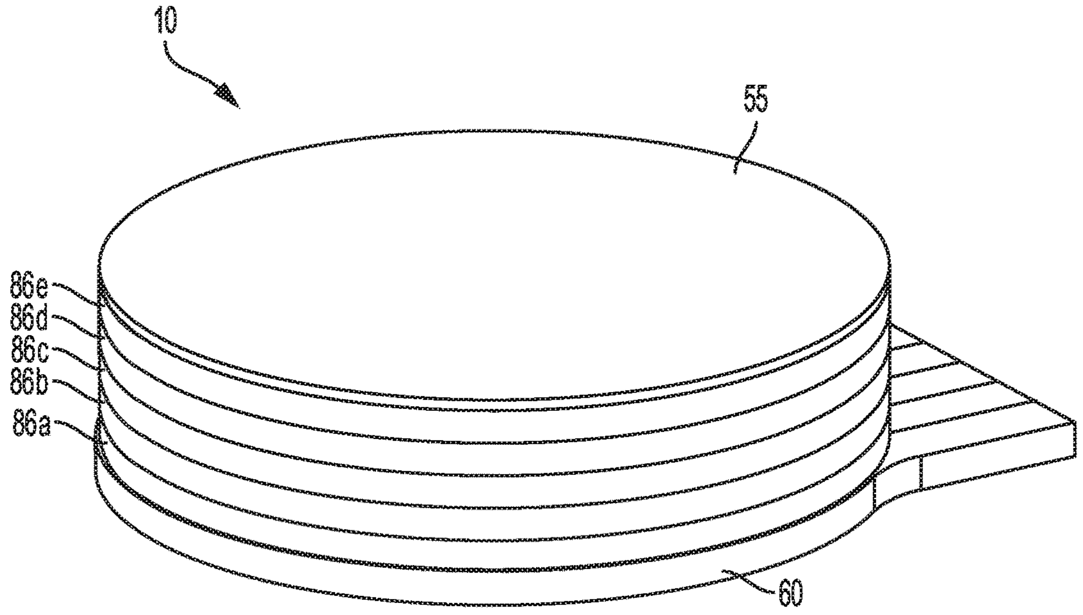
FIGS. 14A-14B are schematic views of a chest compression device in accordance with some embodiments.
Figure 14B:
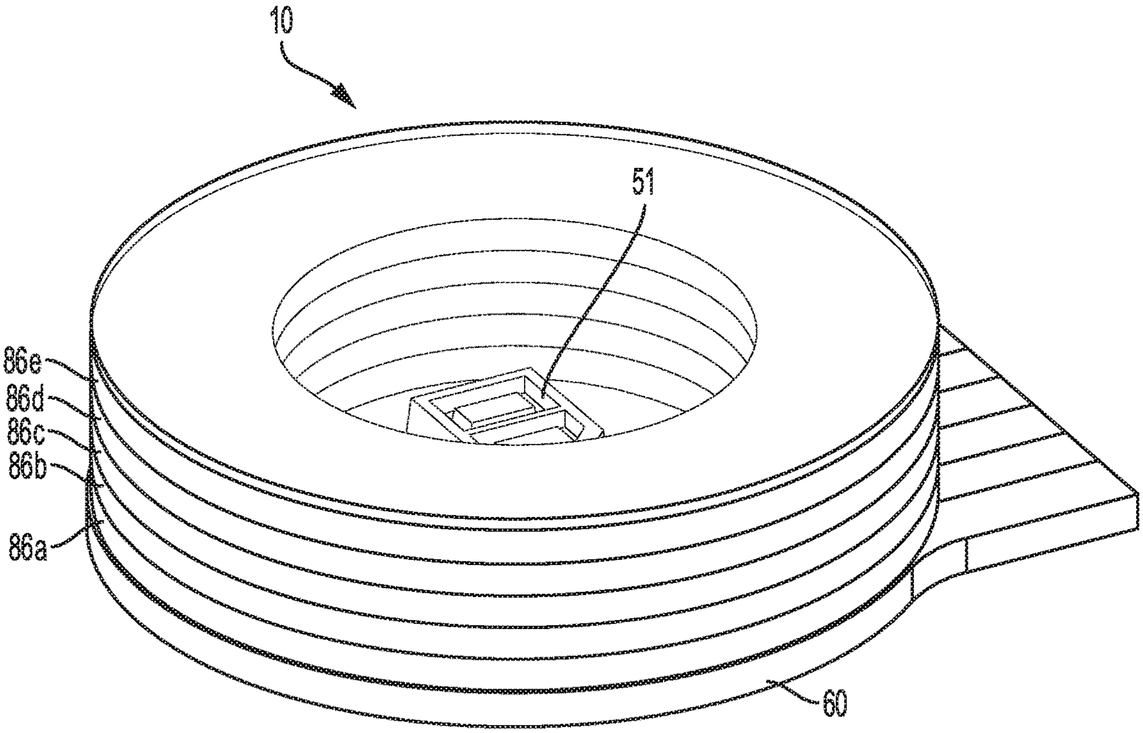

FIGS. 14A-14B show another embodiment of a chest compression device 10 that incorporates a photointerrupter 51, a cover 55 and a number of resilient members 86*a*, 86*b*, 86*c*, 86*d*, 86*e* within a force sensing arrangement. Similar to the embodiment of FIGS. 13A-13B, the cover 55 has a reflective surface that faces toward the photointerrupter 51 such that light generated from the emitter is reflected back toward the optical detector. In this embodiment, the resilient members 86*a*, 86*b*, 86*c*, 86*d*, 86*e* are spring washers or substantially compressible materials (e.g., rubber with durometer between 20-50) that are provided in a stacked arrangement. Each of the resilient members has an appropriate stiffness such that the overall force sensor exhibit varying resolutions for different dynamic ranges of force. Hence, upon initiation of a compression, softer layers would be more prone to compress, providing finer force resolution as compared to harder layers, which would provide relatively coarser force resolution.

In various embodiments, the force sensor may implement a load cell, which is a transducer that generates an electrical signal whose magnitude is correlated to the force being measured. An example of a load cell is a strain gauge, which measures changes in electrical resistance based on deformation (strain) of the strain gauge. For instance, as an electrical conductor is elastically stretched to become narrower/longer, the electrical resistance end-to-end will increase. Conversely, when a conductor is elastically compressed to be broadened/shortened, the electrical resistance end-to-end will decrease. From the measured electrical resistance of the strain gauge, the amount of induced stress may be inferred. A typical strain gauge employs a long, thin conductive strip in an appropriate pattern, such as parallel lines, where a small amount of stress in the direction of the orientation of the parallel lines results in a multiplicatively larger strain measurement over the effective length of the conductor surfaces in the array of conductive lines than would be observed with a single straight-line conductive wire.

Figure 15A:
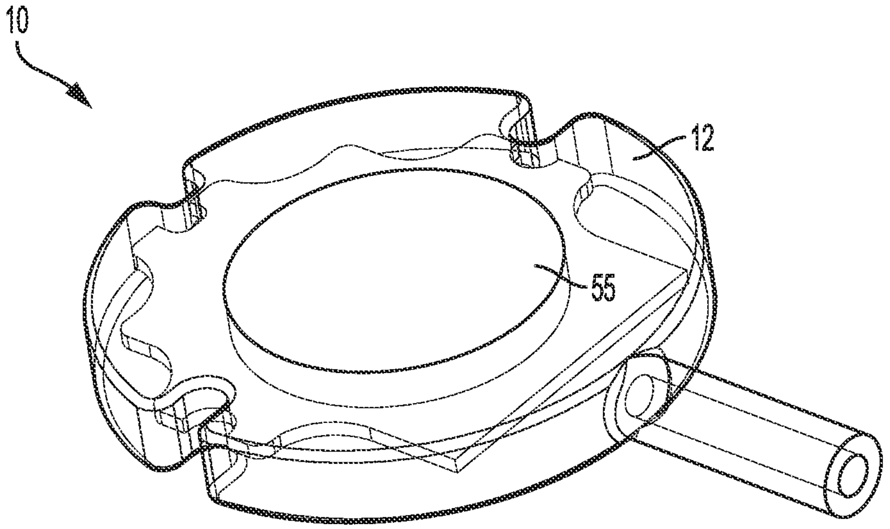
FIG. 15A is a perspective view of a chest compression device in accordance with some embodiments.
Figure 15B:
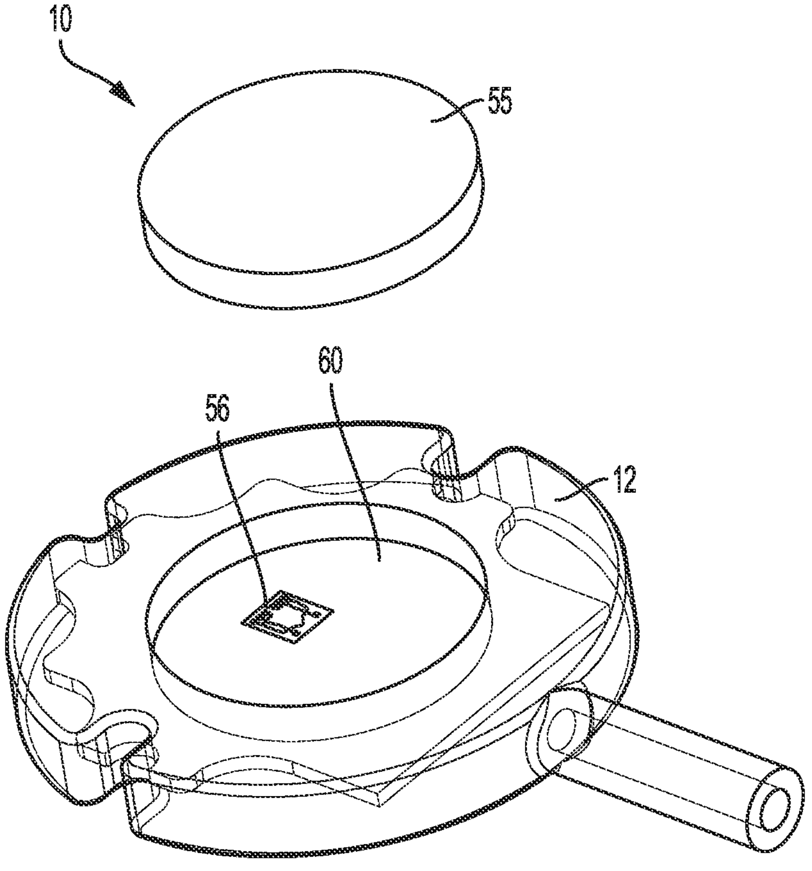
FIG. 15B shows an exploded view of the chest compression device of FIG. 15A.

FIGS. 15A-15B depict an embodiment of the chest compression device 10 incorporating a load cell 56 mounted on a PCB 60. The chest compression device 10 has a housing 12 comprising a rubber insert or other material suitable for transferring externally applied forces to the load cell 56, for measurement of the applied forces. Here, the load cell 56 is provided as a silicon-die load cell fabricated directly into the PCB 60.

Figure 16A:
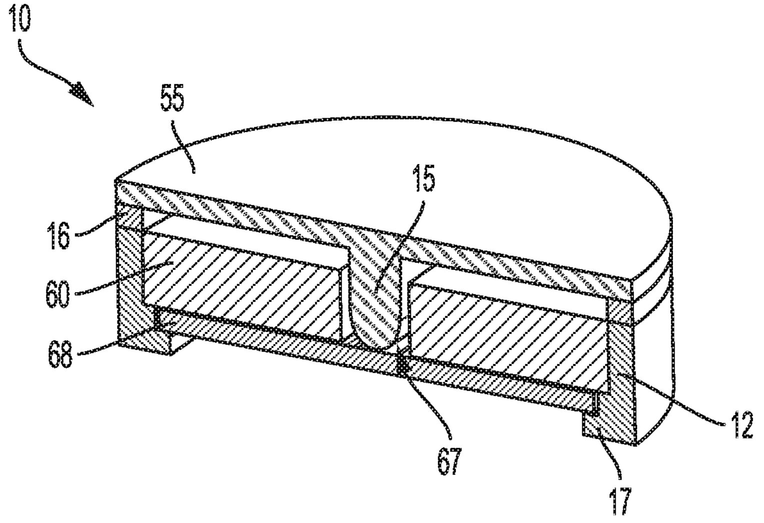
FIG. 16A is a cross-sectional perspective view of another chest compression device in accordance with some embodiments.
Figure 16B:
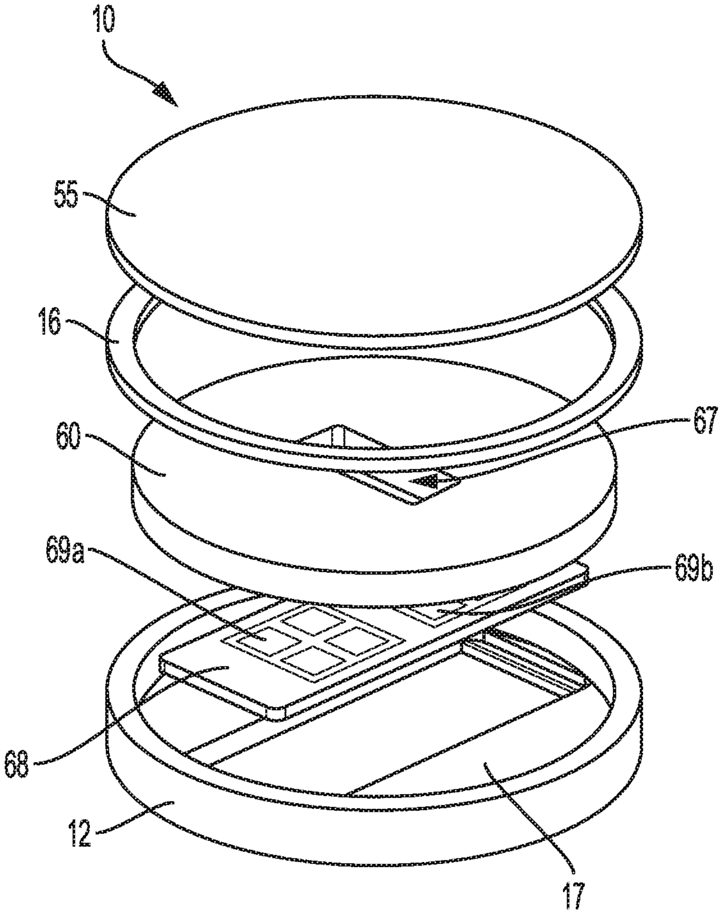
FIG. 16B shows an exploded view of the chest compression device of FIG. 16A.

FIGS. 16A-16B show an illustrative embodiment of a chest compression device 10 having strain gauges 69*a*, 69*b* mounted on an elastic support member 68 (e.g., metallic piece) that is arranged to have an appropriate amount of clearance with respect to support shelves 17 provided with the housing 12. That is, the elastic support member 68 is held by the support shelves 17 (e.g., rests on or is attached to the support shelves 17) while having an appreciable amount of clearance in other areas thereof. Such clearance allows for bending of the elastic support member 68 when force is applied thereto. For example, the cover 55 has a rigid tab 15 that extends through an opening 67 in the PCB 60. The rigid tab 15 transfers applied compressive force to the elastic support member 68 on which the strain gauges 69*a*, 69*b* are mounted, flexing the elastically support member 68 in a manner that yields measurements from the strain gauges 69*a*, 69*b* correlating to the externally applied force. The chest compression device 10 may further comprise an o-ring 16 or other support member for maintaining a suitable level of clearance between the cover 55 and the PCB 60, for protection there between.

Figure 17A:
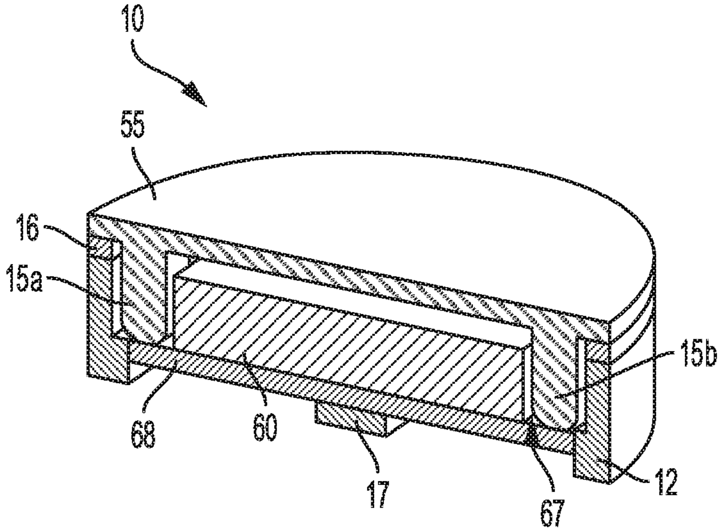
FIG. 17A is a cross-sectional perspective view of another chest compression device in accordance with some embodiments.
Figure 17B:
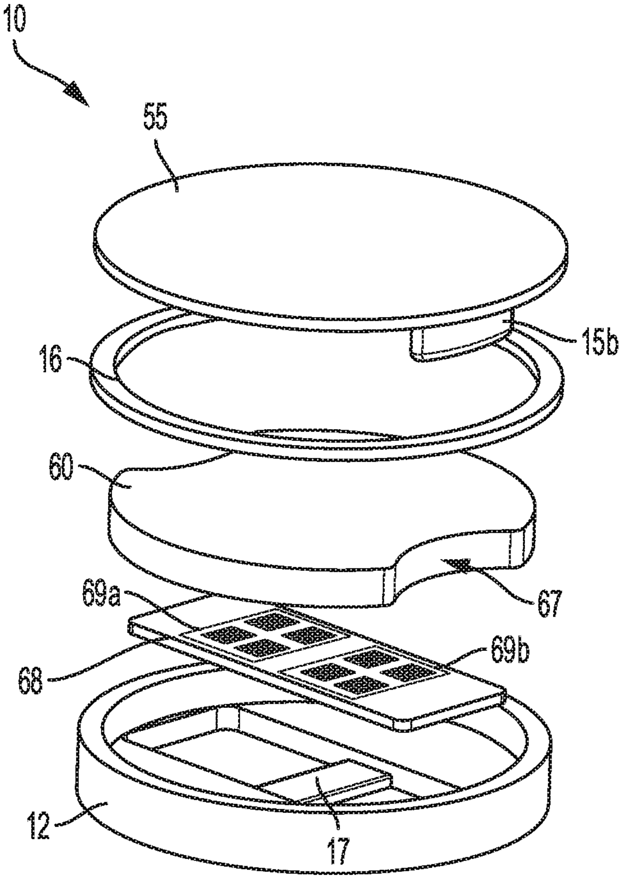
FIG. 17B shows an exploded view of the chest compression device of FIG. 17A.

FIGS. 17A-17B depict another embodiment of a chest compression device 10 having strain gauges 69*a*, 69*b* mounted on an elastic support member 68. Similar to the embodiment of FIGS. 16A-16B, the elastic support member 68 is kept in place by the support shelf 17 while maintaining a substantial amount of clearance to allow for bending of the elastic support member 68. Here, the cover 55 has rigid tabs 15*a*, 15*b* on opposite sides (rather than the center) of the force sensor, resulting in bending of the elastic support member 68 from the center outward upon application of an external compressive force. Such an embodiment may allow for placement of an accelerometer in substantially the center of the PCB 60 (where force is not directly applied thereto), which may be preferable for sensing chest compression motion.

Figure 18A:
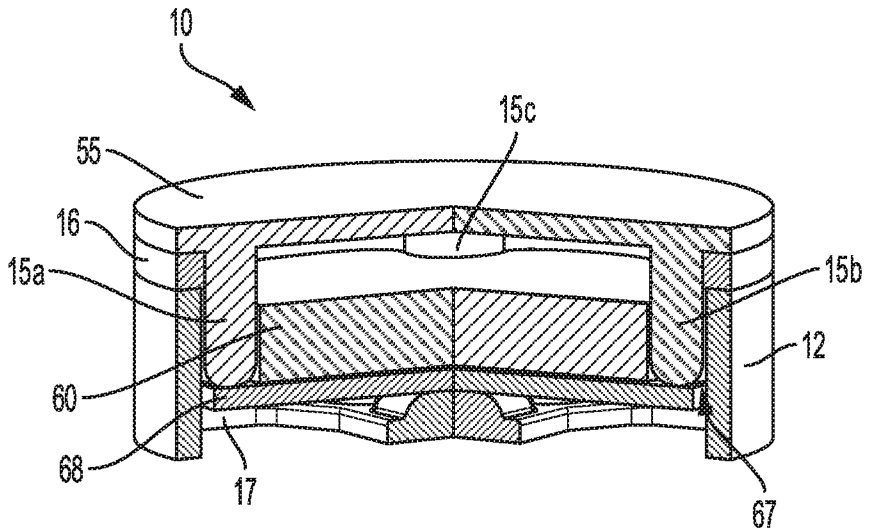
FIG. 18A is a cross-sectional perspective view of yet another chest compression device in accordance with some embodiments.
Figure 18B:
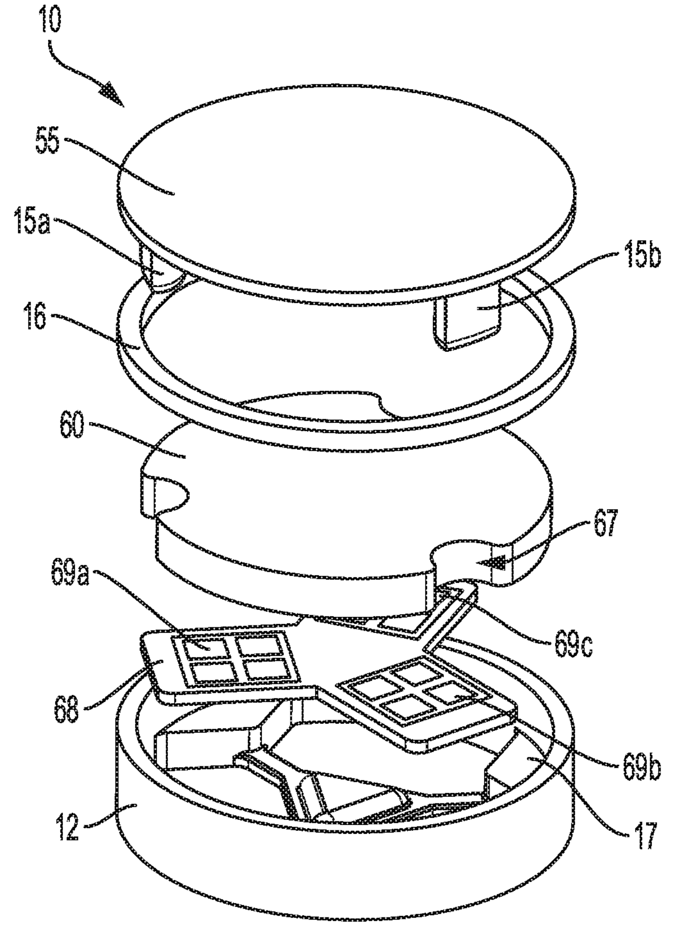
FIG. 18B shows an exploded view of the chest compression device of FIG. 18A.

FIGS. 18A-18B show another embodiment of a chest compression device 10 having strain gauges 69*a*, 69*b*, 69*c* mounted on an elastic support member 68. Similar to the embodiments of FIGS. 16A-17B, the elastic support member 68 is supported by the support shelf 17 and has an appropriate amount of clearance to allow for bending of the elastic support member 68. In this embodiment, the cover 55 has rigid tabs 15*a*, 15*b*, 15*c* distributed around the perimeter (e.g., placed at 120 degrees around the circumference) of the force sensor, resulting in outward bending of the elastic support member 68 from the center upon application of an external compressive force. Placement of the multiple rigid tabs 15*a*, 15*b*, 15*c* allow for further information to be collected, particularly with respect to the angle at which the force is applied.

Figure 19A:
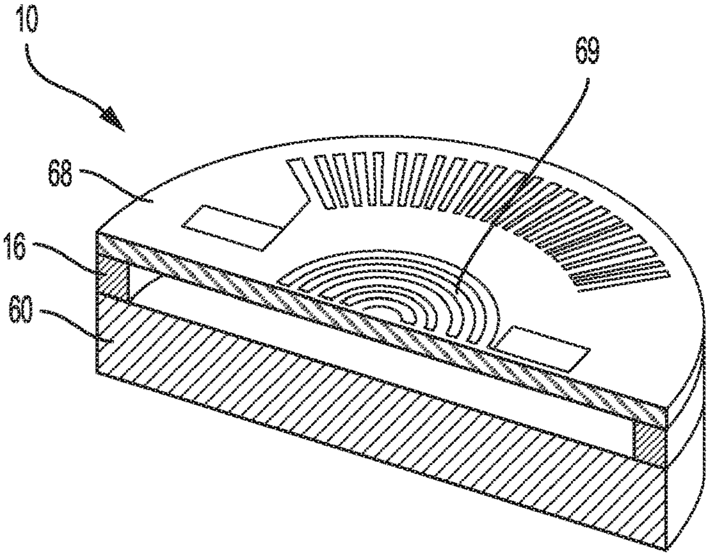
FIG. 19A is a cross-sectional perspective view of a chest compression device in accordance with some embodiments.
Figure 19B:
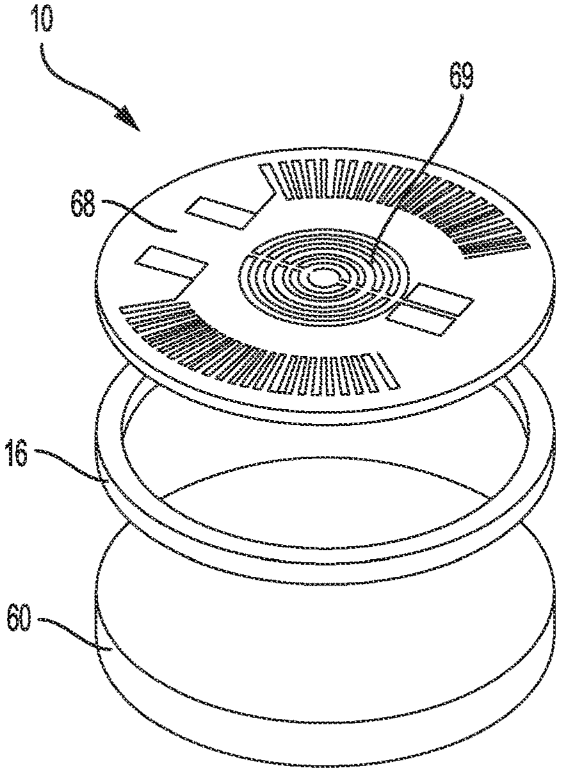
FIG. 19B shows an exploded view of the chest compression device of FIG. 19A.

FIGS. 19A-19B depict an embodiment of a chest compression device 10 having another type of strain gauge 69 mounted on an elastic support member 68. This strain gauge 69 has a Rosette-type design that is supported on its perimeter by an o-ring 16. Hence, the strain gauge 69 flexes in a concave manner when external forces are applied.

Figure 20:
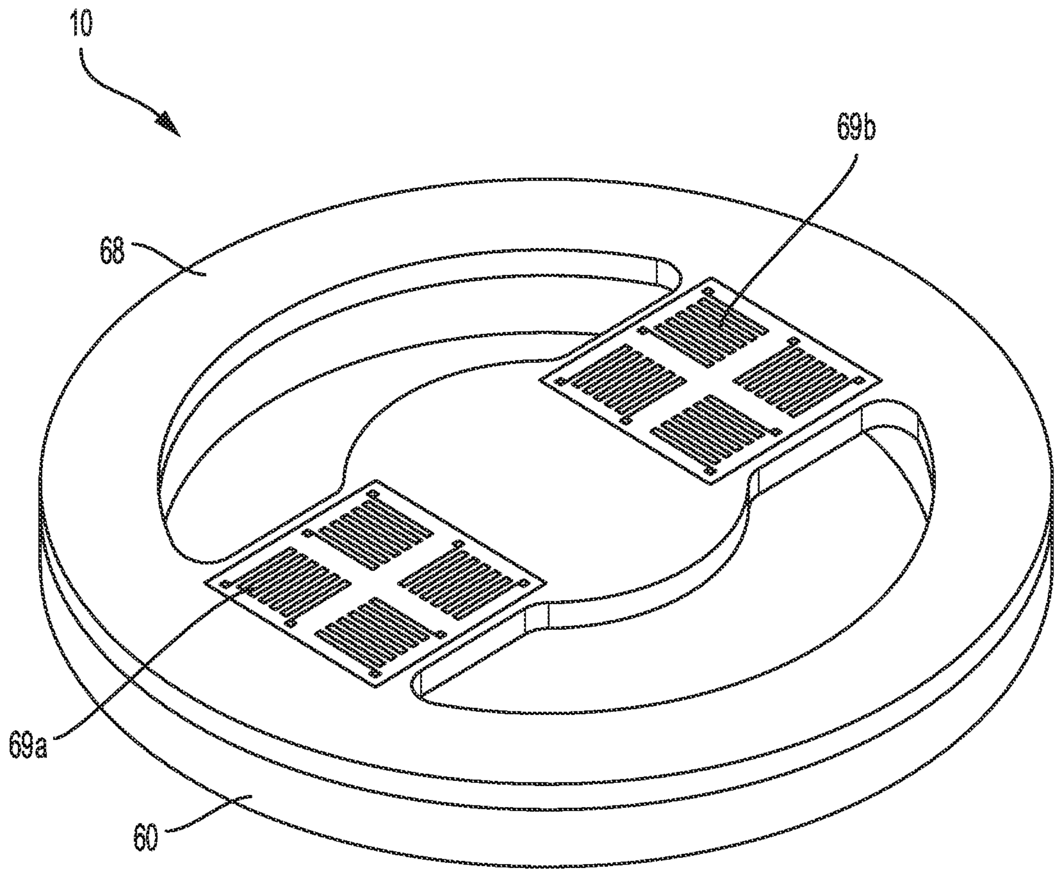
FIG. 20 is a perspective view of a chest compression device in accordance with some embodiments.

FIG. 20 shows an embodiment of a chest compression device 10 having strain gauges 69*a*, 69*b* provided on an elastic support member 68. In this implementation, the elastic support member 68 has a central core where the externally applied force to the chest compression device would be directed, and around which the strain gauges 69*a*, 69*b* are located. An opening is located underneath the central core, allowing for the elastic support member 68 to be suitably bent.

Figure 21:
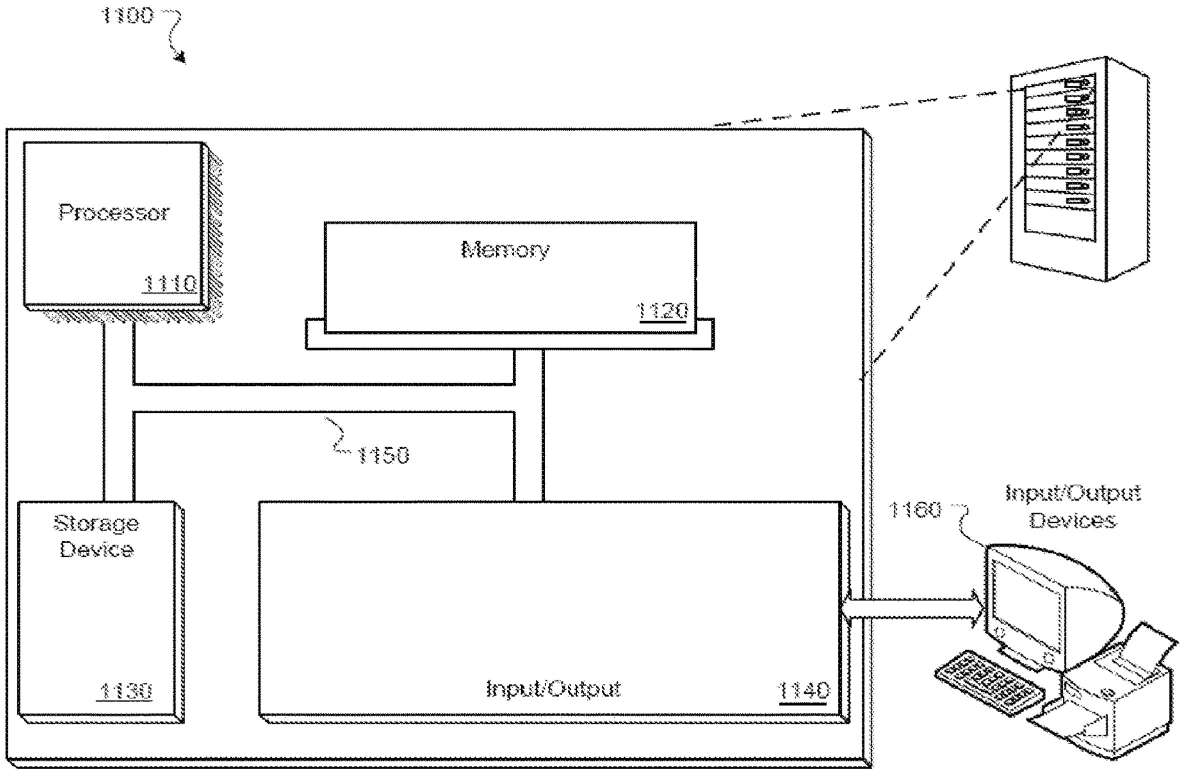
FIG. 21 is a schematic view of a resuscitation system in accordance with some embodiments.

The described techniques can be assisted by the use of a computer-implemented medical device, such as a defibrillator that comprises computing capability. Such a defibrillator or other device is shown in FIG. 21, and can communicate with and/or incorporate a computer system 1100 in performing the operations discussed above, including operations for computing the quality of one or more components of CPR provided to a patient and generating feedback to rescuers, including feedback to change rescuers who are performing some components of the CPR. The system 1150 can be implemented in various forms of digital computers, including computerized defibrillators laptops, personal digital assistants, tablets, and other appropriate computers. Additionally, the system can comprise portable storage media, such as, Universal Serial Bus (USB) flash drives. For example, the USB flash drives can store operating systems and other applications. The USB flash drives can comprise input/output components, such as a wireless transmitter or USB connector that can be inserted into a USB port of another computing device.

The system 1150 comprises a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1150. The processor can be designed using any of a number of architectures. For example, the processor 1110 can be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1150. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1150. In one implementation, the storage device 1130 is a computer-readable medium. In various different implementations, the storage device 1130 can be a floppy disk device, a hard disk device, an optical disk device, or a tape device.

The input/output device 1140 provides input/output operations for the system 1150. In one implementation, the input/output device 1140 comprises a keyboard and/or pointing device. In another implementation, the input/output device 1140 comprises a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system comprising at least one programmable processor coupled to receive data and instructions from, and to transmit data and instructions to, a data storage system, at least one input device, and at least one output device. A computer program is a set of instructions that can be used, directly or indirectly, in a computer to perform some activity or bring about some result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions comprise, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also comprise, or be operatively coupled to communicate with, one or more mass storage devices for storing data files; such devices comprise magnetic disks, such as internal hard disks and removable disks; magneto-optical disks; and optical disks. Storage devices suitable for tangibly embodying computer program instructions and data comprise all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having an LCD (liquid crystal display) or LED display for displaying information to the user and a keyboard and a pointing device such as a mouse or a trackball by which the user can provide input to the computer.

The features can be implemented in a computer system that comprises a back-end component, such as a data server, or that comprises a middleware component, such as an application server or an Internet server, or that comprises a front-end component, such as a client computer having a graphical user interface or an Internet browser, or any combination of them. The components of the system can be connected by any form or medium of digital data communication such as a communication network. Examples of communication networks comprise a local area network ("LAN"), a wide area network ("WAN"), peer-to-peer networks (having ad-hoc or static members), grid computing infrastructures, and the Internet.

The computer system can comprise clients and servers. A client and server are generally remote from each other and typically interact through a network, such as the described one. The relationship of client and server arises by virtue of computer programs running on the respective computers and having a client-server relationship to each other.

Many other implementations other than those described can be employed, and can be encompassed by the following claims.

What is claimed is:

1. A system for assisting a rescuer in providing chest compressions to a patient in need of acute care, the system comprising:

a chest compression device comprising:

a force sensor configured to generate force signals indicative of the chest compressions administered to the patient by the rescuer, the force sensor having a first resolution over a first force range for detecting initiation of the chest compressions, and having a second resolution over a second force range for detecting chest compression depth, wherein the second resolution is greater than the first resolution and the second force range is wider than the first force range, the first and second resolutions being smallest changes in force that the force sensor is able to detect, at least one motion sensor configured to generate motion signals indicative of the chest compressions administered to the patient, and a housing supporting the force sensor;

a computing device having processing circuitry operatively connected to the force sensor of the chest compression device and configured to:

receive and process signals from the force sensor, the received signals comprising first signals at the first resolution and within the first force range and second signals at the second resolution and within the second force range, receive and process signals from the at least one motion sensor, determine resuscitation parameters representative of compression depth and compression rate during the administration of the chest compressions to the patient based on the received and processed second signals and on motion signals that are correlated in time with the received second signals from the force sensor apart from the received and processed first signals, and generate an output signal based on the resuscitation parameters; and an output device configured to provide feedback to the rescuer configured to guide the rescuer to perform chest compressions at a target depth and a target rate and based on the output signal.

2. The system of claim 1, wherein the first resolution of the force sensor comprises a first least significant measurement of less than 1.0 lb (or 4.4 Newtons) over the first force range and the second resolution comprises a second least significant measurement over the second force range which is at least 2 times greater than the first least significant measurement.

3. The system of claim 1, wherein the at least one motion sensor comprises an accelerometer.

4. The system of claim 1, wherein the processing circuitry is configured to determine whether a chest compression has started or stopped based on the first signals from the force sensor.

5. The system of claim 1, wherein the first force range is between 0.1 lb and 10.0 lb (or between 0.44 Newtons and 44.5 Newtons) and the second force range is between 1.0 lb and 200 lb (or between 4.4 Newtons and 890 Newtons).

6. The system of claim 1, wherein the first resolution of the force sensor comprises a first least significant measurement over the first force range and the second resolution comprises a second least significant measurement over the second force range, wherein the force sensor has a third resolution with a third least significant measurement over a third force range, and wherein the signals received from the force sensor by the processing circuitry comprise the first signals, the second signals, and third signals, which are at the third resolution and within the third force range.

7. The system of claim 1, wherein the processing circuitry is configured to identify the occurrence of active decompression applied to the patient based on signals from the force sensor.

8. The system of claim 7, wherein the output device is configured to provide feedback to a user based on the identified active decompression applied to the patient.

9. The system of claim 1, wherein the processing circuitry is further configured to determine a chest compliance relationship based on the first signal from the force sensor and the motion signal from the at least one motion sensor, and wherein the processing circuitry is configured to determine a chest compression neutral position based at least in part on a feature of the chest compliance relationship.

10. The system of claim 1, wherein the processing circuitry is further configured to determine a chest compliance relationship based on the first signal from the force sensor and the motion signal from the at least one motion sensor, and wherein the processing circuitry is configured to detect a presence of a compressible transition layer at an anterior location of the patient based on the determined chest compliance relationship.

11. The system of claim 10, wherein the processing circuitry is configured to determine the resuscitation parameter representative of compression depth based in part on the detected compressible transition layer.

12. The system of claim 1, wherein the processing circuitry is configured to determine a state of the patient based on signals from the force sensor.

13. The system of claim 12, wherein the determined state of the patient is a likelihood of injury during a course of resuscitation and/or a presence of a compressible surface underneath the patient.

14. The system of claim 12, wherein the output device is configured to alert a user regarding the determined state of the patient.

15. The system of claim 14, wherein the alert involves notification to the user that the patient is at risk of suffering from injury during a course of resuscitation.

16. The system of claim 1, further comprising an additional chest compression device configured to be placed at a posterior location of the patient.

17. The system of claim 1, wherein the feedback based on the output signal comprises an instruction to decrease an amount of compressive force when a chest compression being performed is deeper than the target depth for the chest compressions.

18. The system of claim 1, wherein the determination of the resuscitation parameters representative of compression depth and compression rate by the processing circuitry is not based upon the received and processed first signals.

19. The system of claim 1, wherein the processing circuitry of the computing device is configured to determine a chest compliance during administration of the chest compressions to the patient based on the received and processed first signals, and to cause the output device to provide an indication that the patient is at risk of injury when a substantially constant minimum compliance is reached.

20. The system of claim 1, wherein the feedback based on the output signal comprises an instruction to push harder when a chest compression being performed is shallower than the target depth for the chest compressions.

21. The system of claim 1, wherein the feedback based on the output signal comprises an instruction to increase a rate at which chest compressions are administered to the patient when the resuscitation parameter representative of the chest compression rate is less than the target rate and an instruction to reduce the rate at which chest compressions are administered to the patient when the resuscitation parameter representative of the chest compression rate is greater than the target rate.

* * * * *